(12) United States Patent
Swager et al.

(10) Patent No.: US 11,333,663 B2
(45) Date of Patent: May 17, 2022

(54) DYNAMIC RESONANT CIRCUITS FOR CHEMICAL AND PHYSICAL SENSING WITH A READER AND RFID TAGS

(71) Applicant: MASSACHUSETTS INSTITUTE OF TECHNOLOGY, Cambridge, MA (US)

(72) Inventors: Timothy Manning Swager, Newton, MA (US); Joseph Michael Azzarelli, Cambridge, MA (US); Shinsuke Ishihara, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

(21) Appl. No.: 16/869,534

(22) Filed: May 7, 2020

(65) Prior Publication Data

US 2020/0300851 A1    Sep. 24, 2020

Related U.S. Application Data

(62) Division of application No. 15/453,217, filed on Mar. 8, 2017, now Pat. No. 10,788,485.

(60) Provisional application No. 62/305,360, filed on Mar. 8, 2016.

(51) Int. Cl.
*G01N 33/543* (2006.01)
*G06K 19/07* (2006.01)
(Continued)

(52) U.S. Cl.
CPC ....... *G01N 33/54386* (2013.01); *G01N 21/21* (2013.01); *G01N 21/6428* (2013.01);
(Continued)

(58) Field of Classification Search
CPC ............ G01N 33/54386; G01N 21/21; G01N 21/6428; G01N 21/78; G06K 19/07; G06K 19/0717; G06K 19/0723
(Continued)

(56) References Cited

U.S. PATENT DOCUMENTS 4,861,859 A    8/1989  Kim
8,426,208 B2   4/2013  Swager et al.
(Continued)

OTHER PUBLICATIONS

Burattini, S. et al. (2010). "A Healable Supramolecular Polymer Blend Based on Aromatic pi-pi Stacking and Hydrogen-Bonding Interactions." JACS. 132:12051-12058. (Year: 2010).

*Primary Examiner* — Benjamin R Whatley
*Assistant Examiner* — Jacqueline Brazin
(74) *Attorney, Agent, or Firm* — Honigman, LLP

(57) ABSTRACT

A tag for detecting an analyte can include a radio frequency identification tag including a sensor portion, the sensor portion configured to change resistivity when the radio frequency identification tag contacts or interacts with an analyte, whereby the resistivity change alters an output of the radio frequency identification tag, wherein the sensor portion includes a circuit, and wherein the sensor portion is configured to activate the circuit or deactivate the circuit when contacted or having interacted with the analyte, where the sensor portion includes a plurality of carbon nanotubes associated with a chemically-degradable polymer. In certain embodiments, the chemically degradable polymer can be a metallo-supramolecular polymer.

11 Claims, 41 Drawing Sheets

(51) Int. Cl.
 G01N 21/21 (2006.01)
 G01N 21/64 (2006.01)
 G01N 21/78 (2006.01)

(52) U.S. Cl.
 CPC ............ G01N 21/78 (2013.01); G06K 19/07 (2013.01); G06K 19/0717 (2013.01); G06K 19/0723 (2013.01)

(58) Field of Classification Search
 USPC .......................................................... 422/63
 See application file for complete search history.

(56) References Cited

U.S. PATENT DOCUMENTS

| | | | |
|---|---|---|---|
| 9,563,833 B2 * | 2/2017 | Swager | ............ G06K 19/07749 |
| 10,157,340 B2 * | 12/2018 | Swager | .................. G08C 17/02 |
| 10,788,485 B2 * | 9/2020 | Swager | .................. G01N 21/21 |
| 2002/0132361 A1 | 9/2002 | Vossmeyer et al. | |
| 2004/0152135 A1 | 8/2004 | Ghadiri | |
| 2004/0186220 A1 | 9/2004 | Smalley et al. | |
| 2007/0219280 A1 | 9/2007 | Kitagawa et al. | |
| 2009/0108746 A1 | 4/2009 | Park et al. | |
| 2012/0091354 A1 | 4/2012 | Gerts et al. | |
| 2012/0187380 A1 | 7/2012 | Wu | |
| 2012/0295360 A1 | 11/2012 | Swager et al. | |
| 2014/0145826 A1 | 5/2014 | Conner et al. | |
| 2015/0116093 A1 * | 4/2015 | Swager | .............. G06K 19/0723 340/10.4 |

\* cited by examiner

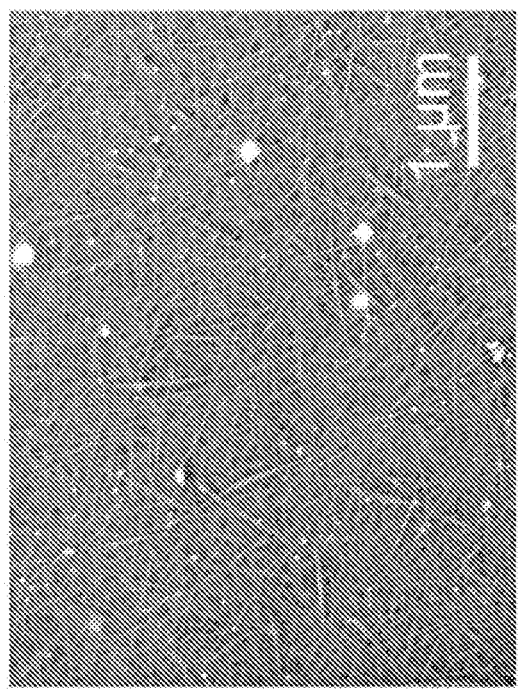
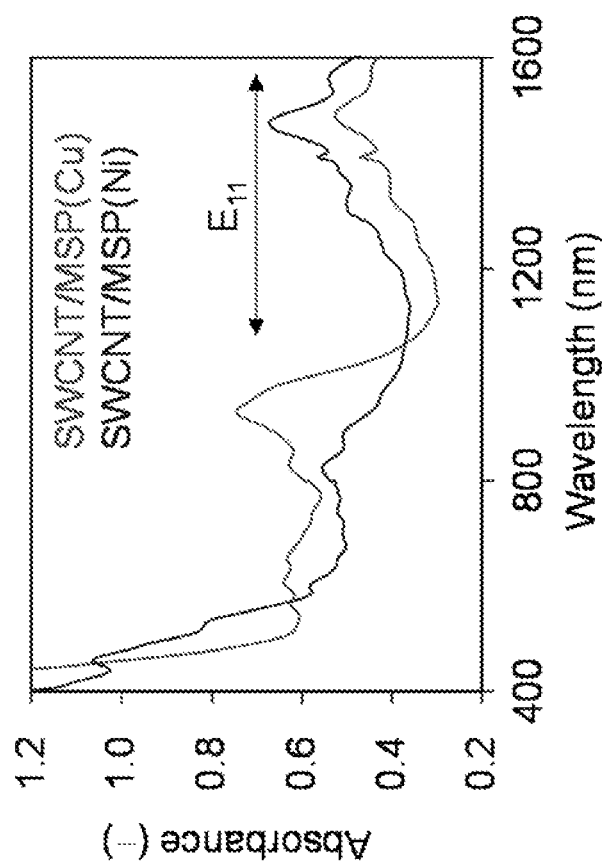
FIG. 2C
FIG. 2B

DYNAMIC RESONANT CIRCUITS FOR CHEMICAL AND PHYSICAL SENSING WITH A READER AND RFID TAGS

PRIORITY CLAIM

This application is a divisional of U.S. application Ser. No. 15/453,217, filed on Mar. 8, 2017, which claims the benefit of U.S. Provisional Application No. 62/305,360 filed on Mar. 8, 2016, each of which is incorporated by reference in its entirety.

This application claims the benefit of U.S. Provisional Application No. 62/305,360 filed on Mar. 8, 2016, which is incorporated by reference in its entirety.

STATEMENT REGARDING FEDERALLY SPONSORED RESEARCH OR DEVELOPMENT

This invention was made with Government support under Grant No. DMR1410718 awarded by the National Science Foundation and under Contract No. W911NF-13-D-0001 awarded by the Army Research Office. The Government has certain rights in the invention.

TECHNICAL FIELD

This invention relates to wireless sensing.

BACKGROUND

Chemical sensors offer opportunities for improving personal security, safety, and health. To enable broad adoption of chemical sensors requires performance and cost advantages that are best realized from innovations in the design of the sensing (transduction) materials. Ideal materials are sensitive and selective to specific chemicals or chemical classes and provide a signal that is readily interfaced with portable electronic devices. Traditional solutions suffer from limitations, such as being expensive, bulky, or fragile, or requiring of trained personnel to operate. In addition, many traditional methods of sensing require physical contact of the device with the sensing element/material via wires or solid-state circuitry to acquire data.

SUMMARY

In one aspect, a tag for detecting an analyte can include a radio frequency identification tag including a sensor portion, the sensor portion configured to change resistivity when the radio frequency identification tag contacts or interacts with an analyte, whereby the resistivity change alters an output of the radio frequency identification tag, wherein the sensor portion includes a circuit, and wherein the sensor portion is configured to activate the circuit or deactivate the circuit when contacted or having interacted with the analyte, where the sensor portion includes a conductive material associated with a chemically-degradable polymer.

In certain embodiments, the conductive material can include carbon nanotubes.

In certain embodiments, the chemically-degradable polymer can include a ligand and a metal ion.

In certain embodiments, the polymer can be a supramolecular polymer.

In certain embodiments, the carbon nanotubes and the chemically-degradable polymer can form a porous network.

In certain embodiments, the polymer can be a polycyclic aromatic polymer.

In certain embodiments, the polymer can include a polarizable π electron.

In certain embodiments, the polymer can include an anthracene-based ligand.

In certain embodiments, the polymer and the metal can form a square metal structure.

In certain embodiments, the metal ion can be $Cu^{2+}$ or $Ni^{2+}$.

In certain embodiments, the conductive material can include graphene.

In certain embodiments, the conductive material can include metal oxides.

In certain embodiments, the conductive material can include a metal-organic-framework.

In certain embodiments, the analyte can be a nerve agent.

In certain embodiments, the analyte can be a strong electrophile.

In certain embodiments, the analyte can be diethylchlorophosphate or thionyl chloride.

In certain embodiments, an amount of the plurality of carbon nanotubes and an amount of the polymer can be 1:1.

In certain embodiments, each of the plurality of the carbon nanotubes can be wrapped by the polymer.

In certain embodiments, the radio frequency identification tag can be a near-field communication tag.

In certain embodiments, the tag can be incorporated into a badge capable of being worn by a person.

A system for detecting an analyte can include a radio frequency identification tag including a sensor portion, the sensor portion configured to change resistivity when the radio frequency identification tag contacts or interacts with an analyte, whereby the resistivity change alters an output of the radio frequency identification tag, wherein the sensor portion includes a circuit, and wherein the sensor portion is configured to activate the circuit or deactivate the circuit when contacted or having interacted with the analyte, where the sensor portion includes a plurality of carbon nanotubes associated with a chemically-degradable polymer and a detector.

In certain embodiments, the detector can be a reader.

In certain embodiments, the reader can be a hand held reader.

In certain embodiments, a hand held reader can be a smartphone.

In certain embodiments, the tag can become readable from unreadable to the detector after the conductivity changes.

In certain embodiments, the tag can become unreadable from readable to the detector after the conductivity changes.

In certain embodiments, the system can include a dosimeter.

In certain embodiments, the dosimeter can be a radiation dosimeter, a chemical warfare agent dosimeter, a volatile organic compound dosimeter, or an analyte dosimeter.

In certain embodiments, the system can monitor a pollutant, a chemical relevant to occupational safety, a nerve agent, or a pulmonary agent.

In certain embodiments, the system can include a plurality of tags.

In certain embodiments, each of the plurality of tags can be capable of detecting at least one analyte.

In another aspect, a method of detecting an analyte can include detecting an output from a radio frequency identification tag including a sensor portion, the sensor portion configured to change resistivity when the radio frequency identification tag contacts or interacts with an analyte, whereby the resistivity change alters an output of the radio frequency identification tag, wherein the sensor portion includes a circuit, and wherein the sensor portion is configured to activate the circuit or deactivate the circuit when contacted or having interacted with the analyte, where the sensor portion includes a plurality of carbon nanotubes associated with a chemically-degradable polymer.

In certain embodiments, the method can further include detecting the output of the radio frequency identification by a reader.

In certain embodiments, the reader can include a handheld, mobile platform, or stationary reader.

In certain embodiments, the reader can include a smartphone.

In certain embodiments, the output can be detectable by a reader after the output is shifted by detection of the analyte.

In certain embodiments, the output can be detectable by a reader after the output going through a physical object.

In certain embodiments, the analyte can contact or interact with a portion of the surface of the radio frequency identification tag.

In certain embodiments, the sensor portion can be located on a portion of a surface of the radio frequency identification tag.

In certain embodiments, the sensor portion can be surrounded by an antenna coil.

In certain embodiments, the sensor portion can have a surface area less than the surface area of the radio frequency identification tag.

In certain embodiments, the radio frequency identification tag may not require a power source.

In certain embodiments, the method can further include altering an electrical connection within the radio frequency identification tag.

In certain embodiments, the sensor portion can include multiple sensing locations.

In another aspect, a method of making a tag can include making a dispersion with a conductive material associated with a chemically-degradable polymer and a solvent and drop-casting the dispersion on a substrate.

In certain embodiments, the conductive material can include carbon nanotubes.

In certain embodiments, the chemically-degradable polymer can include a ligand and a metal ion.

In certain embodiments, the polymer can be a supramolecular polymer.

In certain embodiments, the carbon nanotubes and the chemically-degradable polymer can form a porous network.

In certain embodiments, the polymer can be a polycyclic aromatic polymer.

In certain embodiments, the polymer can include a polarizable π electron.

In certain embodiments, the polymer can include an anthracene-based ligand.

In certain embodiments, the polymer and the metal can form a square metal structure.

In certain embodiments, the metal ion can be $Cu^{2+}$ or $Ni^{2+}$.

In certain embodiments, the solvent can include a dichlorobenzene (DCB).

In certain embodiments, the solvent can further include toluene.

In certain embodiments, a ratio of DCB to toluene can be 1:4.

In certain embodiments, the method can further include centrifuging the dispersion and taking a supernant of the dispersion for drop-casting.

Other aspects, embodiments, and features will be apparent from the following description, the drawings, and the claims.

BRIEF DESCRIPTION OF THE DRAWINGS

FIG. 1A shows chemical structures of AL and MSP. FIGS. 1B and 1C show UV-Vis titration experiments of AL with $Cu(AcO)_2.H_2O$ at room temperature. FIG. 1D shows an STM image of MSP(Cu) assembled on highly-oriented pyrolytic graphite (HOPG).

FIGS. 2A-2C show dispersion of SWCNT with MSPs. FIG. 2A shows scheme for dispersing SWCNT with MSPs. FIG. 2B shows UV-Vis-NIR spectra of SWCNT dispersed by MSP(Cu) and MSP(Ni) in o-DCB. FIG. 2C shows an SEM image of a drop-cast film of SWCNT/MSP(Cu) on Si substrate.

FIG. 3A shows configuration of SWCNT-based chemiresistive sensor. FIG. 3B shows conductance traces of SWCNT-based chemiresistive sensors upon exposure to DECP. FIG. 3C shows chemiresisitve responses of SWCNT-based chemiresistive sensors upon exposure to various vapors in $N_2$.

FIG. 4A shows conductance traces of optimized SWCNT/MSP(Cu) chemiresistive sensors upon exposure to various concentrations of DECP in $N_2$. FIG. 4B shows chemical structures of ALOx and pralidoxime. FIG. 4C shows conductance traces of optimized SWCNT/MSP(Cu) chemiresistive sensors made from 0.5:0.5:1.0 (by mole) mixtures of ALOx, AL, and $Cu^{2+}$ upon exposure to various concentrations of DECP in $N_2$.

FIG. 31A shows MALDI-TOF-MS spectra of SWCNT+MSP(Cu) before and after exposure to DMCP. FIG. 31B shows UV-Vis-NIR spectra of SWCNT+MSP(Cu) film on quartz before and after exposure to DMCP. FIG. 31C shows IR spectra of DSA(Ni) in $CCl_4$ before and after bubbling with DMCP vapor.

FIG. 34A shows conductance traces of optimized SWCNT/MSP(Cu) chemiresistive sensors made from 1:1 mixtures of AL and $Cu^{2+}$ (in mole) upon exposure to DECP in $N_2$. FIG. 34B shows conductance traces of optimized SWCNT/MSP(Cu) chemiresistive sensors made from 0.5:0.5:1.0 mixtures of ALOx, AL, and $Cu^{2+}$ (in mole) upon exposure to DECP in $N_2$.

DETAILED DESCRIPTION

Figure 1A:
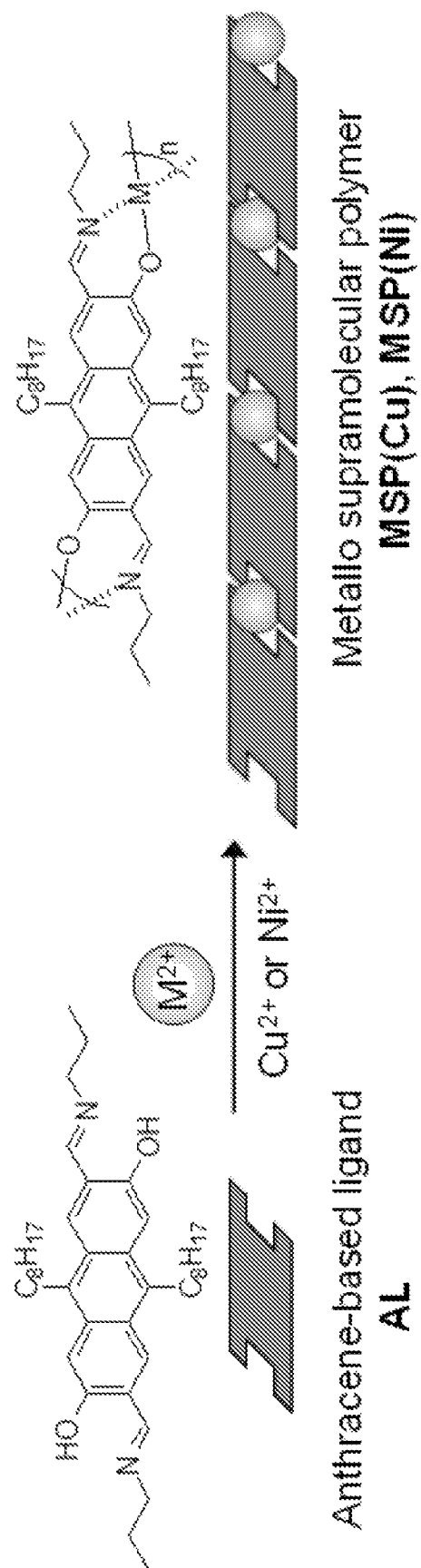
FIGS. 1A-1D show formation of metallo-supramolecular polymers (MSPs).

Development of portable and low-cost technologies for chemical and physical sensing is important for human health, safety, and quality of life. Such systems can be used for point-of-care diagnosis of disease, detection of explosives and chemical warfare agents, prevention of spoilage of food and increasing efficiency in agriculture, analysis of oil and gas, detection of petrochemical leaks and spills, monitoring of environmental pollution, detection of radiation, and monitoring of temperature or heat energy exposure. Traditional improvements in this area increase performance through modification or re-engineering of existing platforms. Such strategies may include miniaturizing components to increase portability (e.g., portable gas chromatograph or mass spectrometer) or reducing cost (e.g., increasing the efficiency of the manufacturing). While these solutions may improve existing platforms in terms of portability, they still suffer from limitations, such as being expensive, bulky, or fragile, or requiring of trained personnel to operate. Furthermore, many traditional methods of chemical sensing require physical contact of the device with the sensing element/material via wires or solid-state circuitry to acquire data.

Low cost and portable chemical sensors facilitate personal monitoring and sharing information of hazardous chemical substances (e.g., toxic gases, explosives, and carcinogens), which are of increasing interest for security, occupational safety, and health. See, Taylor, R. F.; Schultz, J. S. *Handbook of Chemical and Biological Sensors* (IOP Publishing, 1996), and Korotcenkov, G. *Handbook of Gas Sensor Materials: Properties, Advantages and Shortcomings for Applications Volume 2: New Trends and Technologies* (Springer, 2007), each of which is incorporated by reference in its entirety. Chemiresistive sensors are attractive devices to realize distributed low cost sensors and operate on a simple variation of electrical conductivity of sensing materials in response to analytes of interest. See Neri, G. *Chemosensors* 2015, 3, 1-20, which is incorporated by reference in its entirety. The direct electrical nature of the transduction in these devices is ideal for integration into omnipresent electronic devices. Various types of conductive materials (e.g., carbon, metal oxides, and metal-organic-frameworks) can be employed in chemiresistive sensors. See, Neri, G. *Chemosensors* 2015, 3,1-20, and Campbell; M. G., Sheberla, D.; Liu, S. F.; Swager, T. M.; Dincǎ, M. *Angew. Chem. Int. Ed.* 2015, 54, 4349-4352, each of which is incorporated by reference in its entirety. Semiconductive single walled carbon nanotubes (SWCNT) are particularly interesting as a result of their high chemical and thermal stability, relatively small responses to humidity, and compatibility with solvent-mediated processes. See, Kauffman, D. R.; Star, A. *Angew. Chem. Int. Ed.* 2008, 47, 6550-6570, Snow, E. S.; Perkins, F. K.; Robinson, J. A. *Chem. Soc. Rev.* 2006, 35, 790-798, Schnorr, J. M.; Swager, T. M. *Chem. Mater.* 2011, 23, 646-657, and Fennell, J. F., Jr.; Liu, S. F.; Azzarelli, J. M.; Weis, J. G.; Rochat, S.; Mirica, K. A.; Ravnsbæk, J. B.; Swager, T. M. *Angew. Chem. Int. Ed.* 2016, 55, 1266-1281, each of which is incorporated by reference in its entirety. SWCNTs do not possess intrinsic selectivity for specific target analyte molecules and hence a major element of creating useful sensors from these materials involves functionalization with chemical units that enable selective responses to molecules or classes of reactive compounds. Chemical selectivity is commonly imparted upon SWCNTs by covalent attachment of selectors or receptors, resulting in robust chemiresistor stability. However, reactive functionalization of graphene surfaces disrupts π-system, thereby negatively impacting sensitivity by limiting the dynamic range of the resisitivity. Conversely, non-covalent functionalization methods are less perturbative to the π-electronic structure of SWCNTs. See Fujigaya, T.;

Nakashima, N. *Sci. Tech. Adv. Mater.* 2015, 16, 024802, which is incorporated by reference in its entirety. Modification of SWCNTs ideally enhance a chemiresistive responses (defined as $(G_1-G_0)/G_0 \times 100(\%)$, where $G_0$ and $G_1$ are initial and measured conductance) to target analytes relative to other chemicals in the surroundings. A central goal is to develop methods that increase chemiresistive responses to target analytes relative background noise, and this need is particularly important when the target analytes are toxic at trace (parts per million or lower) concentrations. See Romano, J. A., Jr.; Lukey, B. J.; Salem, H. *Chemical Warfare Agents: Chemistry, Pharmacology, Toxicology, and Therapeutics, Second Edition* (CRC Press, 2007), which is incorporated by reference in its entirety.

The cumulative exposure of toxic chemicals at trace concentrations is often of interest, and chemical dosimeters offer an important means for quantifying these events. Physical dosimeters from multi-walled carbon nanotubes wrapped with insulating poly(olefin sulfone)s display large increases in conductivity (ca. 10,000%) by radiation-induced degradation of the resistive polymer wrapper to create direct MWCNT-MWCNT contacts. See, Lobez, J. M.; Swager, T. M. *Angew. Chem. Int. Ed.* 2010, 49, 95-98, which is incorporated by reference in its entirety. In this case, evaporation of degradation products of poly(olefin sulfone)s (as $SO_2$ and olefin) is critical for promoting direct MWCNT-MWCNT contacts. Although a limited number of synthetic polymers produce volatile degradation products, this concept has the potential for general utility to create chemiresistive dosimeters.

Examples of Some Sensors

One method of detecting an analyte in a sample includes a carbon-carbon multiple bond moiety comprising exposing a detection region of a detector including a heteroaromatic compound having an extrudable group and capable of undergoing Diels-Alder reaction with the analyte including a carbon-carbon multiple bond moiety to the sample, and detecting color change of a reaction mixture comprising the heteroaromatic compound based on the presence of the analyte in the sample. This method provides alkene and alkyne detection, differentiation, and quantitation that addresses the growing need of transducing relevant information (only previously attainable from sophisticated methods such as GC-analysis) with the favorable low-cost and ease-of-use attributes ascribed to more basic technologies. Using this method, a device can indicate the presence of specific classes of alkenes or alkynes in the gas phase, and can determine the total exposure of the device to said alkenes or alkynes, based on a colorimetric readout. Because this device is selective for certain classes of alkenes and alkynes, it allows for differentiation of compounds of interest that contain certain alkene or alkyne functionality. This method can make use of the color change that accompanies the transformation of an s-tetrazine moiety to a pyrimidine moiety upon reaction with unsaturated carbon-carbon bonds. See, for example, Application No. PCT/US2014/033037, which is incorporated by reference in its entirety.

Another method of detecting a stimulus includes using a dosimeter, such as a thermal dosimeter, which can measure the amount of light emitted from a crystal in a detector when the crystal is heated. A dosimeter can use a triazole as described by Coulembier. See, for example, O. Coulembier et al., *Macromolecules,* 2006, 39, 5617-5628, which is incorporated by reference in its entirety.

Sensors Using a Digital Reader

Sensing platforms that have the characteristics of being simple, inexpensive, yet sensitive and quantitative can be created. One approach to the area of chemical and physical sensing can be the development of sensing materials and devices that have the characteristics of being modular (i.e., easily modified for specific applications), wirelessly readable, and easily used and interpreted by individuals with no prior technical training.

Whitesides and co-workers have demonstrated chemical detection of analytes in biologically-relevant samples using smartphones. See, for example, Martinez, A. W. et al., *Anal. Chem.,* 2008, 80, 3699-3707, which is incorporated by reference in its entirety. These methods involve capturing an image of a colorimetric assay using an in-phone camera and analyzing it to correlate changes in color of a dye with the presence of biologically relevant analyte. This method, however, requires line-of-sight measurement that can be affected by potential artifacts arising from lighting conditions, positional angle, or hand-movement during image acquisition.

Potyrailo et al. and others demonstrated electronic wireless detection of chemical analytes using RFID technology. See, for example, Potyrailo, R. A. et al., *Anal. Chem.* 2006, 79, 45-51, which is incorporated by reference in its entirety. While this technology has the capability to perform non-line-of sight measurements that overcome some of the limitations of the colorimetric assays, they have limited portability as they require the use of advanced electronics devices, such as inductively coupled network analyzers or impedance spectrometers.

Studies have exploited custom-made, as well as commercially available RFID tags to monitor freshness of milk, freshness of fish, and growth of bacteria. See, for example, Tao, H. et al., *Adv. Mater.* 2012, 24, 1067-72; Potyrailo, R. A. et al., Battery-free Radio Frequency Identification (RFID) Sensors for Food Quality and Safety, 2012, each of which is incorporated by reference in its entirety. These studies relied primarily on correlating the changes in dielectric environment of the RFID tags (i.e., changes in C) with changes in the resonant frequency or resonant impedance of the LCR circuit. However, they are limited by a lack of selectivity toward chemical analytes and physical stimuli, and by the requirement for expensive radio frequency analysis equipment such as impedance and network analyzers for chemical detection.

Although RF technology has been recently applied towards wireless chemical sensing, current approaches have several limitations including lack of specificity to selected chemical analytes, requirements for expensive, bulky, fragile, and operationally complex impedance and network analyzers, and reliance on extensive data processing and analysis. See, Potyrailo R A, Surman C, Nagraj N, Burns A (2011) Materials and transducers toward selective wireless gas sensing. *Chem Rev* 111:7315-7354, Lee H et al. (2011) Carbon-nanotube loaded antenna-based ammonia gas sensor. *Microw Theory Tech IEEE Trans* 59:2665-2673, Potyrailo R A et al. (2009) Development of radio-frequency identification sensors based on organic electronic sensing materials for selective detection of toxic vapors. *J Appl Phys* 106:124902, Fiddes L K, Yan N (2013) RFID tags for wireless electrochemical detection of volatile chemicals. *Sensors Actuators B Chem* 186:817-823, Fiddes L K, Chang J, Yan N (2014) Electrochemical detection of biogenic amines during food spoilage using an integrated sensing RFID tag. *Sensors Actuators B Chem* 202:1298-1304, Occhiuzzi C, Rida a., Marrocco G, Tentzeris M M (2011) Passive ammonia sensor: RFID tag integrating carbon nanotubes. 2011 IEEE Int Symp Antennas Propag: 1413-1416, each of which is incorporated by reference in its entirety.

A commercially available technology—Near Field Communication (NFC)—can be used for wireless, non-line-of-sight chemical sensing. Many modern smartphones and similar devices (tablet computers, video game controllers, and smartphone accessories) can be equipped with NFC readers operating at peak frequency of 13.56 MHz. These readers can be tuned to interact with many types of commercially available wireless "tags"—simple electrical circuits comprising an inductor (L), a capacitor (C), and an integrated circuit (resistor (R)) supported on the surface of a substrate, such as a polymeric sheet. The phone can achieve communication by powering the tag via electromagnetic induction at the specified frequency and then receiving reflected attenuated signal back from the tag. See, for example, Curty, J. P. et al., *Springer*, New York, 2007, pp. 49-73, which is incorporated by reference in its entirety. This technology can be used in controlling access to facilities, ticketing of events, prevention of theft, and management of inventory. This technology can be applied to chemical sensing by introducing chemiresistive materials into the circuitry of the tag. Exposure of the modified tag to chemical vapors can alter the resistance of the sensing materials, and thus the resonant frequency of the modified tag, such that it becomes readable or unreadable when probed by a smartphone reader. With this method, vapors of nitric acid, ammonium hydroxide and cyclohexanone, can be detected. This technology can be extended to physical sensors as well, such as applications in temperature, heat energy exposure or radiation sensing.

Commercially available RFID tags can be combined with a digital reader, such as a hand held frequency reader, for example a consumer electronic smartphone, resulting in a fully integrated chemical and physical sensing platform. The sensing platform can be available to anyone, including those without a technical background. This platform has advantages over existing methods of chemical and physical sensing. For example, the sensing method can be non-line-of-sight (high frequency radio waves), and can receive information from the sensor tag through solid objects such as packages, walls, wood, and other non-metallic objects. The sensing tag does not require a power source, as it receives its power from the incoming radio waves. The data-acquiring device can be any commercially available smartphone equipped with near field communication (NFC) reader capabilities, including but not limited to Samsung, LG, Google, Blackberry, etc. manufacturers. The method is simple: no technical knowledge is required to perform a measurement.

The chemical detection can be achieved using NFC technology instead of impedance spectroscopy and the detector can be a highly portable device such as a smartphone, instead of a very bulky complex instrument (e.g., a network analyzer). Besides portability, the smartphone has additional utility in chemical detection because the information obtained from the chemical sensor can be coupled with other sensors within the smartphone (e.g., GPS, email) for automated identification of position and communication of information. Ability for wireless chemical sensing over distance of 5 cm of solid material was demonstrated, as opposed to through a distance of a single paper sheet. This method incorporates chemiresistors into the existing circuitry of a tag by drawing as opposed to depositing sensing materials on top of the antenna. This method requires no data workup for signal processing, while existing methods often require substantial amount of data processing for interpreting information. This method does not require additional equipment for reading the magnetic memory. This method relies on changes on resistance of a selective chemiresistive or physiresistive material for chemical sensing, while existing methods rely on non-specific changes in capacitance. This method relies on molecular recognition for selectivity, and does not require principal component analysis, and so on. A nascent technology can be embedded in modern smartphones—Near Field Communication (NFC)—for wireless electronic, portable, non-line-of-sight selective detection of gas-phase chemicals. NFC-enabled smartphones communicate with NFC tags by simultaneously energizing the NFC tag with an alternating magnetic field (e.g. f=13.56 MHz) through inductive coupling and transferring data by signal modulation. NFC tags are converted into Chemically Actuated Resonant Devices (CARDs) by disrupting the LCR circuit (Step 1) and recompleting the circuit with a stimuli-responsive variable circuit component by drawing (Step 2) with solid sensing materials.

This concept can be demonstrated by (i) incorporating carbon-based chemiresponsive materials into the electronic circuitry of commercial NFC tags by mechanical drawing, and (ii) using an NFC-enabled smartphone to relay information regarding the chemical environment (e.g., presence or absence of a chemical) surrounding the NFC tag. In this way, part-per-million (ppm) concentrations of ammonia and cyclohexanone and part-per-thousand (ppth) concentrations of hydrogen peroxide can be detected and differentiated. Wireless acquisition and transduction of chemical information can be coupled with existing smartphone functions (e.g., GPS).

Figure 18:
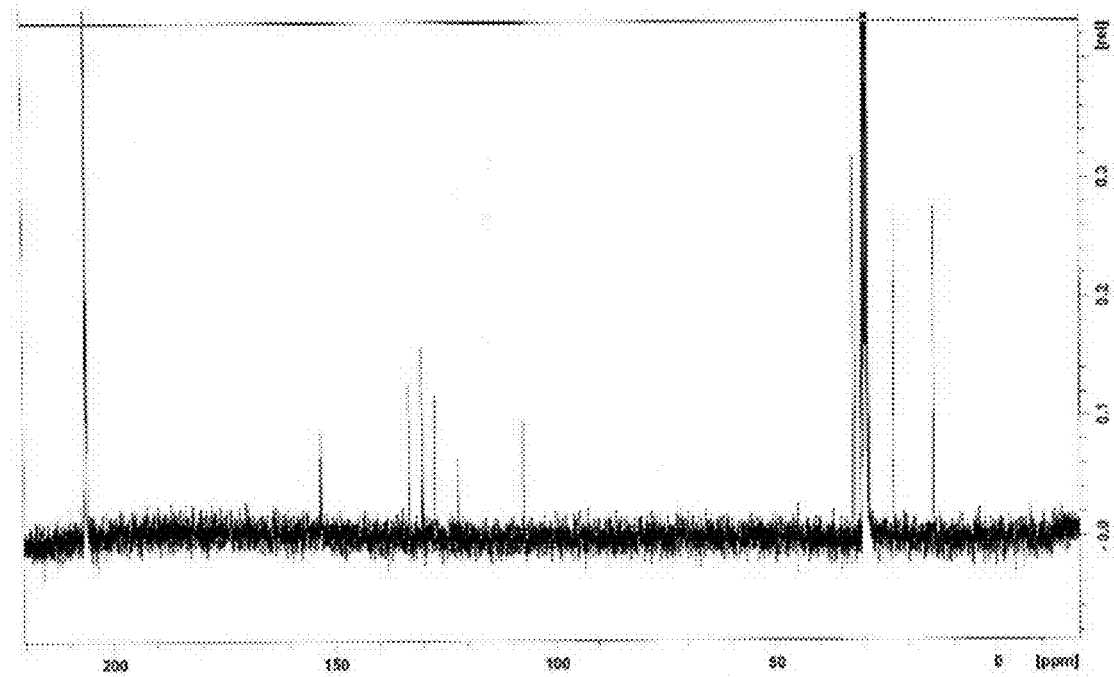
FIG. 18 shows $^{13}$C-NMR spectrum of ALOx.
Figure 19:
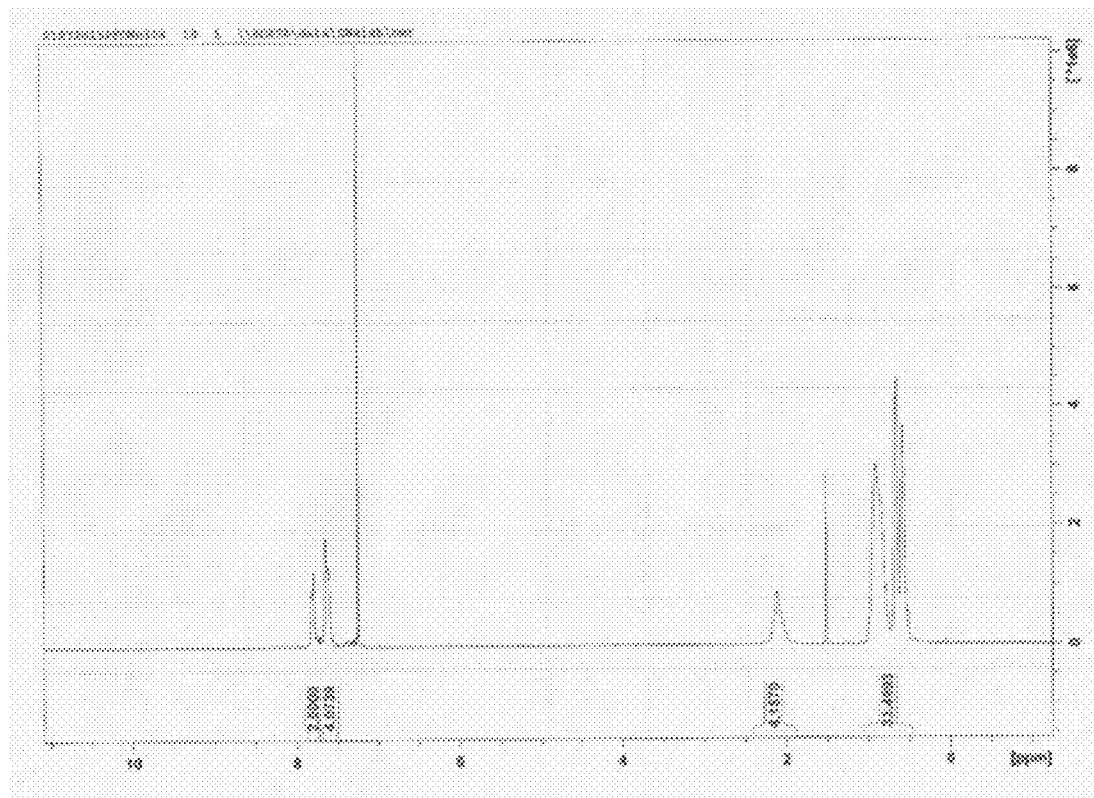
FIG. 19 shows $^1$H-NMR spectrum of poly-(9,9-di-(2'-ethylhexyl)-2,7-dibromofluorene)

Many commercial smartphones and mobile devices are equipped with NFC hardware configured to communicate wirelessly with NFC "tags"—simple electrical resonant circuits comprising inductive (L), capacitive (C), and resistive (R) elements on a plastic substrate (FIG. 18). The smartphone, such as the Samsung Galaxy S4 (SGS4), employed in this study, communicates with the battery-free tag by powering its integrated circuit (IC) via inductive coupling at 13.56 MHz. See, Nitkin P V., Rao K V S, Lazar S (2007) An overview of near field UHF RFID. 2007 IEEE Int Conf RFID:167-174, which is incorporated by reference in its entirety. Power transferred from the smartphone to the IC is, among other variables, a function of the transmission frequency (f), the resonant frequency (A), the quality factor (Q), and the circuit efficiency (η), which in turn are functions of L (H), C (F), and R (Ω) of the smartphone and NFC resonant circuit components. See, Jing H C, Wang Y E (2008) Capacity performance of an inductively coupled near field communication system. 2008 *IEEE Antennas Propag Soc Int Symp* 2:1-4, which is incorporated by reference in its entirety. Integration of chemiresponsive materials into commercial NFC tags produces stimuli-responsive variable circuit components that affect power transfer between the tag and a smartphone in the presence or absence of chemical stimuli. The resulting programmable Chemically Actuated Resonant Devices (CARDs) enable non-line-of-sight smartphone chemical sensing by disrupting or allowing RF communication.

In one method, commercially available high frequency (HF) radio frequency identification tags compatible with a reader can be converted into chemical and physical sensors. The reader can be a digital reader, which can be a handheld frequency reader. The reader can be portable. The reader can be a smartphone. In parallel with the sensing capability, a smartphone reader can read other things, such as GPS coordinates, acceleration, light intensity, altitude, etc. Coupling these capabilities in one portable reader can have unprecedented utility.

This technology can be extended to temperature, heat energy exposure and radiation sensing as well. The modification of the tag can involve integration of chemiresistive sensing materials by drawing or dropcasting onto the surface of the tag. Depending on the design, the tag can become readable or unreadable when exposed to vapors of chemicals or physical stimulus.

A stimulus can include an analyte. The stimulus can include a vapor, a gas, a liquid, a solid, a temperature change, heat energy exposure and so on. The stimulus can include an ethylene, a mold, an acid, a ketone, a thiol, an amine, and so on. Using RFID, a stimulus can be detected; for example, vapors of nitric acid and cyclohexanone can be detected; and ethylene and mold can be detected; and biological warfare agents can be detected. Cumulative exposure of analytes can be detected and quantified with a dosimeter.

A stimulus can include a physical stimulus. The physical stimulus can include light, heat, or radiation. Using RFID, a stimulus can be detected for example, exposure of a tag to heat can be detected; and radiation and light can be detected. Cumulative exposure of physical stimulus can be detected and quantified with an RFID dosimeter.

A sensing material can produce detectable change in resistance and/or capacitance upon chemical, biological, or physical changes around the sensing device. A property of a sensing material that can change upon exposure to the environment includes, but is not limited to, change in capacitance, change in resistance, change in thickness, change in viscoelasticity, or a combination thereof.

A sensing material can include a metal, an organic material, a dielectric material, a semiconductor material, a polymeric material, a biological material, a nanowire, a semiconducting nanoparticle, a carbon nanotube, a carbon nanotube network, a nanofiber, a carbon fiber, a carbon particle, carbon paste, or conducting ink, or combination thereof.

Different approaches can be taken to introduce chemical and physical sensing materials. For example, sensing materials can be introduced into two different locations within a commercial RFID tags. Sensing materials include variable resistors that alter their resistance in response to a stimulus. A stimulus can be a chemical stimulus, a physical stimulus, a biological stimulus, etc. The detection of a stimulus can be achieved by switching the tag between a "readable" and "not readable" state, by exposure to a stimulus, such as chemical vapors or changes in temperature or heat energy exposure, for example.

When a stimulus contacts or interacts with a sensor, the resistivity can change. The contact or interaction can produce a readable signal in a hand held frequency reader as a result of the resistivity change. Alternatively, the contact or interaction can turn off a readable signal in a hand held frequency reader as a result of the resistivity change. Output can be detected after the output is shifted by detection of the stimulus. Even after going through a physical object, the output can still be detected. Detecting the stimulus is not limited to the frequency output, but can include, but is not limited to, a change in frequency, a change in q factor, a change in bandwidth, and a combination of these. These changes can result in increasing or decreasing the power transferred between the reader and radio frequency identification tag. Increasing or decreasing the power transferred between the reader and radio frequency identification tag can result in a change of the readout of the tag.

In one approach, a specific electric connection within an RFID tag can be disrupted, for example by cutting, and this connection can be reestablished by deposition of a chemiresistive sensing material by either drawing or dropcasting. An RFID tag can include an integrated circuit (IC) containing magnetic memory material where the tag identification is stored. Depending on the sensing material and the stimulus, the tag can become readable and is classified as a "turn ON sensor," or become unreadable and is classified as a "turn OFF sensor".

In one method, the tag is not readable by a reader when no stimulus is present, because the resistance of the sensor is too high. When the tag is placed in the presence of a stimulus that causes the sensor to change its resistance, the tag can become readable once the resistance value crosses a threshold value. This is a turn-on sensing method.

In another method, the tag can be readable by a reader when no analyte is present, because the resistance of the sensor is high enough to allow current to flow through the integrated circuit. When the tag is placed in the presence of a stimulus that causes the sensor to change its resistance, the tag can become unreadable once the resistance value drops below a certain threshold value. This is a turn-off sensing method.

In another method, instead of a turn-on sensing or a turn-off sensing, a series of data can be collected, which can provide a quantitative analysis of a stimulus.

In another method, parallel integration can be used to integrate a sensing material into a portion of the tag containing the integrated circuit by drawing or dropcasting. This approach can "turn ON" or "turn OFF" detection of a stimulus, and can be complimentary to the first approach because requirements for resistance of the deposited sensing material can be different (which may have an effect on the dynamic range and the detection limit of chemical sensors towards different analytes).

A radio frequency identification tag does not have to require a power source. RFID tags can be either passive, active or battery-assisted passive. An active tag has an on-board battery and periodically transmits its signal. A battery-assisted passive has a small battery on board and is activated when in the presence of a RFID reader. A passive tag has no battery.

When detecting a stimulus comprising detecting an output from a radio frequency identification tag including a sensor portion, the stimulus does not have to contact or interact with the entire surface of the tag. The sensor portion has a surface area less than the surface area of the radio frequency identification tag. The sensor portion can be located on a portion of a surface of the radio frequency identification tag, and the stimulus can contact a portion of the surface of the radio frequency identification tag. In addition, the sensor portion can have multiple sensing locations, and a single tag can be used to detect more than one stimulus.

A system for detecting a stimulus comprising a radio frequency identification tag can include a sensor portion, the sensor portion configured to change resistivity when the radio frequency identification tag contacts or interacts with the stimulus, whereby the resistivity change alters an output of the radio frequency identification tag, and a detector detecting the output from the radio frequency identification tag. The detector can include a reader. The reader can include a hand held frequency reader. A method of detecting a stimulus can include detecting an output from a radio frequency identification tag including a sensor portion.

The system can include a real time sensor. The system can include a dosimeter, such as a radiation dosimeter, a chemical warfare agent dosimeter, or an analyte dosimeter, such as, for example, an ethylene dosimeter, a sulfur dosimeter, or an ozone dosimeter. The system can be used to monitor pollutants or chemicals relevant to occupational safety. Pollutants or chemicals can include fumes from automotive/equipment exhaust, volatiles from manufacturing, painting, or cleaning, or vapors in underground mines.

A sensor can include an electronic circuit comprising electronic components. Electronic components can include resistors, transistors, capacitors, inductors and diodes, connected by conductive wires or traces through which electric current can flow. The electrical connection within the radio frequency identification tag can be altered. The resistivity of the sensor can change when the sensor is exposed to a stimulus. Contacting or interacting with a stimulus can close the circuit or open the circuit, or otherwise alter the properties of the circuit.

A sensor can include a sensing material such as a metal, an organic material, a dielectric material, a semiconductor material, a polymeric material, a biological material, a nanowire, a semiconducting nanoparticle, a carbon nanotube, a nanofiber, a carbon fiber, a carbon particle, carbon paste, or conducting ink, or combination thereof. A sensing material can include organic electronics materials, doped conjugated polymers, or inorganic materials. A sensing material can include biological molecule receptors, living cells, antibodies, aptamers, nucleic acids, functionalized biological molecules, or other biologically relevant moieties.

A tag for detecting a stimulus comprising a radio frequency identification tag can include a sensor portion, the sensor portion configured to change resistivity when the radio frequency identification tag contacts or interacts with the stimulus, whereby the resistivity change alters an output of the radio frequency identification tag, wherein the sensor portion includes a circuit, and wherein the sensor portion is configured to close the circuit or open the circuit when contacted or having interacted with the stimulus. The tag can be worn as a badge for occupational health and safety personnel, military personnel, etc., detecting a hazardous analyte or radiation.

A tag can include a substrate material. The substrate can include paper, plastic, a polymer, a metal, a metal oxide, a dielectric material, wood, leaves, skin, tissue, and so on. The substrate can include a metal oxide material. The substrate can be flexible; the substrate can be flat. The tag can also be embedded inside other objects (e.g., inside a capsule or a wall) or inside living systems (e.g., implanted inside a body).

A tag can include an antenna, providing a link between a frequency reader and a tag, receiving and transmitting a signal, and serving as a conduit that moves data back and forth. The antenna can include coils surrounding a sensor; the antenna can include a dipole antenna. A tag can include an antenna group including a plurality of antennas or an antenna array.

The ability to easily detect the existence of an analyte on a base signal using an ON/OFF binary detection method is of increasing interest in today's society. A system using a portable reader, such as a smartphone, enables everyone to determine the status of certain analytes anywhere without complicated analysis of a signal. When the amount of an analyte changes, a handheld frequency reader can turn on or turn off a signal, sending a notification of the presence or absence of the analyte. Another advantage of using a smartphone is that it carries within it many additional capabilities that can be coupled with chemical sensing to increase utility. For instance, a smartphone reader can identify a chemical spill and immediately send an emergency text or email alert identifying position of a spill using GPS. Another example could be wireless networks that monitor spatiotemporal changes in concentrations of chemical emissions and send emergency alerts when safe thresholds are exceeded. Coupling of such capabilities can enable unprecedented utility of chemical sensors in everyday life.

A tag can serve as a binary logic element providing either a "1" or a "0" as pre-defined by functional sensor material, which offers advantages in terms of simplicity of implementation and does not require any sophistication by the end user. If viewed as a binary logic element, the tag could be used in further elaborations of that logic. For instance, a unique combination of the readout of multiple tags could be assigned to a specific meaning. For example, if three separate tags are "coded" for three separate analytes by virtue of the sensor materials used to make them, then 2^3 possible combinations exist, which could each mean something unique and significant. For example, if those analytes were food related, then one could possibly determine which type of food the sensors are attached to based on a combination of tag read-out, within a certain probability. Another example would be three tags that are "coded" with the same sensor material that has been designed to react at different concentrations of analyte. The combination of tag readout would allow one to determine, within some margin of error, the concentration of the analyte of interest.

The binary on/off readability of CARDs by the smartphone can be a powerful approach for converting analog physical inputs (presence or absence of a chemical vapor within a defined threshold) into a digitized output (1 and 0, respectively) that conveys meaningful information about the local chemical environment of the CARDs. The advantage of a binary-readout is that it is the simplest possible output representation of input information, and hence allows modular multiplexing of different CARD combinations. This analytical approach has practical limitations in its implementation; however, it may be particularly useful in resource-constrained scenarios or high throughput applications where information about the presence or absence of specific chemicals at specified thresholds is critically important. Such applications may include detection of an acceptable threshold (e.g., permissible exposure limit for a chemical) that provides valuable actionable information in dynamic, complex environments (e.g., chemical release within a public space). Even under circumstances wherein the chemical of interest can be readily detected by the human nose, a differentiating feature of a smartphone-based sensing strategy over human-olfactory detection or visual inspection of a colorimetric test is the ability to efficiently bring sensed information into the information technology infrastructure.

An inexpensive, simple, rapid, and modular approach for converting commercially available NFC tags into chemically actuated devices can communicate with a smartphone via radio waves. This approach enables electronic wireless, non-line-of-sight detection and discrimination of gases and vapors at part-per-million and part-per-thousand concentrations. This technology provides binary ("on"/"off") information about the presence or absence of a chemical analyte regarding designated concentration thresholds, (e.g., NIOSH STEL) within the local environment of the sensor tag, and is capable of differentiating multiple concentrations of one analyte or multiple analytes using multi-tag logic. The general sensing strategy involving wireless communication between NFC tags and smartphones is modular and can be generalized to incorporate many types of chemiresponsive materials to enable selective detection of diverse chemical changes. Nevertheless, the significant challenges that remain to realize the full potential of this wireless sensing approach includes: (i) chemical and materials science innovations to improve the sensitivity and selectivity of chemiresponsive materials to chemical analytes; (ii) improving device-to-device performance reproducibility by advancing the state-of-the-art of nanostructured carbon deposition techniques and; (iii) enabling continuum measurement CARD readout capabilities. The combination of chemical sensing with other capabilities within the smartphone (e.g., GPS) may enable additional utility in applications involving tracking and tracing. As a result of the portability and increasingly ubiquitous use of smartphones and mobile devices, this platform can enable applications in personalized and widely distributed chemical sensing wherein the acquisition of chemical or physical information was previously unattainable.

A chemically-degradable polymer is a polymer whose disassembly can be triggered by an interaction with a stimulant or analyte. In certain embodiments, the stimulant can be an analyte.

A supramolecular polymer is a polymer whose monomeric units hold together via highly directional and reversible non-covalent interactions. In certain embodiments, the non-covalent interactions can be hydrogen bonding, π-π interactions, or metal coordination-based interactions. In certain embodiments, the supramolecular polymer can be one-dimensional, two-dimensional or three-dimensional.

A metallo-supramolecular polymer is a polymer whose monomeric units hold together by metal coordination-based interactions.

Disclosed herein is a tag for detecting an analyte including a radio frequency identification tag including a sensor portion, the sensor portion configured to change resistivity when the radio frequency identification tag contacts or interacts with an analyte, whereby the resistivity change alters an output of the radio frequency identification tag, wherein the sensor portion includes a circuit, and wherein the sensor portion is configured to activate the circuit or deactivate the circuit when contacted or having interacted with the analyte, where the sensor portion includes a conductive material associated with a chemically-degradable polymer. In certain embodiments, the conductive material can include carbon nanotubes, graphene, metal oxides, or metal-organic-framework.

In certain embodiments, the chemically degradable polymer can include a ligand and a metal ion. The ligand can be a multi-dentate ligand capable of binding to two or more metal ions. In certain embodiments, the chemically degradable polymer can include a metallo-supramolecular polymer. In certain embodiments, single walled carbon nanotubes (SWCNTs) can be wrapped with metallo-supramolecular polymers for sensory devices with a dosimetric (time- and concentration-integrated) increase in electrical conductivity that is triggered by electrophilic chemical substances such as diethylchlorophosphate, a nerve agent simulant. The mechanism of this process involves the disassembly of the supramolecular polymer. It can be used in a wireless inductively powered sensing system based on near field communication technology (NFC). Specifically, the dosimeters can be powered and read wirelessly with conventional smartphones to create sensors with ultra-trace detection limits.

In certain embodiments, a chemical dosimeter can include SWCNTs wrapped with a metallo-supramolecular polymer (MSP) that displays large, time- and concentration-integrated chemiresistive responses via MSP disassembly triggered by analyte molecules. In this system, supramolecular polymers (see Aida, T.; Meijer, E. W.; Stupp, S. I. *Science* 2012, 335, 813-817, Wojtecki, R. J.; Meador, M. A.; Rowan, S. J. *Nat. Mater.* 2011, 10, 14-27, Whittell, G. R.; Hager, M. D.; Schubert, U. S.; Manners, I. *Nat. Mater.* 2011, 10, 176-188., and Yang, L.; Tan, X.; Wang, Z.; Zhang, X. *Chem. Rev.* 2015, 115, 7196-7239, each of which is incorporated by reference in its entirety) can wrap and isolate CNTs and disassemble in response to chemical stimuli.

Wrapping of SWCNTs with chemically-degradable polymers is a powerful strategy for the development of advanced chemiresistive dosimetric sensors. The choice of the supramolecular polymer is crucial to these designs and the polymer must generate stable dispersions that can be used to create solid composites that prevent low resistivity inter-SWCNT contacts. After disassembly, the molecules must release the SWCNTs and not quench their conductivity to generate low resistivity networks with low resistivity inter-SWCNT junctions. Additional families of highly sensitive chemiresistive dosimeters can be created based on this concept.

SWCNT wrapped with MSPs can display large time- and concentration-integrated chemiresistive responses as a result of a triggered disassembly of the MSPs induced by strong electrophiles such as DECP and $SOCl_2$. Various approaches including ligand design, selection of metal ions, and optimizing SWCNT dispersion conditions are demonstrated to be effective to increase sensitivity to harmful analytes. Demetallation (disassembly) of the MSP degrades the SWCNT wrapper, thereby decreasing inter-SWCNT resistance at junctions, resulting in large (>1,000%) increases in conductivity. The highly sensitive and irreversible chemiresistive chemical responses enable wireless chemical sensing with NFC technology.

This system is specifically targeted for strong electrophilic analytes such as diethylchlorophosphate (DECP, a reactive simulant of nerve agents) and thionyl chloride ($SOCl_2$, a reactive simulant of pulmonary agents). Critical to the design of this chemical dosimeters is the creation of a system wherein the cooperative interactions of MSP are capable of effectively dispersing SWCNTs and maintaining them in an insulated, highly resistive state, while the MSP monomers alone interact sufficiently weakly with SWCNTs such that they are ineffective at creating a dispersion. With these conditions established, triggered disassembly of the MSP can generate a conductive network with strong SWCNT-SWCNT interactions. The large and irreversible chemiresistive response associated with this process can be easily detected and this feature can illustrated using a commercial smartphone and modified near-field communication (NFC) tags to create a wireless system to detect harmful electrophiles.

Figure 1C:
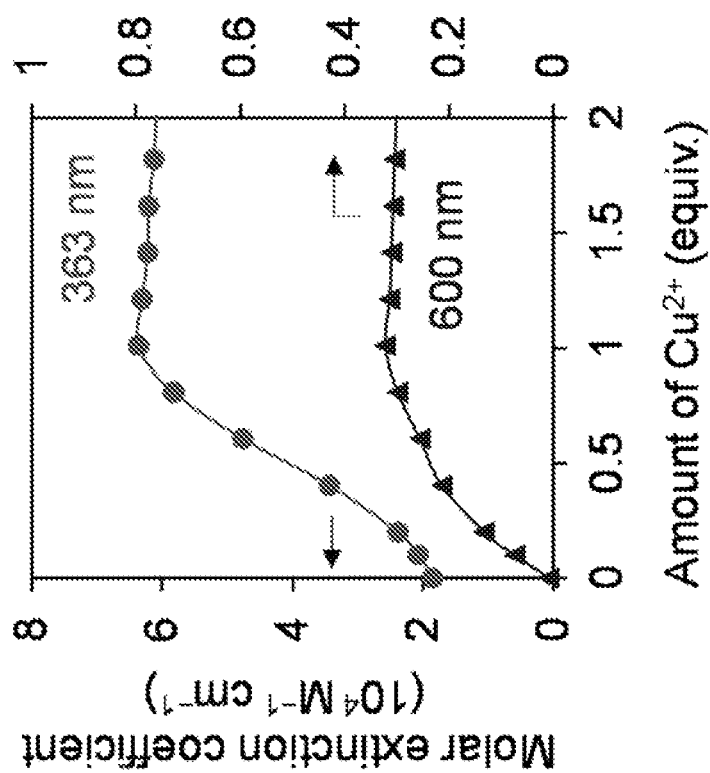
Figure 1B:
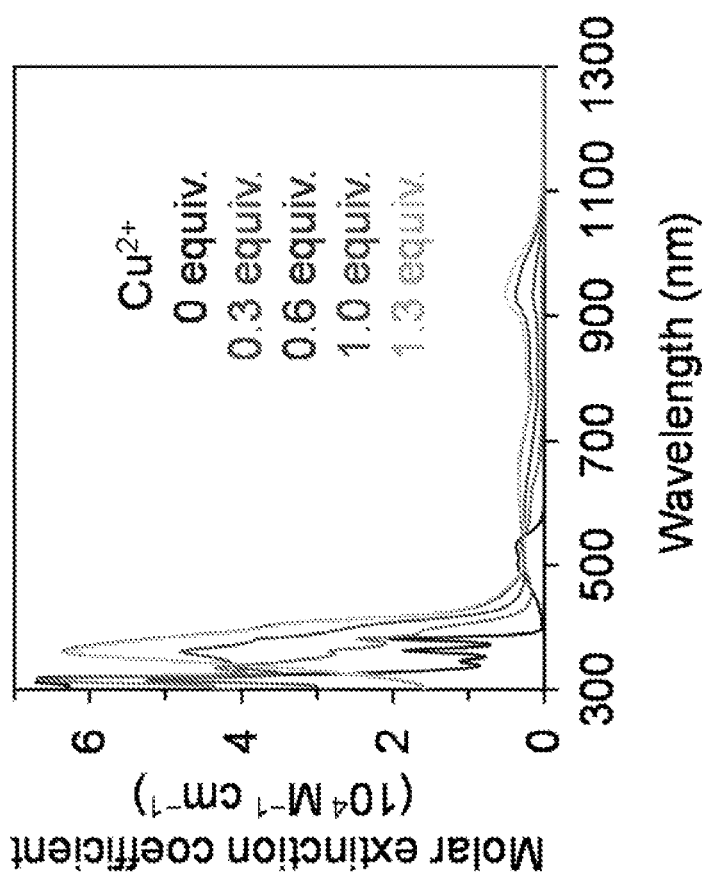
Figure 1D:
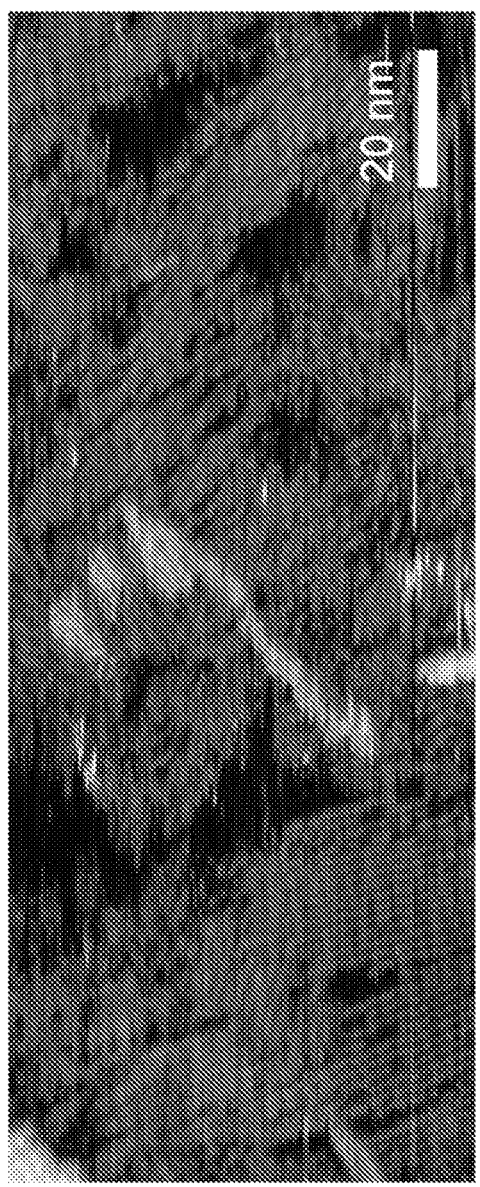
Figure 20:
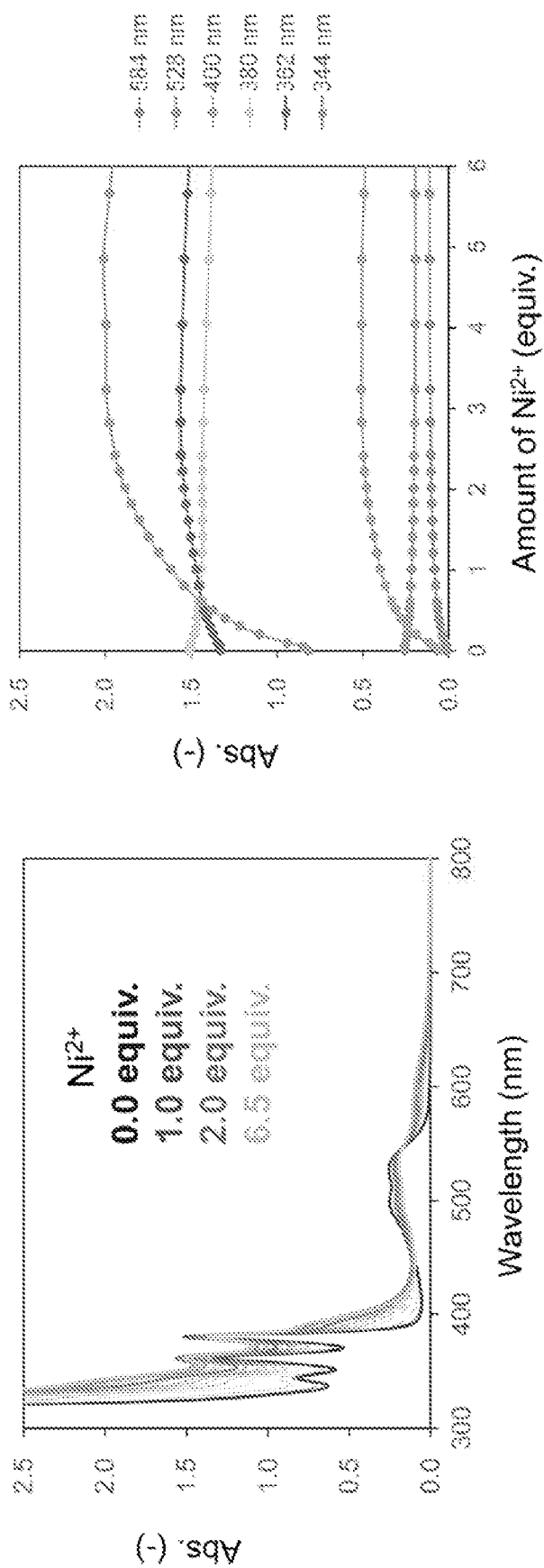
FIG. 20 shows titration of AL with $Ni^{2+}$.
Figure 21A:
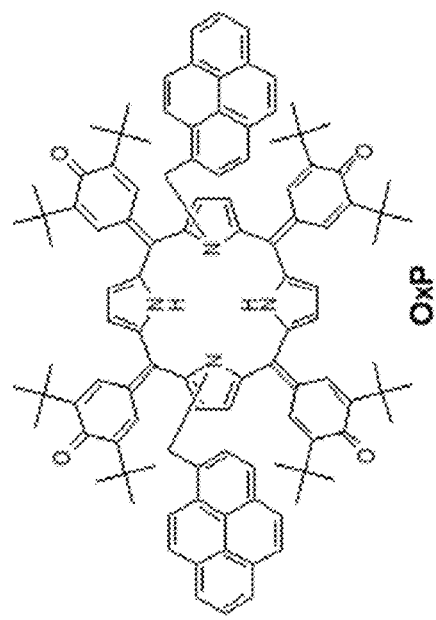
FIG. 21A shows chemical structures of compounds used for gel permeation chromatography (GPC) experiments.
Figure 21A:
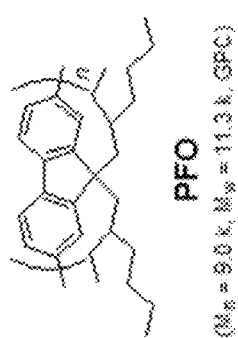
Figure 21A:
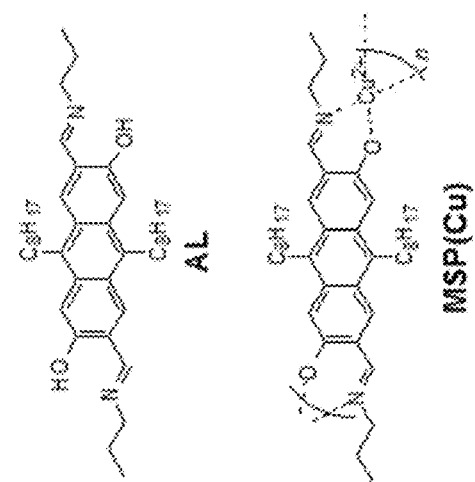
Figure 21B:
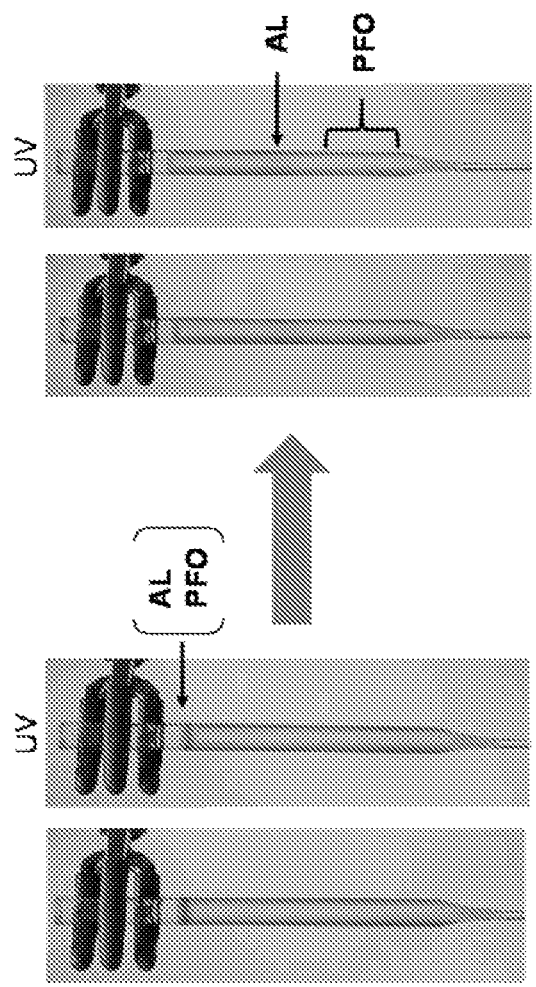
FIG. 21B shows GPC experiments for the mixtures of AL and PFO.
Figure 21C:
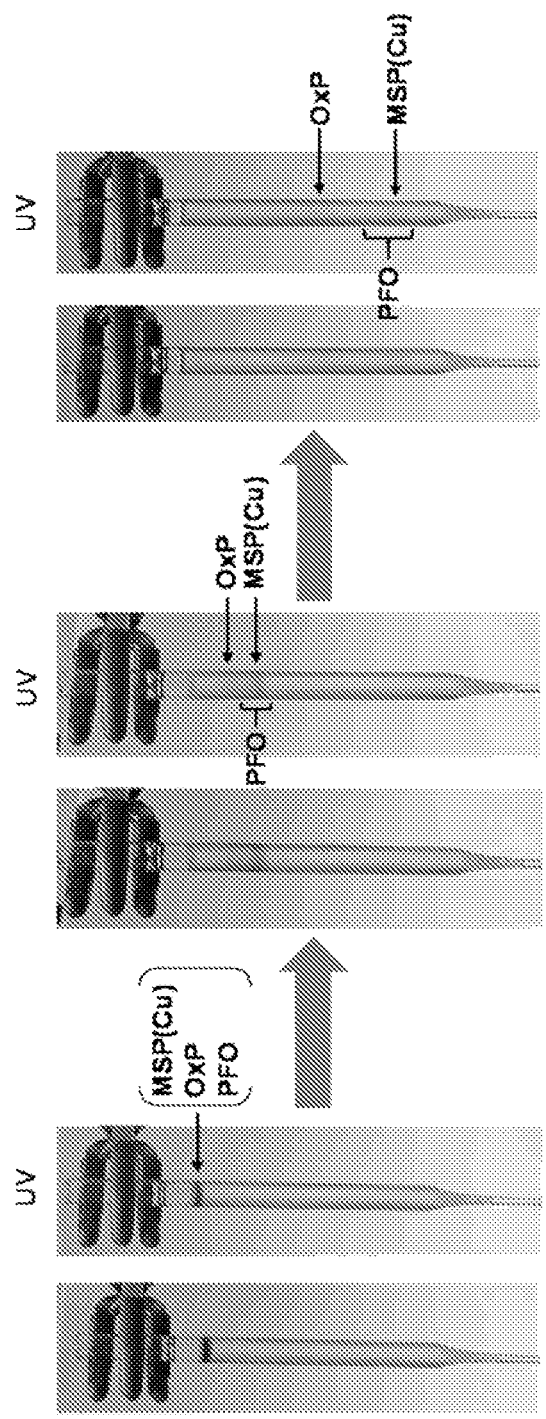
FIG. 21C shows GPC experiments for the mixtures of MSP(Cu), PFO, and OxP.

Formation of MSP. Polarizable polycyclic aromatic molecules exhibit strong van der Waals interactions with SWCNTs, and as a result anthracene-based ligands (AL) was chosen shown in FIG. 1A to produce dispersions. The anthracene core is substituted with two n-propyl salicylaldimine motifs, which are expected to form a square planar complex with $Cu^{2+}$ or $Ni^{2+}$ ions. See Sacooni, L.; Ciampolini, M. *J. Chem. Soc.* 1964, 276-280, and Chakravorty, A.; Fennessey, J. P.; Holm, R. H. *Inorg. Chem.* 1965, 4, 26-33, each of which is incorporated by reference in its entirety. Two n-octyl chains were added to the 9,10-positions of the anthracene to solubilize the SWCNT dispersion. The ability of this ligand to be converted into a ladder polymer with transition metal linkages was studied by titration with $Cu^{2+}$ or $Ni^{2+}$ ions. The UV-Vis absorption of AL varied upon addition of $Cu^{2+}$ and abruptly saturated with one equivalent of $Cu^{2+}$ (FIGS. 1B and 1C). FIGS. 1B and 1C show UV-Vis titration experiments of AL (7.0×10$^{-5}$ M, o-DCB/methanol=9/1) with Cu(AcO)$_2$·H$_2$O (10.6×mM, methanol) at room temperature. The optical path length was 10 mm. This result indicates that salicylaldimine units strongly coordinate Cu$^{2+}$, yielding MSP(Cu). In contrast, the Ni$^{2+}$ titration curve with AL lacked a clear saturation point (FIG. 20), suggesting that MSP(Ni) is oligomeric in solution. In FIG. 20, UV-Vis titration experiments of AL (7.0×10$^{-5}$ M, toluene/methanol=2/1) with Ni(AcO)$_2$·4H$_2$O (10.6 mM, methanol) at room temperature. Optical length was 10 mm. Gel permeation chromatography experiment reveals that MSP (Cu) displays a radius of gyration that is comparable to that of π-conjugated polymer with M$_n$=9.0 k, thereby confirming that MSP(Cu) is approximately 15-mers on average (FIGS. 21A-21C). FIG. 21A shows chemical structures of compounds used for gel permeation chromatography (GPC) study using Bio-Beads S-X1 (eluent: o-DCB). FIG. 21B shows GPC experiments for the mixtures of AL and PFO, and clearly indicates that elution time of AL is slower than that of PFO. PFO was prepared by Ni(0)-catalyzed cross-coupling polymerization of 9,9-Di-(2'-ethylhexyl)-2,7-dibromofluorene. See Yang, Y.; Pei, Q.; Heeger, A. J. *J. Appl. Phys.* 1996, 74, 934-939, which is incorporated by reference in its entirety. FIG. 21C shows GPC experiments for the mixtures of MSP(Cu), PFO, and OxP. See Hill, J. P.; Ariga, K.; Schumacher, A. L.; Karr, P. A.; D'Souza, F. J. Porphyr. Phthalocyanines 2007, 11, 390-396, which is incorporated by reference in its entirety. Elution time of MSP(Cu) is faster than that of OxP, and comparable to that of PFO. Note that MSP(Cu) made from 0.5:0.5:1.0 mixture of ALOx, AL, and Cu$^{2+}$ (by mole) demonstrated similar results in the GPC experiments. The polymeric structure of MSP(Cu) was also confirmed by assembling it on a graphite surface and imaging by scanning tunneling microscope (STM). As shown in FIG. 1D, these studies revealed linear and rod-like assemblies of MSP (Cu) with domain size of 10-50 nm, corresponding to 10-50 mers.

Figure 2A:
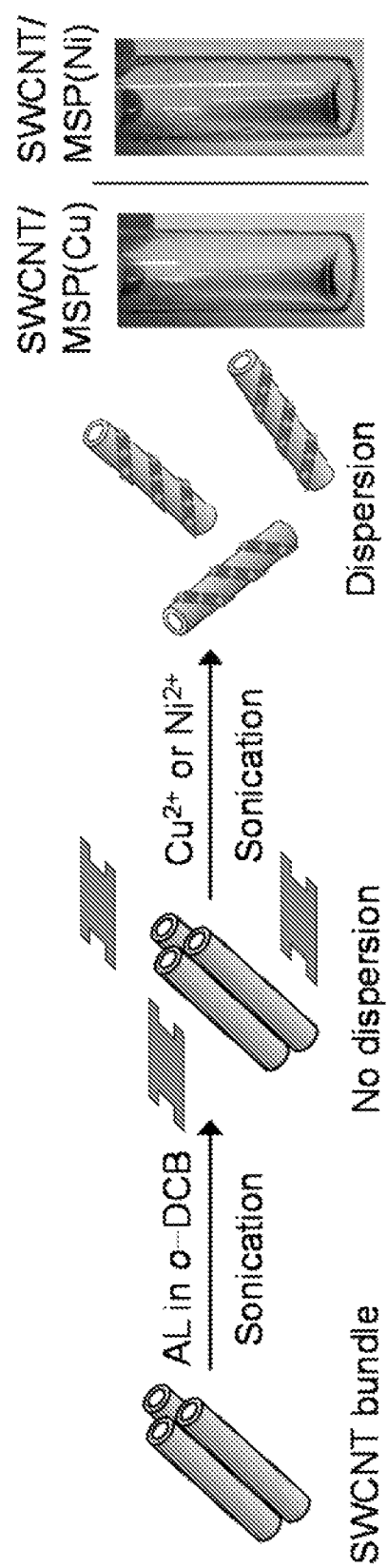
Figure 22A:
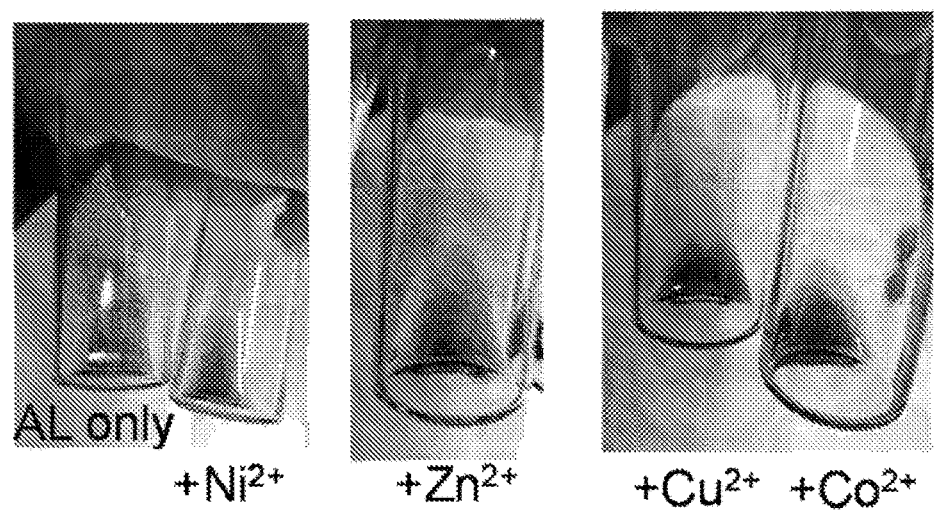
FIG. 22A shows dispersion of SWCNT by metal ligand complexes of AL.
Figure 22B:
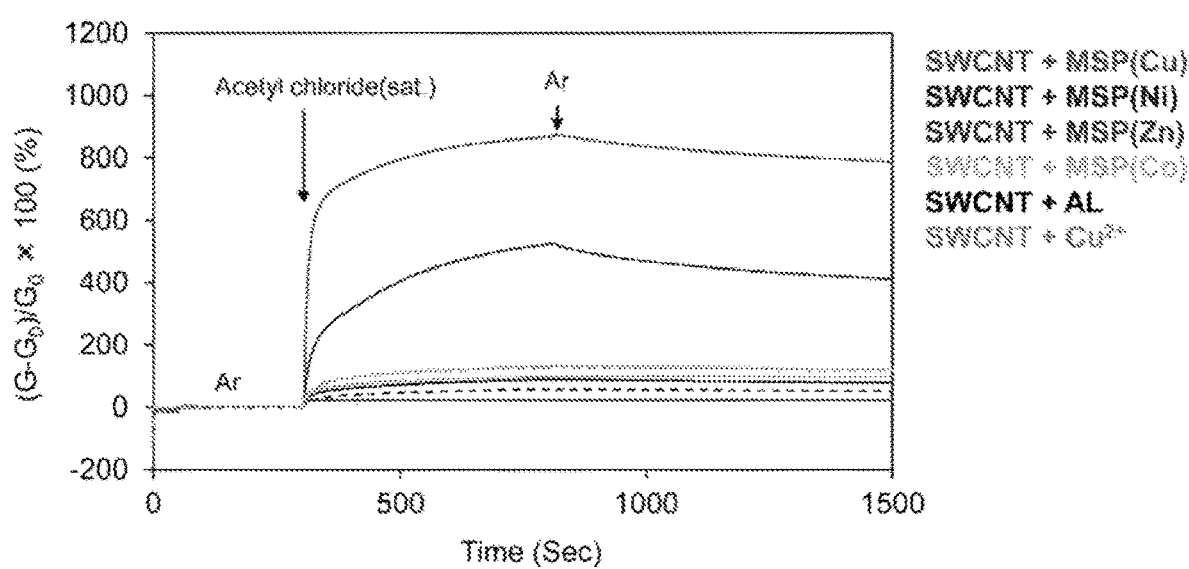
FIG. 22B shows chemiresistive response of SWCNT+MSP sensors upon exposure to saturated acetyl chloride.

Wrapping SWCNT with MSP. A key element of the design is that the monomers are not sufficient to disperse SWCNTs, but that the collective properties of the supramolecular polymer create a highly stable dispersion. See Toshimitsu, F.; Nakashima, N. *Nat. Commun.* 2014, 5, 5041, and Llanes-Pallas, A.; Yoosaf, K.; Traboulsi, H.; Mohanraj, J.; Seldrum, T.; Dumont, J.; Minoia, A.; Lazzaroni, R.; Armaroli, N.; Bonifazi, D. *J. Am. Chem. Soc.* 2011, 133, 15412-15424, each of which is incorporated by reference in entirety. AL meets these criteria and is not capable of forming stable SWCNT dispersions in o-dichlorobenzene (o-DCB), however with sonication (5 min) in the presence of Cu$^{2+}$ or Ni$^{2+}$ ions homogeneous stable SWCNT dispersions are created (FIG. 2A). In FIG. 2A, equal equivalents of Cu(AcO)$_2$·H$_2$O or Ni(AcO)$_2$·4H$_2$O in methanol (10.6 mM, 82 μL) and AL (0.5 mg) in o-DCB (1 mL) are combined with SWCNTs (0.1 mg), and then sonicated for 5 min. In contrast, similar procedures complexing AL with Zn$^{2+}$ and Co$^{2+}$ did not produce stable SWCNT dispersions, presumably due to the lack of square-planar configuration about the metal ion (FIGS. 22A-22B). FIG. 22A shows dispersion of SWCNT by metal ligand complexes of AL. AL itself is not capable of dispersing SWCNT. Addition of Ni$^{2+}$ and Cu$^{2+}$ (as acetate salts, 1 equivalent to AL) lead to homogeneous dispersion of SWCNT, while addition of Zn$^{2+}$ and Co$^{2+}$ did not work for dispersion of SWCNT. FIG. 22B shows chemiresistive response of SWCNT+MSP sensors upon exposure to saturated acetyl chloride. Mixing ratio of AL and SWCNT was fixed to 5:1. Amount of metal ion is 1 molar equivalent to AL. Fixed parameters: SWCNT (0.02 mg), o-DCB (0.2 mL). Only MSP(Cu) and MSP(Ni) demonstrated large response to acetyl chloride. This result strongly suggests that homogeneous dispersion (wrapping) of SWCNT is a key for sensing response.

Figure 23A:
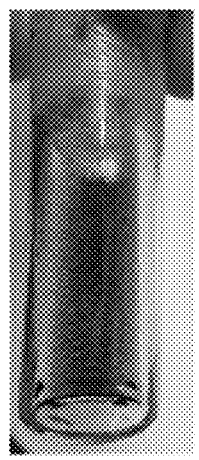
FIG. 23A shows mixture of SWCNT by DSA(Ni) in o-DCB after sonication.
Figure 23B:
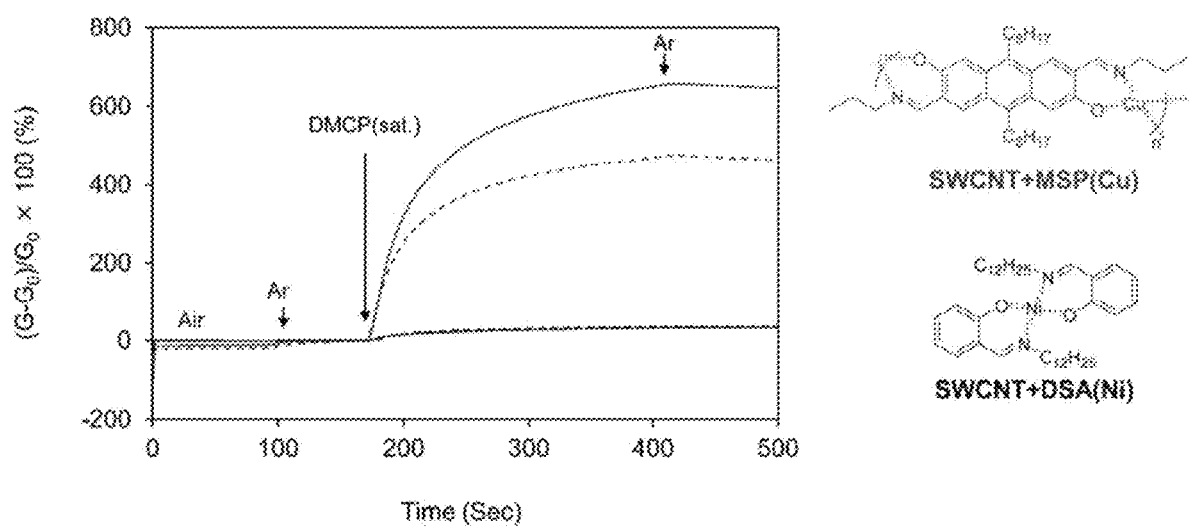
FIG. 23B shows chemiresistive response of SWCNT mixed with DSA(Ni) upon exposure to saturated DMCP.

To determine if small molecule square planar metal complexes are sufficient, Ni$^{2+}$ complex of n-dodecylsalicylaldimine (DSA(Ni)) was investigated, which has an established square planar structure (see Chakravorty, A.; Fennessey, J. P.; Holm, R. H. Inorg. Chem.1965, 4, 26-33, which is incorporated by reference in its entirety) and find that this monomeric system is incapable of producing stable SWCNT dispersions (FIGS. 23A-23B). FIG. 23A shows mixture of SWCNT by DSA(Ni) in o-DCB after sonication for 30 min. DSA(Ni) is not capable of dispersing SWCNT. FIG. 23B shows chemiresistive response of SWCNT mixed with DSA(Ni) upon exposure to saturated DMCP. Mixing ratio of DSA(Ni) and SWCNT was 5:1. Fixed parameters: SWCNT (0.02 mg), o-DCB (0.2 mL).

Figure 24:
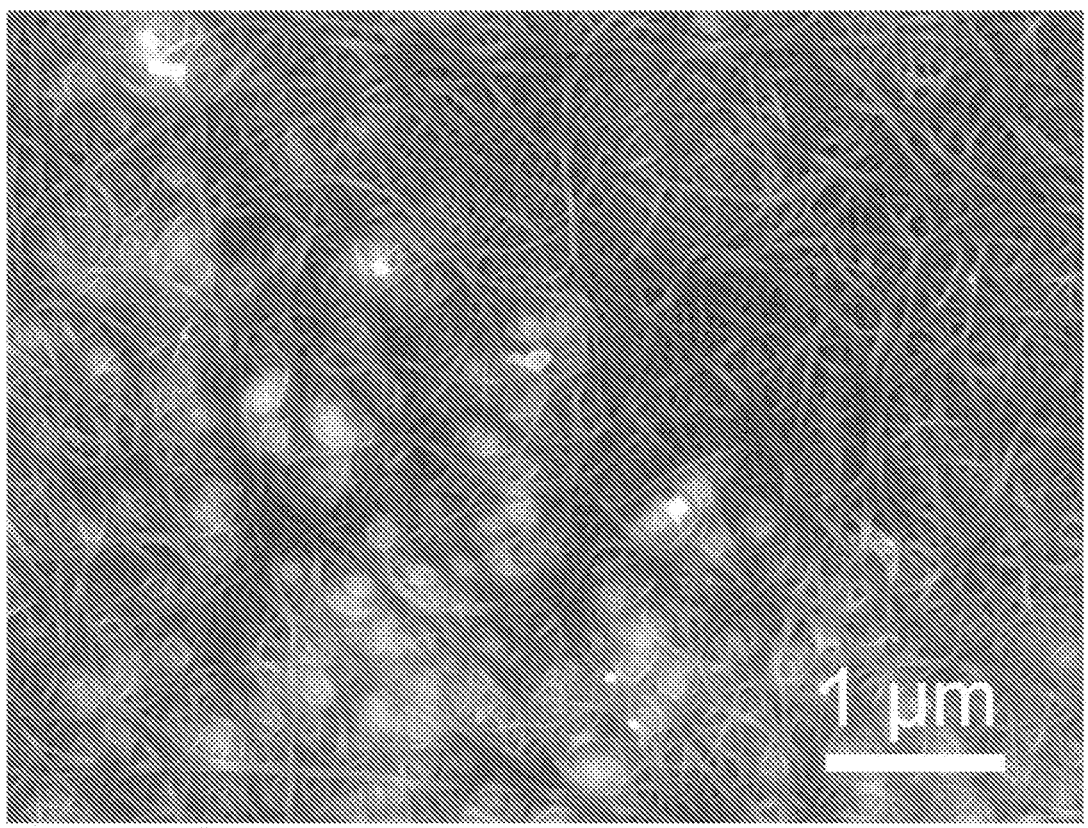
FIG. 24 shows an SEM image of pristine SWCNT.

As a result, it would appear that the MSP structure having square planar metal center, polarizable π electron system, and polymeric structure are collectively responsible for producing well behaved SWCNT dispersions. The quality of the dispersions is further confirmed by UV-Vis-NIR spectra of solutions of SWCNT/MSP(Cu) and SWCNT/MSP(Ni) that revealed well-resolved absorptions from E$_{11}$ transitions of SWCNT, which is indicative of isolated (debundled) SWCNTs (optical pathlength: 1 mm) (FIG. 2B). See Samanta, S. K.; Fritsch, M.; Scherf, U.; Gomulya, W.; Bisri, S. Z.; Loi, M. A. *Acc. Chem. Res.* 2014, 47, 2446-2456, which is incorporated by reference in its entirety. Scanning electron microscopy (SEM) images of SWCNT/MSP(Cu) drop-cast film revealed SWCNTs having more linear and narrow structures relative to pristine SWCNTs, also supporting the formation of isolated wrapped SWCNTs (FIGS. 2C and 24). In FIG. 2C, the concentration of SWCNT (0.1 mg/mL) was identical to that used to create networks for the sensing studies. In FIG. 24, pristine SWCNT sonicated in o-DCB was drop-cast on Si substrate. The assembly of isolated SWCNTs into random porous network structures facilitates the diffusion of analyte molecules into the film and the triggered generation of enhanced electronic conduction pathways via disassembly of the polymer wrappers.

Figure 3A:
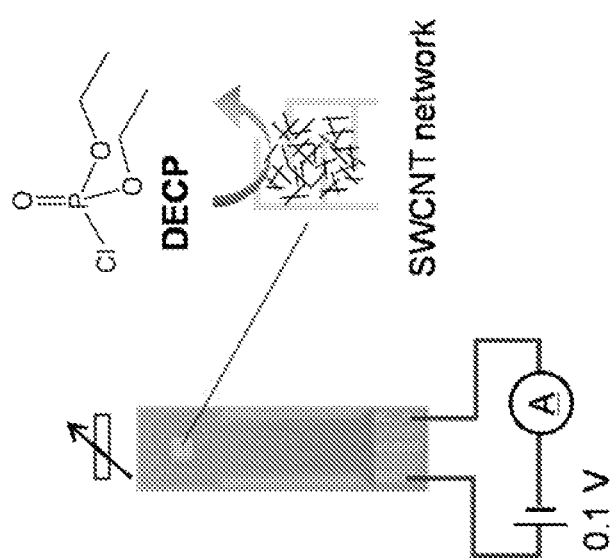
FIGS. 3A-3C show chemical sensing properties of SWCNT wrapped with MSP.

Sensing properties of SWCNT/MSP. Chemiresistive sensors were prepared by drop-casting 0.5 μL of SWCNT/MSP (Cu) or SWCNT/MSP(Ni) dispersions on interdigitated gold electrodes (0.2 mm gaps), and the variation in conductivity upon exposure to various types of analyte vapors, including DECP, is measured by detecting the current with an applied potential of 0.1 V (FIG. 3A). Only very small amounts of material are required to make a sensor and up to 4,000 sensors can be prepared from 1 mg of AL. The quality of the SWCNT dispersion enables high sensor fabrication reproducibility from batch-to-batch (Table 1). See Zhang, Y.; Xu, M.; Bunes, B. R.; Wu, N.; Gross, D. E.; Moore, J. S.; Zang, L. ACS Appl. Mater. Interfaces 2015, 7, 7471-7475, which is incorporated by reference in its entirety.

TABLE 1

Resistance of 9 sensors prepared by drop-casting 0.5 μL of SWCNT/MSP(Cu) dispersion in o-DCB on interdigitated gold electrodes (0.2 mm gap).

| Sample No. | Resistance (kΩ) |
| --- | --- |
| 1 | 19.26 |
| 2 | 18.22 |
| 3 | 20.58 |

TABLE 1-continued

Resistance of 9 sensors prepared by drop-casting 0.5 µL of SWCNT/MSP(Cu) dispersion in o-DCB on interdigitated gold electrodes (0.2 mm gap).

| Sample No. | Resistance (kΩ) |
|---|---|
| 4 | 13.61 |
| 5 | 24.67 |
| 6 | 22.38 |
| 7 | 35.01 |
| 8 | 37.23 |
| 9 | 30.42 |
| Average | 24.60 |
| Standard Deviation | 8.01 |

Figure 3B:
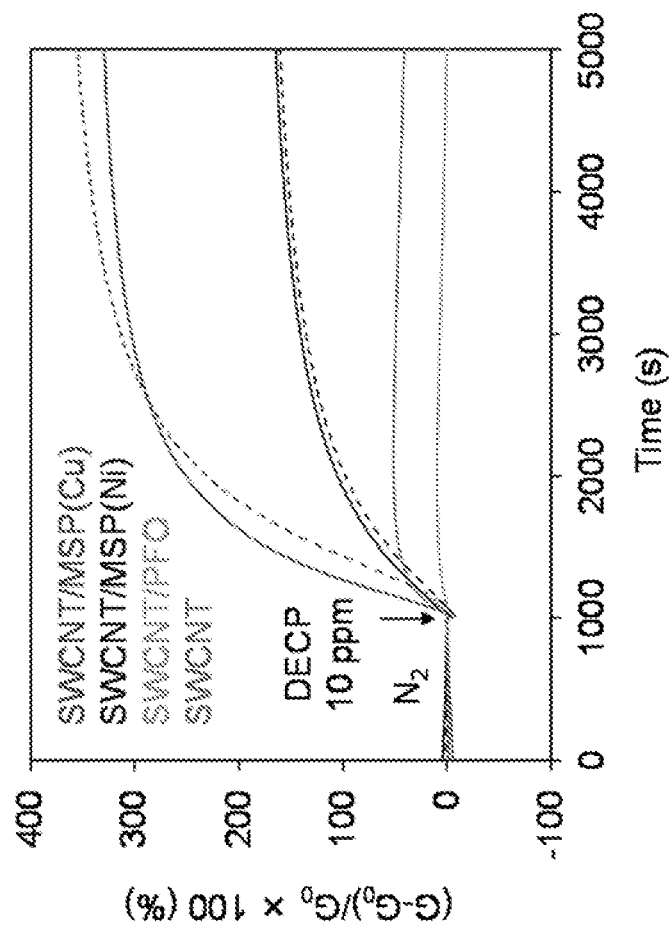
Figure 3C:
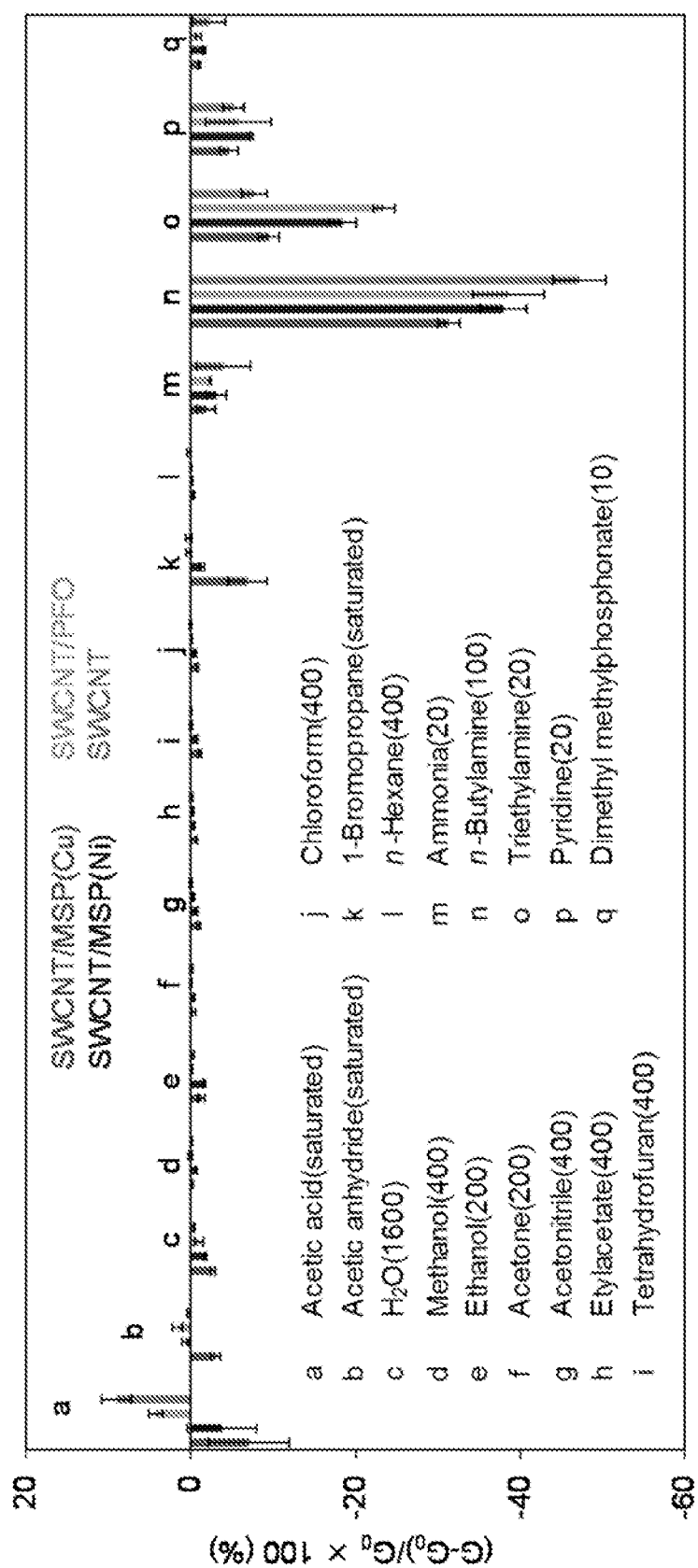

The SWCNT/MSP composites proved effective in generating high sensitivity to target analytes as shown in FIG. 3B. Specifically, SWCNT/MSP(Cu) and SWCNT/MSP(Ni) display large increases in conductivity upon exposure to 10 ppm DECP (in N2) when compared to the responses of sensors created with pristine-SWCNTs and SWCNTs wrapped by poly(9,9-di-n-octylfluorenyl-2,7-diyl) (PFO), which were prepared under the same conditions. Two samples of SWCNT/MSP were tested for confirming reproducibility (shown by solid and dotted line). Initial resistance of sensors were 15 kΩ-30 kΩ. PFO stabilized SWCNT dispersions have been studied previously were chosen as a non-responsive control material. See, Nish, A.; Hwang, J.-Y.; Doig, J.; Nicholas, R. J. Nat. Nanotech. 2007, 2, 640-646, which is incorporated by reference in its entirety. It is also noteworthy that SWCNT/MSP exhibits enhanced sensitivity to specific chemicals such as DECP, while responses to water as well as a number of common volatile organic compounds (VOCs) are much lower and similar what is observed for the pristine-SWCNT and SWCNT/PFO controls (FIG. 3C). FIG. 3C shows chemiresisitve responses of SWCNT-based chemiresistive sensors upon 50 s exposure to various vapors in $N_2$ (concentration in ppm given in parentheses). Chemiresisitve responses to these analytes were nearly saturated within 50 s. Moreover, in most cases, the response to non-target analytes is an increase in resistivity, consistent with swelling- or hole-quenching type transduction mechanism. See Fennell, J. F., Jr.; Liu, S. F.; Azzarelli, J. M.; Weis, J. G.; Rochat, S.; Mirica, K. A.; Ravnsbæk, J. B.; Swager, T. M. Angew. Chem. Int. Ed. 2016, 55, 1266-1281, which is incorporated by reference in its entirety. This is opposite that observed for DECP wherein the disassembly of the MSP wrapper generates lower resistance junctions between the SWCNTs.

Figure 25:
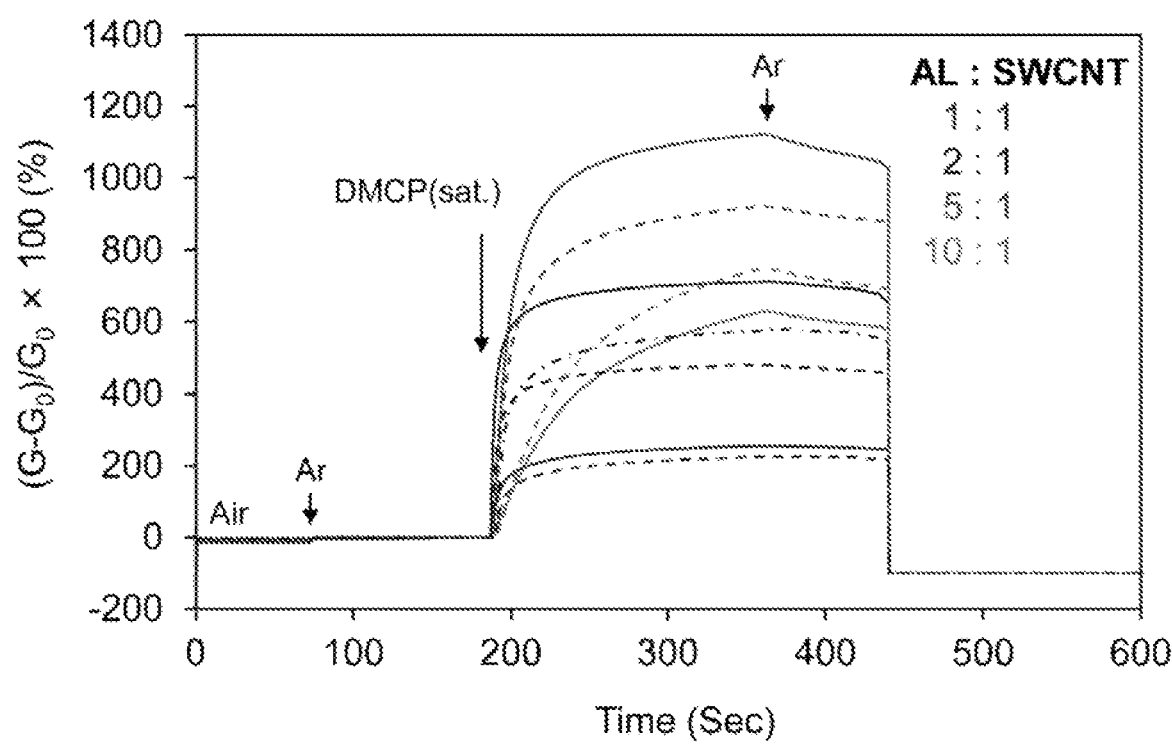
FIG. 25 shows chemiresistive response of SWCNT+MSP (Cu) sensors upon exposure to saturated DMCP.
Figure 26:
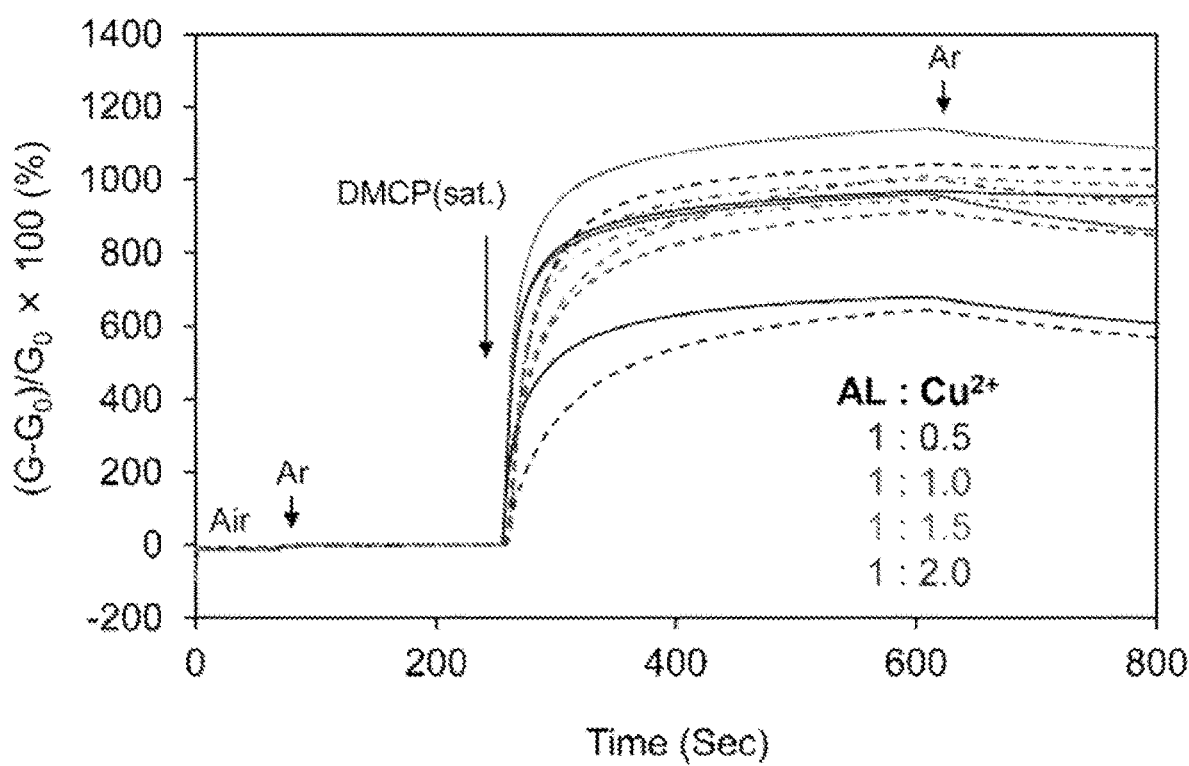
FIG. 26 shows chemiresistive response of SWCNT+MSP (Cu) sensors upon exposure to saturated DMCP.
Figure 27A:
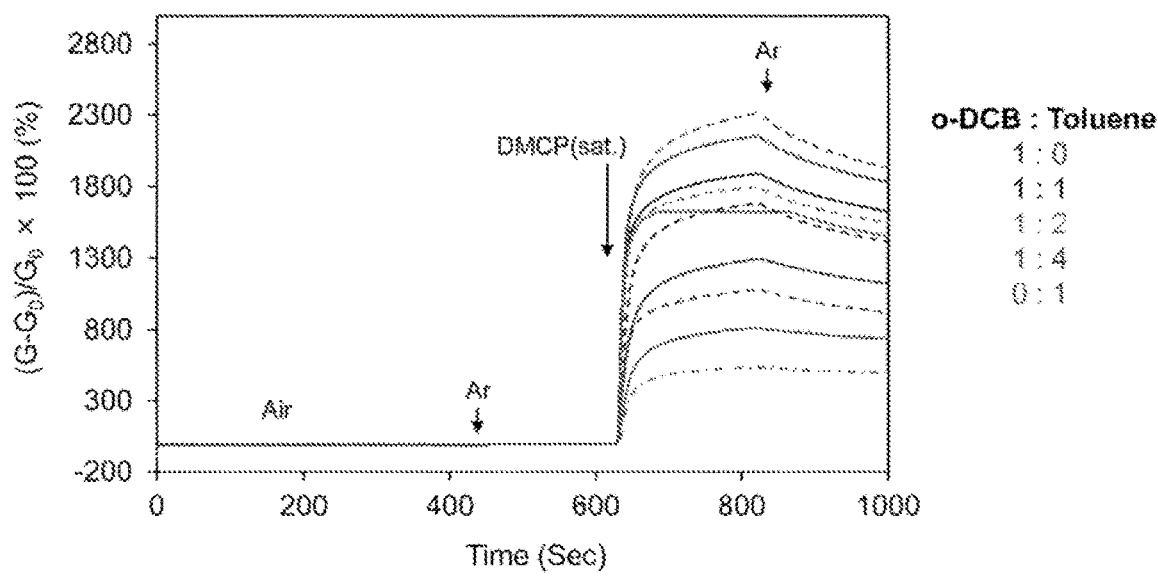
FIG. 27A shows chemiresistive response of SWCNT+MSP(Cu) sensors upon exposure to saturated DMCP.
Figure 27B:
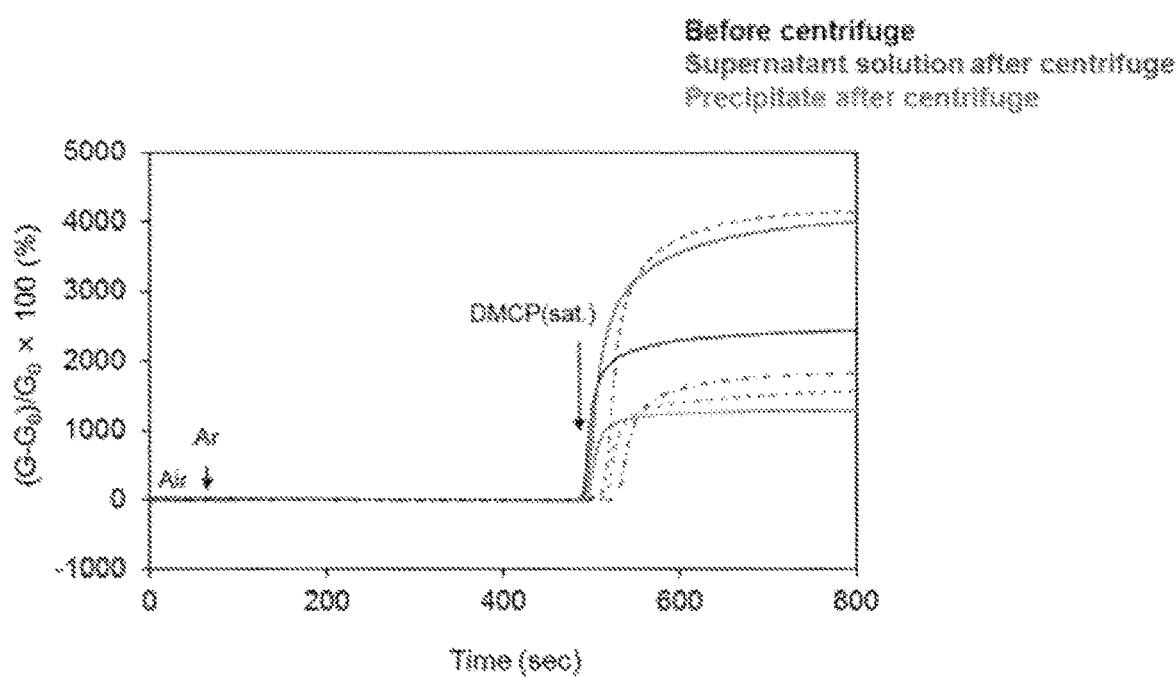
FIG. 27B shows chemiresistive response of SWCNT+MSP(Cu) sensors after applying centrifuge.

Optimization of SWCNT/MSP(Cu) sensor for enhanced response. The SWCNT/MSP(Cu) composition was optimized by monitoring the chemiresistive response to concentrated dimethylchlorophosphate (DMCP) vapor in dry argon (Ar). The 1:5 (by weight) mixture of SWCNT to MSP(Cu) displayed a higher response than 1:1, 1:2, and 1:10 mixtures (FIG. 25). Mixing ratio of AL and SWCNT (in weight) was varied as 1:1, 2:1. 5:1, and 10:1. 5:1 demonstrated the largest response. Fixed parameters: SWCNT (0.02 mg), o-DCB (0.2 mL), 1 equivalent $Cu^{2+}$ for AL. It is also found that the use of 0.5 eq. of $Cu^{2+}$ lead to lower response (FIG. 26), suggesting that complete polymerization of MSP is important to achieve the maximum response. Mixing ratio of AL and $Cu^{2+}$ was varied as 1:0.5, 1:1, 1:1.5, and 1:2, and 1:0.5 demonstrated reduced response. Fixed parameters: SWCNT (0.02 mg), AL (0.1 mg), o-DCB (0.2 mL). The change of solvent from o-DCB to a mixture of o-DCB and toluene (1:4 by volume) led to a twofold increase of the response to DMCP, and a further twofold increase was achieved when the supernatant of centrifuged solution was used (FIGS. 27A-27B). FIG. 27A shows chemiresistive response of SWCNT+MSP(Cu) sensors upon exposure to saturated DMCP. Mixed solvents of o-DCB and toluene (1:0, 1:1, 1:2, 1:4, and 0:1 in volume) were used for dispersion of SWCNT+MSP(Cu). The dispersion was used for sensing without centrifuging. Fixed parameters: SWCNT (0.02 mg), AL (0.1 mg), $Cu^{2+}$(1 molar equivalent to AL), total volume of mixed solvent (0.2 mL). FIG. 27B shows chemiresistive response of SWCNT+MSP(Cu) sensors after applying centrifuge. Supernatant solution demonstrated the largest response to DMCP. Fixed parameters: SWCNT (0.02 mg), AL (0.1 mg), $Cu^{2+}$ (1 equivalent to AL), o-DCB:Toluene=1:4 (0.2 mL).

Figure 4A:
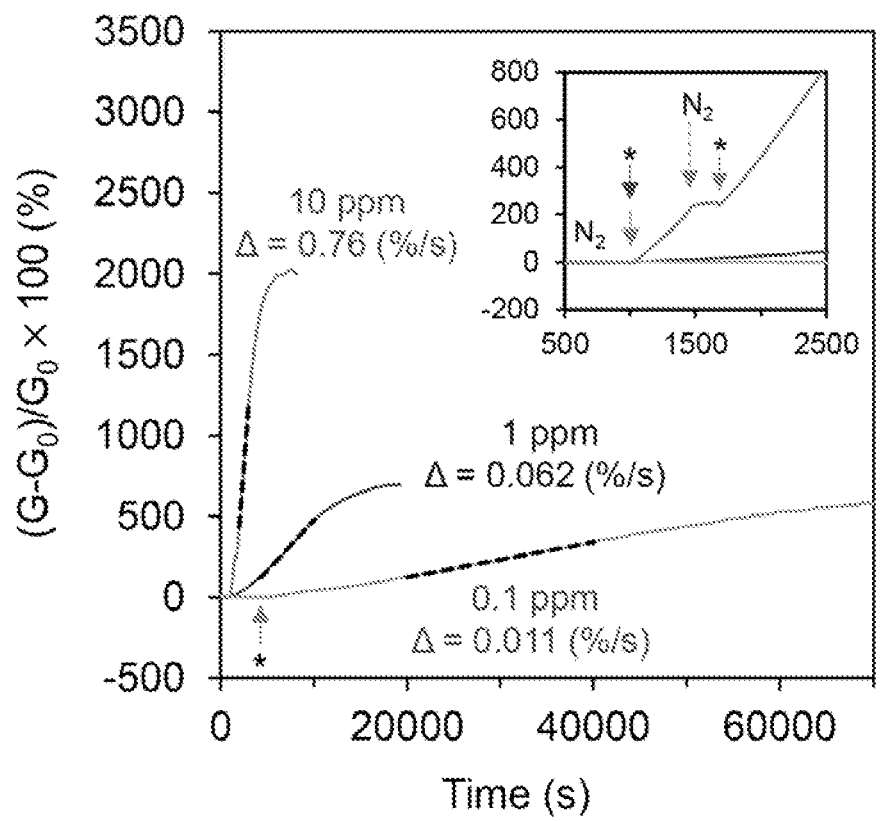
FIGS. 4A-4C show monitoring of trace DECP using optimized SWCNT/MSP(Cu) sensors.
Figure 28A:
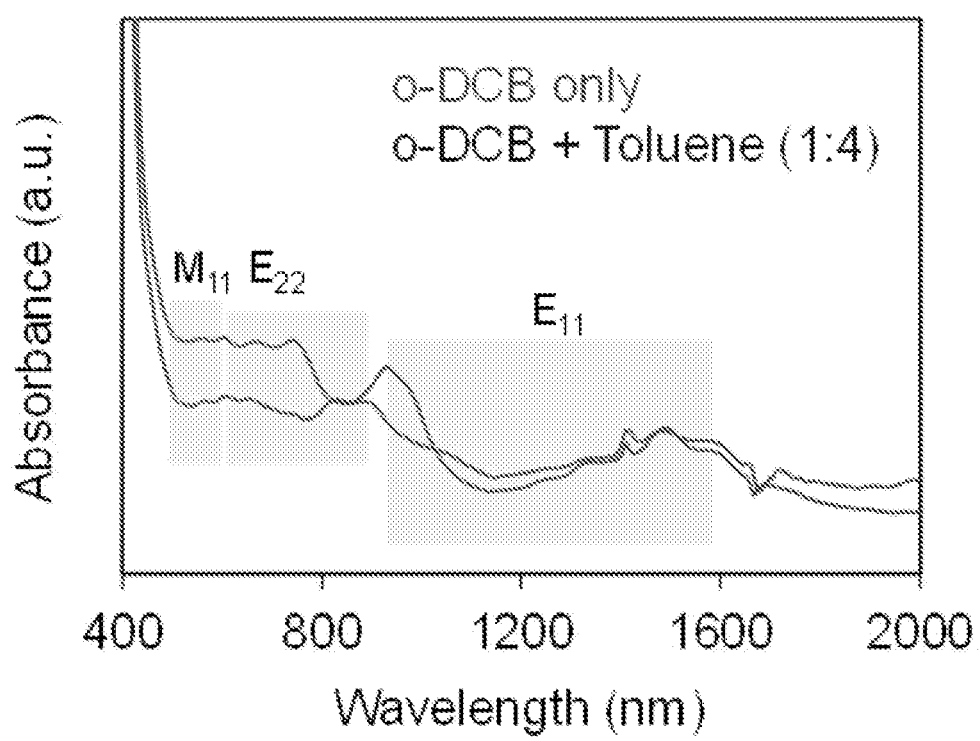
FIG. 28A shows UV-Vis-NIR spectra of SWCNT+MSP (Cu) dispersed by o-DCB and toluene mixtures.
Figure 28B:
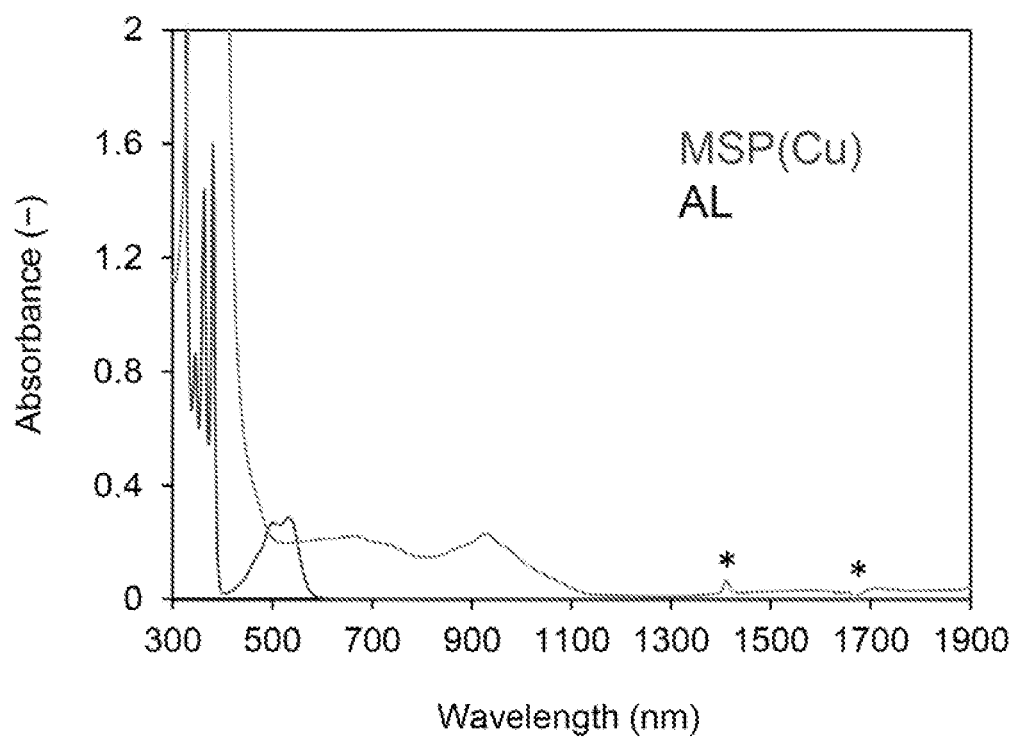
FIG. 28B shows UV-Vis-NIR spectra of AL and MSP(Cu) in o-DCB.
Figure 34A:
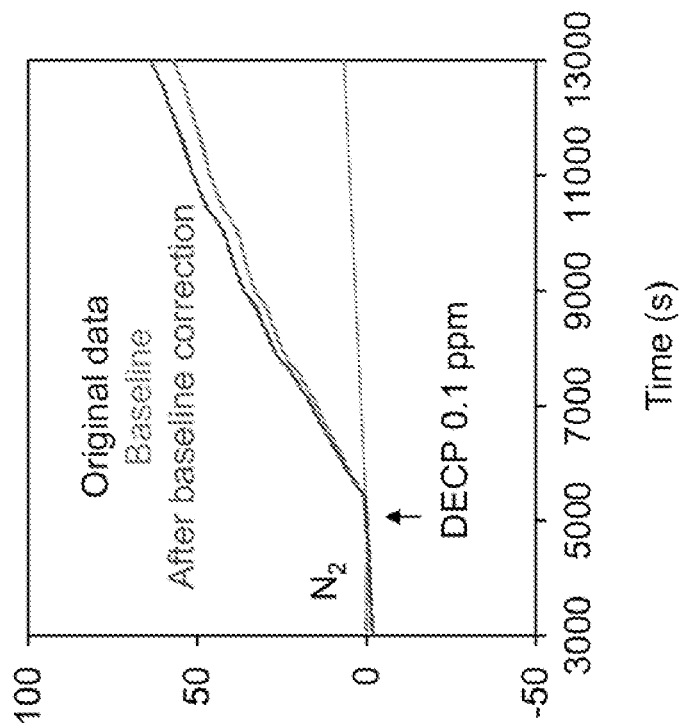
FIGS. 34A-34B show baseline correction data for 0.1 ppm DECP sensing.
Figure 34A:
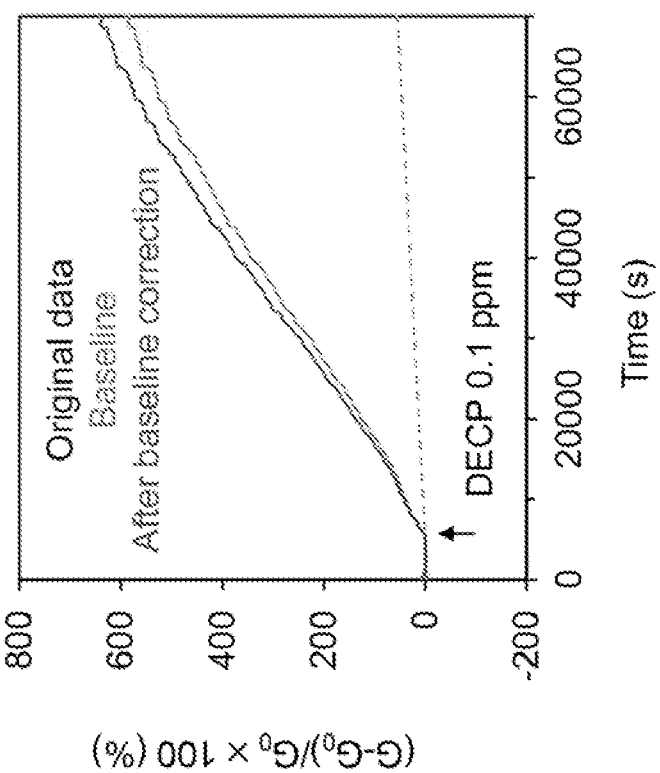
Figure 34B:
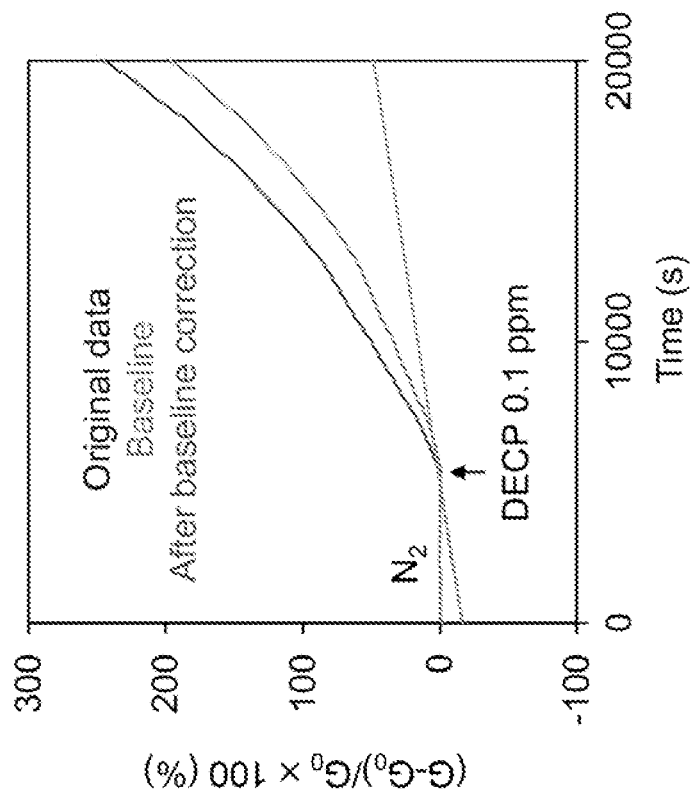
Figure 34B:
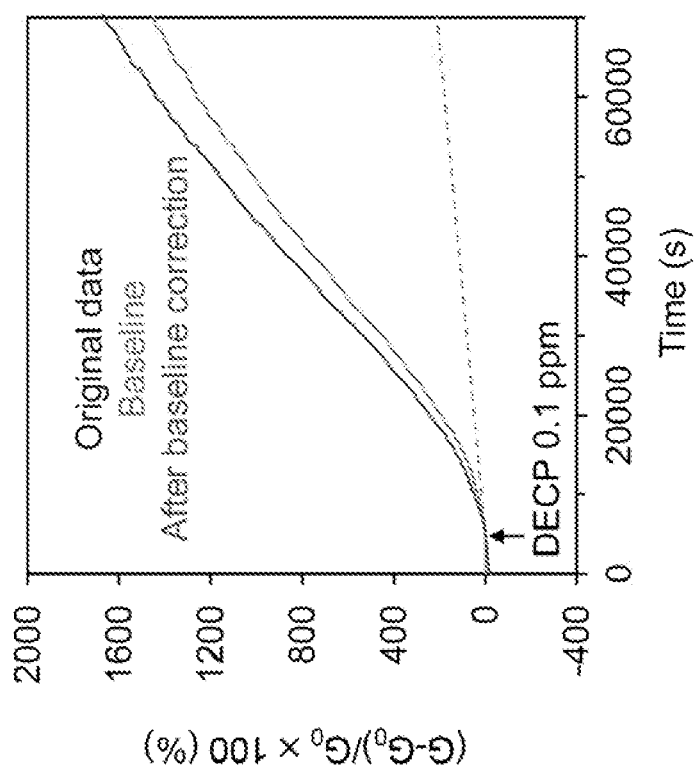

The drop-cast film of the SWCNT/MSP(Cu) supernatant o-DCB/toluene solution gave sensors with higher initial resistance (ca. 2 MΩ for 5 µL×3 drops) than those made from the as formed dispersion (ca. 100 kΩ for 5 µL×3 drops), suggesting that a minority amount of bundled SWCNTs that are removed by centerfugation are sufficient to cause low resistance pathways that decrease the sensitivity. In addition, when compared with SWCNT/MSP(Cu) dispersed by o-DCB, the UV-Vis-NIR spectrum of the supernatant solution revealed reduced signal from MSP(Cu) chromophore appearing at 750 nm and 940 nm (FIGS. 28A-28B). In FIG. 28B, background signals from o-DCB are denoted by asterisk. These results suggest that toluene (a poor solvent for MSP(Cu)) serves to remove excess MSP (Cu). Surplus polymer that impedes optimal SWCNT-SWCNT contacts with the analyte triggered unwrapping of MSP(Cu) is also likely to be detrimental to the sensor sensitivity. The addition of toluene doesn't affect the $E_{11}$ transitions of SWCNT, indicating that the SWCNT composition (i.e., chirality or diameter) is not effected by the change in solvent. See Hwang, J.-Y.; Nish, A.; Doig, J.; Douven, S.; Chen, C.-W.; Chen, L.-C.; Nicholas, R. J. J. Am. Chem. Soc. 2008, 130, 3543-3553, which is incorporated by reference in its entirety. FIG. 4A shows conductance traces of optimized SWCNT/MSP(Cu) chemiresistive sensors upon exposure to 0.1, 1.0, and 10 ppm DECP in $N_2$. A mixture of o-DCB and toluene (1:4 by volume) was used for dispersing SWCNT/MSP(Cu), and the supernatant of the centrifuged solution was drop-cast on the electrode to prepare sensors. The initial resistance range of the sensors was 700 kΩ-2,000 kΩ. Arrows indicate when injection of gas started. Asterisk denotes DECP. Black dotted lines indicate the slope of the traces estimated by linear approximation. Baseline correction was applied to the 0.1 ppm sensing trace (see FIGS. 34A-34B). FIG. 34A shows conductance traces of optimized SWCNT/MSP(Cu) chemiresistive sensors made from 1:1 mixtures of AL and $Cu^{2+}$ (in mole) upon exposure to 0.1 ppm DECP in $N_2$. A mixture of o-DCB and toluene (1:4 by volume) was used for dispersing SWCNT/MSP(Cu), and the supernatant of the centrifuged solution was used for preparing sensors. Blue solid line, green dot lines, red solid line indicate original data, baseline, baseline-corrected data, respectively. Baseline corrected data was used for FIG. 34A. FIG. 34B shows conductance traces of optimized SWCNT/MSP(Cu) chemiresistive sensors made from 0.5:0.5:1.0 mixtures of ALOx, AL, and $Cu^{2+}$ (in mole) upon exposure to 0.1 ppm DECP in $N_2$. A mixture of o-DCB and toluene (1:4 by volume) was used for dispersing SWCNT/MSP(Cu), and the supernatant of the centrifuged solution was used for preparing sensors. Blue solid line, green dot lines, red solid line indicate original data, baseline, baseline-corrected data, respectively. Baseline corrected data was used for FIG. 4B. As shown in FIG. 4A, the optimized SWCNT/MSP(Cu) sensor demonstrated a 2,000% increase in conductivity upon exposure to 10 ppm DECP. Accordingly, optimization improved the response by 6×, and is 40 and 200 times larger than that of pristine SWCNT and SWCNT/PFO controls, respectively (in comparison with FIG. 3B). The saturated chemiresistive responses for 1.0 ppm and 0.1 ppm DECP were ca. 600-700%, and the slope (rate) of increasing conductivity decreased as the concentration of DECP decrease.

Figure 29A:
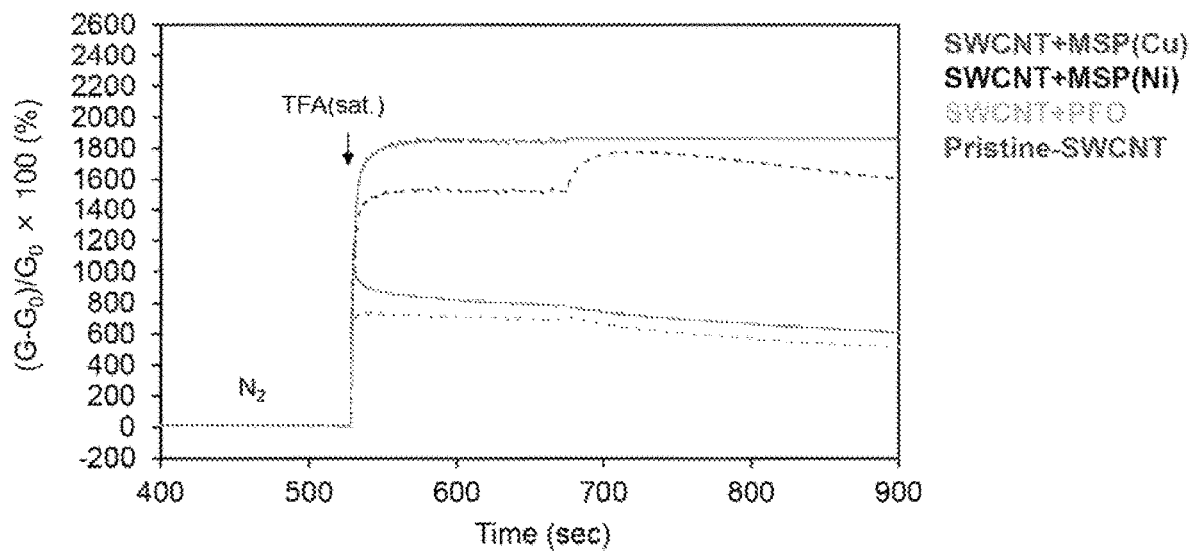
FIG. 29A shows chemiresisitive response of SWCNT+MSP (prepared in o-DCB) for trifluoroacetic acid.
Figure 29B:
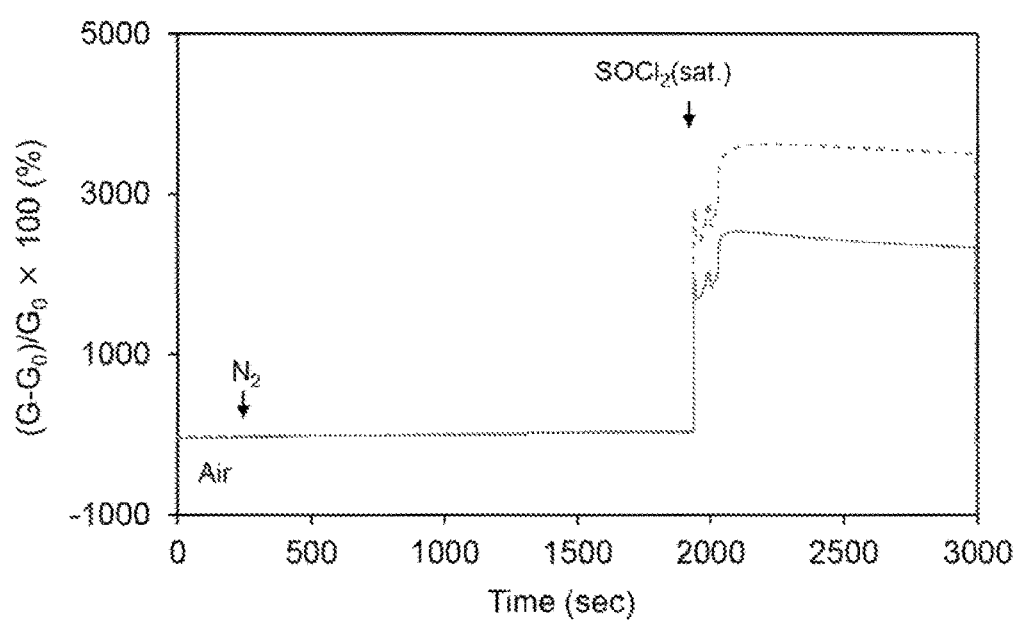
FIG. 29B shows chemiresisitive response of SWCNT+MSP(Cu) (prepared in o-DCB:Toluene=1:4, non centrifuged) for thionyl chloride.

Investigating the sensing mechanism. As expected, SWCNT/MSP(Cu) as well as SWCNT/MSP(Ni) displays increases in conductivity upon exposure to other strong electrophiles such as acetyl chloride, trifluoroacetic acid, and $SOCl_2$ (FIGS. 22 and 29). FIG. 29A shows chemiresisitive response of SWCNT+MSP (prepared in o-DCB) for trifluoroacetic acid. Note that pristine SWCNT and PFO-wrapped SWCNT also demonstrate strong response. FIG. 29B shows chemiresisitive response of SWCNT+MSP(Cu) (prepared in o-DCB:Toluene=1:4, non centrifuged) for thionyl chloride.

Figure 30A:
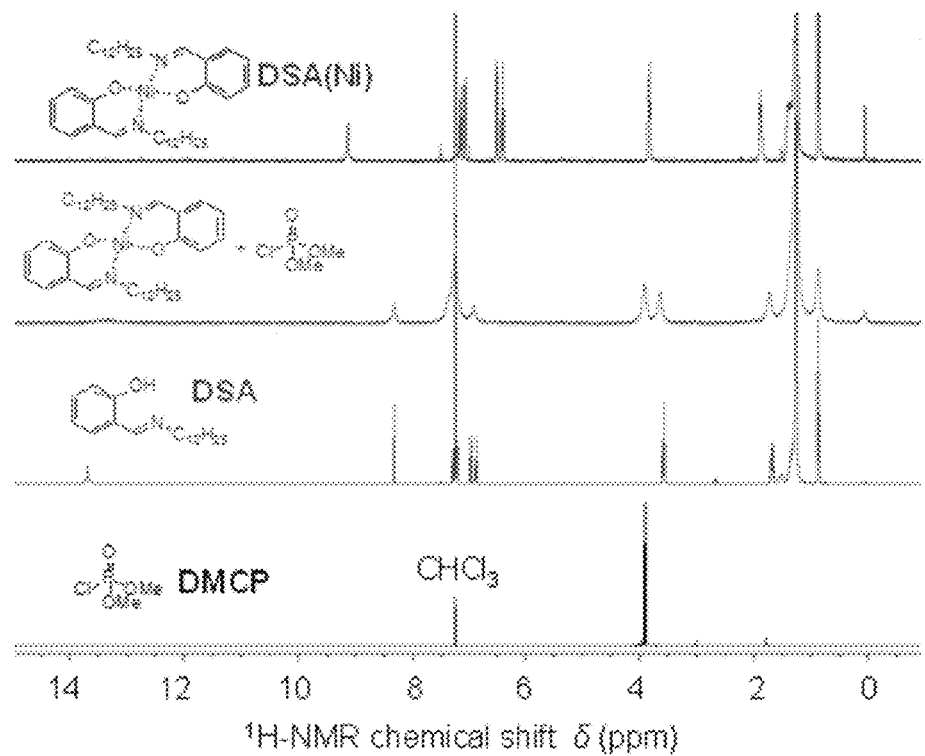
FIG. 30A shows $^1$H-NMR spectra of DSA(Ni) in $CDCl_3$ before and after bubbling with DMCP vapor in dry Ar. For comparison, $^1$H-NMR spectra of DSA and DMCP are also shown.
Figure 30B:
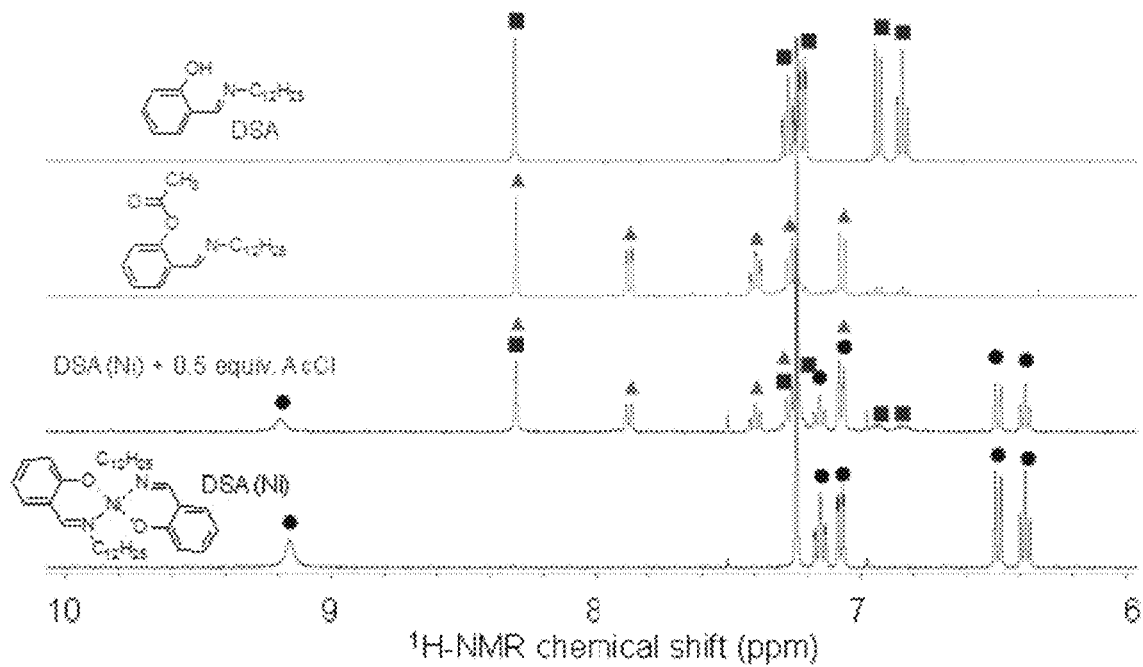
FIG. 30B shows $^1$H-NMR spectra of DSA(Ni) in $CDCl_3$ before and after addition of 0.5 molar equivalent of acetyl chloride. For comparison, $^1$H-NMIR spectra of free DSA and acetylester of DSA are also shown.
Figure 31A:
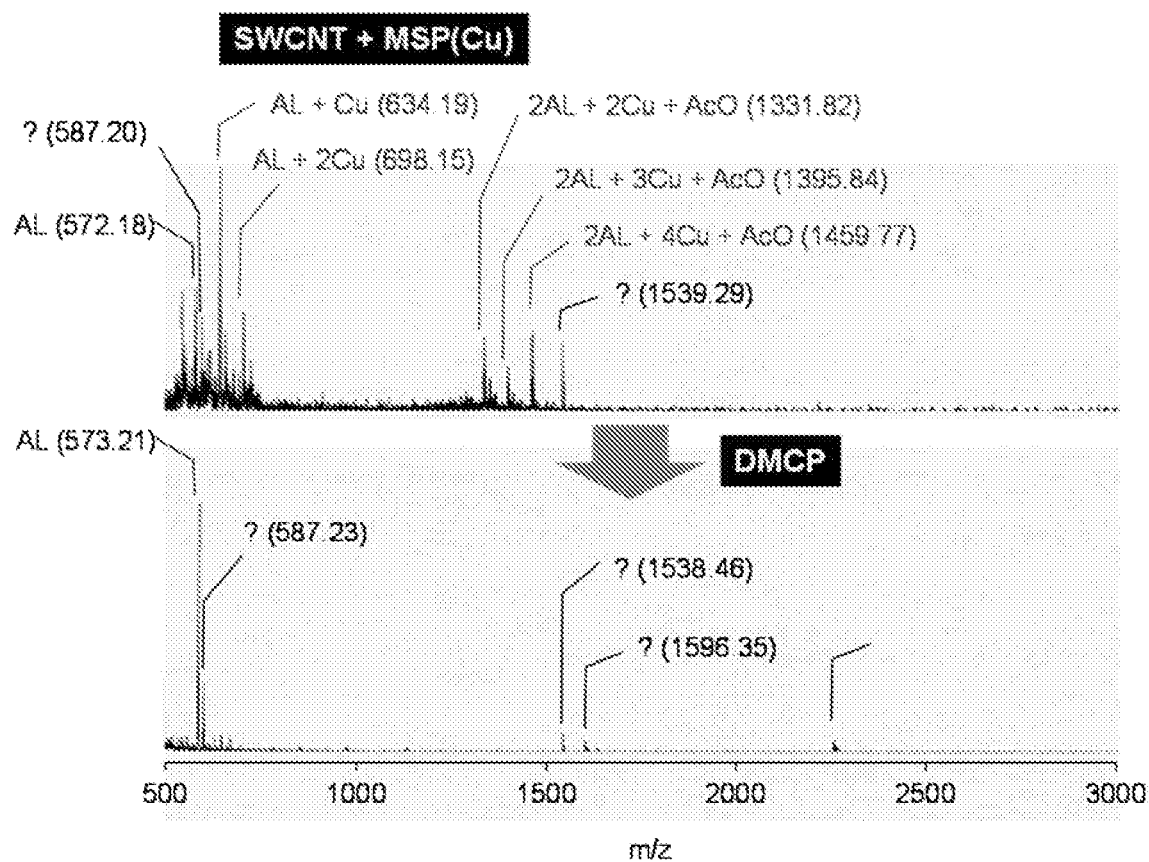
FIGS. 31A-31C show additional evidences of demetallation of MSP(Cu) with electrophiles.
Figure 31B:
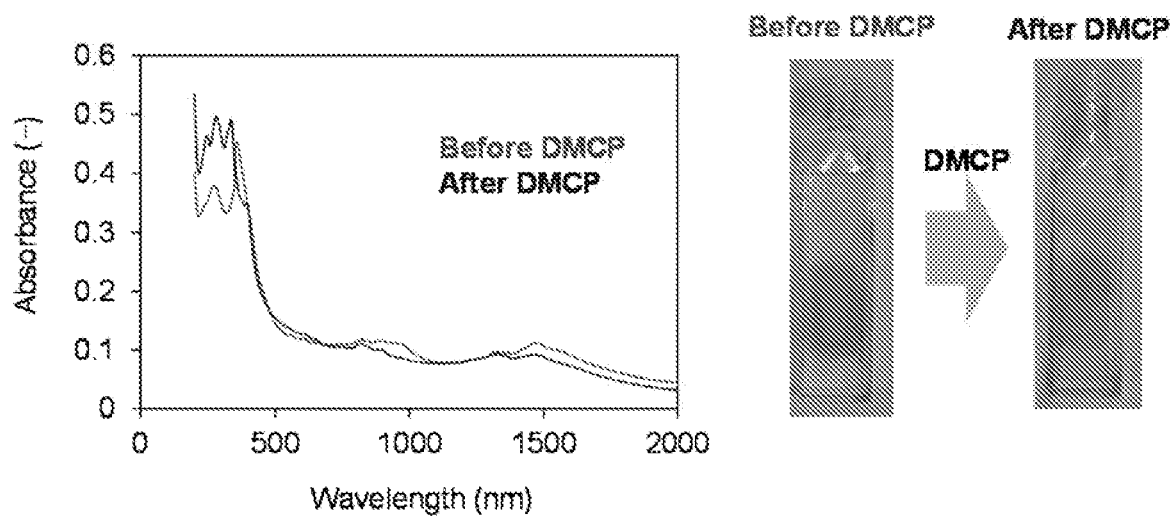
Figure 31C:
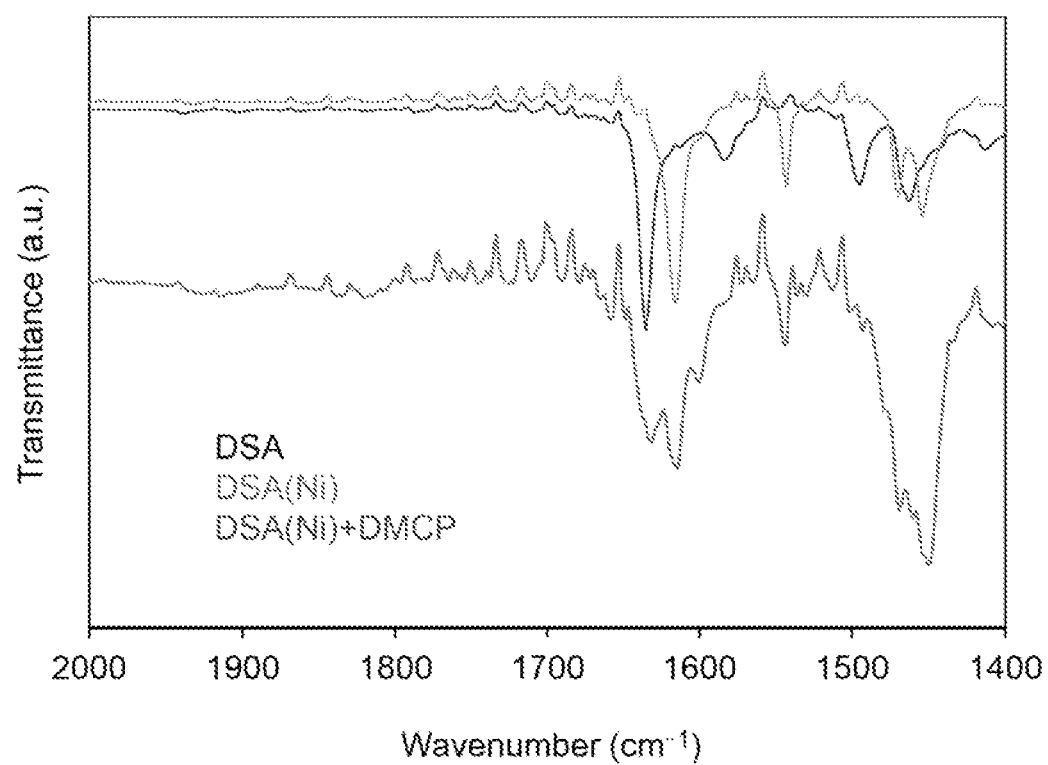

To investigate the sensing mechanism, diamagnetic square planar $Ni^{2+}$ complex of n-dodecylsalicylaldimine (DSA(Ni)) was used as a model compound (FIGS. 30A-30B). See Chakravorty, A.; Fennessey, J. P.; Holm, R. H. *Inorg. Chem.* 1965, 4, 26-33, which is incorporated by reference in its entirety. After bubbling with DMCP for 3 min the $^1$H-NMR spectrum indicates that the DSA(Ni) is completely demetallated and only dissociated free DSA is detected. The formation of an iminium ion (see Weinreb, S. M.; Scola, P. M. *Chem. Rev.* 1989, 89, 1525-1534, which is incorporated by reference in its entirety) is a likely intermediate step of demetallation; however such a highly reactive intermediate will not persist to allow detection. When acetyl chloride was added to DSA(Ni), free DSA as well as the DSA acetyl-ester were observed in $^1$H-NMR spectrum (FIGS. 30A-30B). This result indicates that there may be multiple reaction pathways for demetallation of MSP and/or post demetallation chemical transformations. UV-Vis-NIR and MALDI-TOF MS experiments also support that demetallation of MSP(Cu) occurs with exposure to DMCP (FIGS. 31A-31C). FIG. 31A shows MALDI-TOF-MS spectra of SWCNT+MSP(Cu) before and after exposure to DMCP. Mass signals from complexes of AL and Cu were disappeared after exposure to DMCP. FIG. 31B shows UV-Vis-NIR spectra of SWCNT+MSP(Cu) film on quartz before and after exposure to DMCP. FIG. 31C shows IR spectra of DSA(Ni) in $CCl_4$ before and after bubbling with DMCP vapor. For comparison, IR spectrum of DSA is also shown. Note that DMCP was added with P4VP for trapping HCl, and DMCP vapor was delivered with dry argon.

Figure 32:
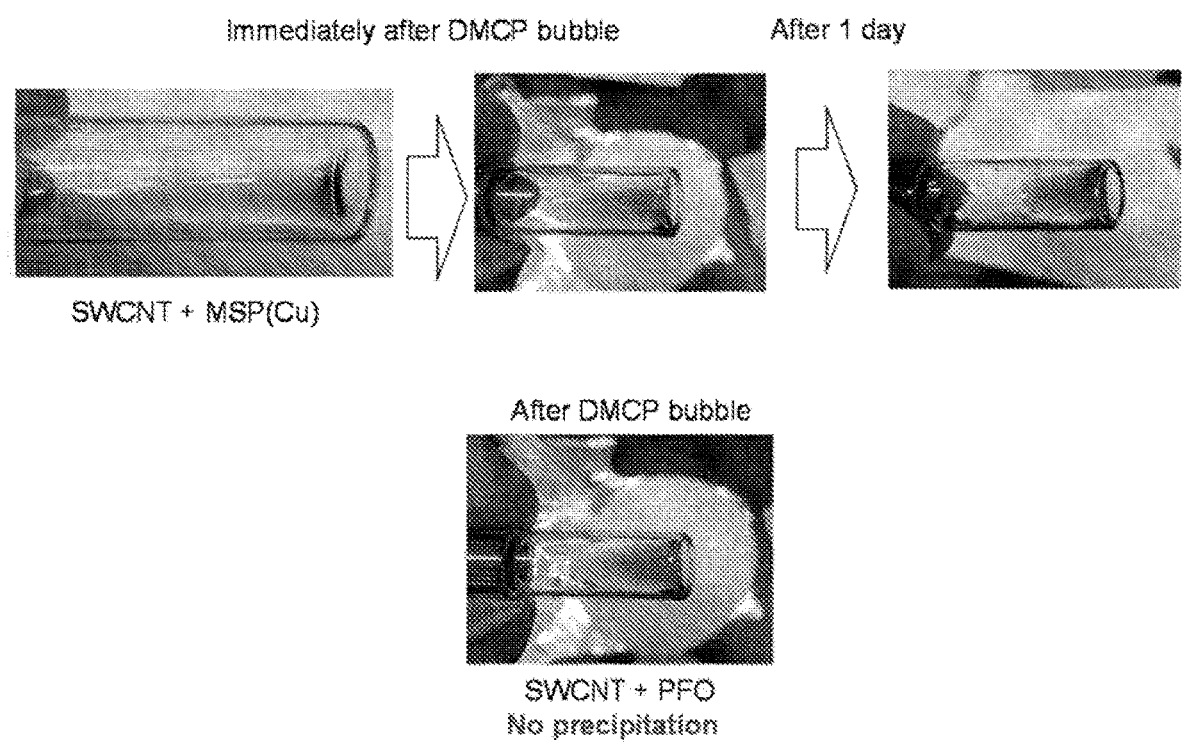
FIG. 32 shows precipitation of SWCNT+MSP(Cu) dispersion in o-DCB immediately after bubbling the dispersion with DMCP.

Fragments of MSP (including AL itself) are not effective at wrapping or dispersing SWCNTs; bubbling DMCP vapor through a SWCNT/MSP(Cu) dispersion in o-DCB gives immediate precipitation (FIG. 32). FIG. 32 shows precipitation of SWCNT+MSP(Cu) dispersion in o-DCB immediately after bubbling the dispersion with DMCP. In contrast, SWCNT dispersed by PFO was not precipitated at all even after bubbling with DMCP vapor for several minutes. In contrast, SWCNTs dispersed using PFO do not precipitate even after several minutes of bubbling DMCP vapor into the solution. PFO does not react with DMCP and it is clear that the chemical disassembly of the MSP is a key component of this system's response to strong electrophiles.

Figure 4B:
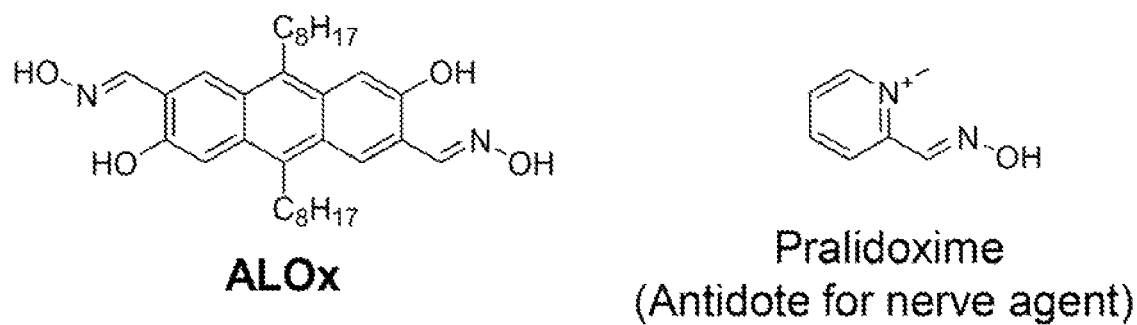
Figure 4C:
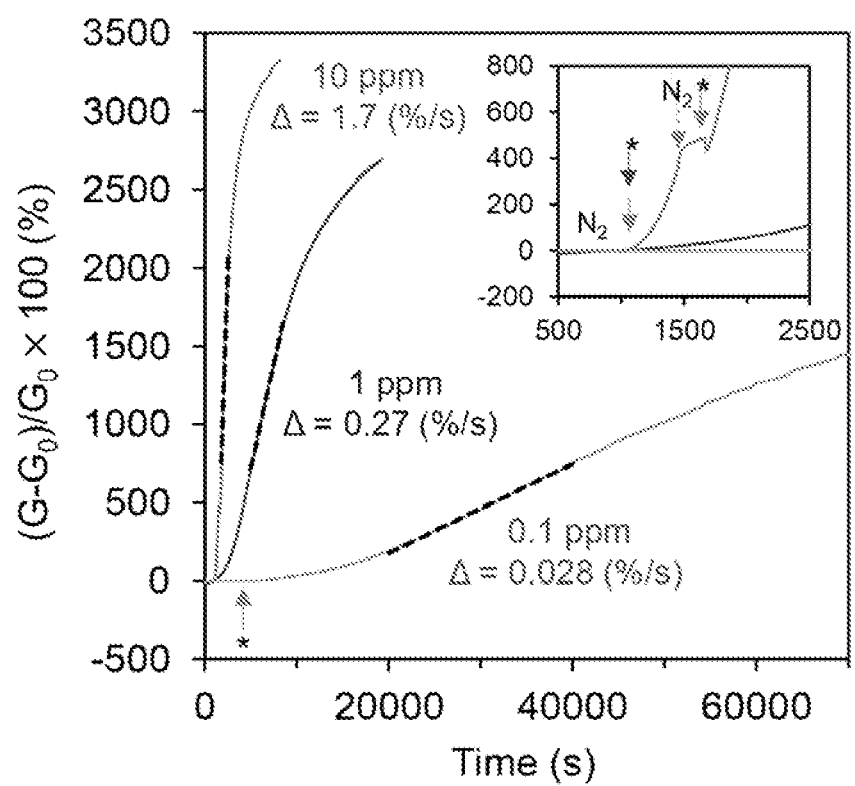
Figure 33A:
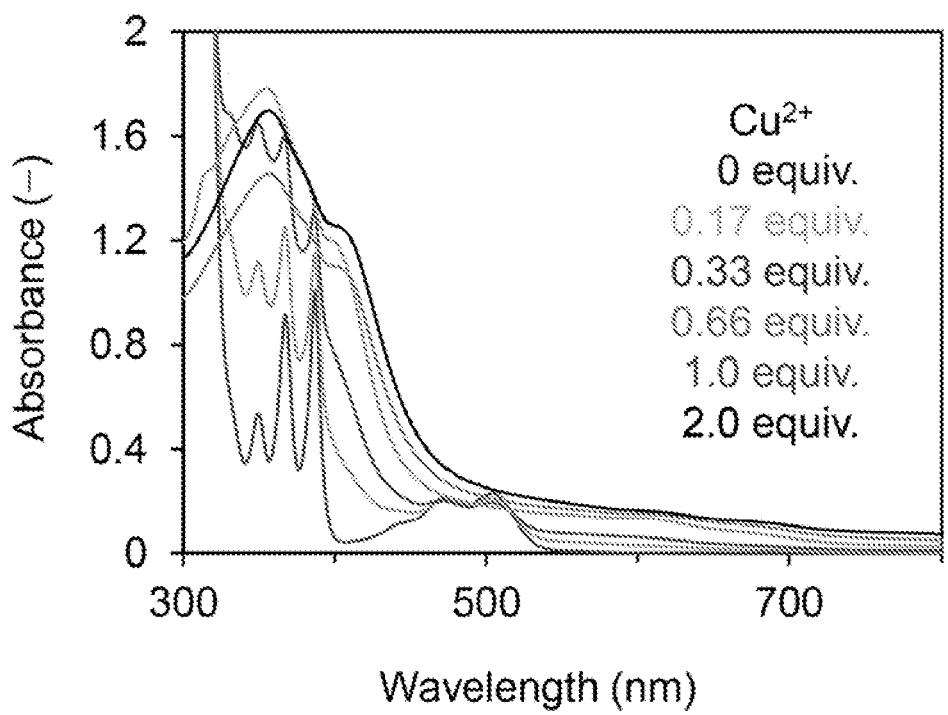
FIGS. 33A-33B show UV-Vis titration experiments of ALOx ($7.0 \times 10^{-5}$ M, o-DCB/methanol=9/1) with $Cu(AcO)_2 \cdot H_2O$ (10.6 mM, methanol) at room temperature. The optical path length was 10 mm. Note that aggregation was observed upon addition of $Cu^{2+}$.
Figure 33B:
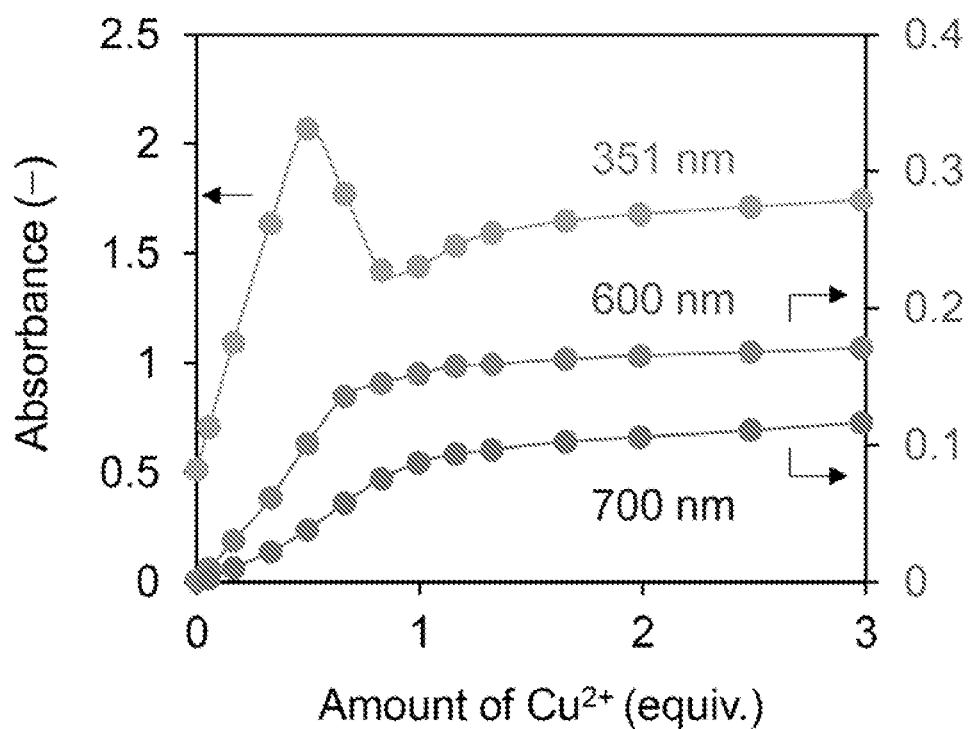

Modification of AL with oxime for improved response to DECP. In order to further increase the transitional response (i.e., slope of increasing conductivity) to DECP, n-propyl imines in AL were substituted by oximes to form ALOx (FIG. 4B). Fast and irreversible reactivity of oximes with phosphorous electrophiles, which is explained as by the α-effect, has been investigated extensively, and underlies the structure-function basis for nerve agent antidotes (e.g., pralidoxime shown in FIG. 4B). See Dale, T. J.; Rebek, J., Jr. *Agnew. Chem. Int. Ed.* 2009, 48, 7850-7852, which is incorporated by reference in its entirety. Although ALOx forms a strong metal ligand complex with $Cu^{2+}$ in 1:1 molar stoichiometry (FIGS. 33A-33B), MSP(Cu) made from ALOx was not capable of dispersing SWCNTs. FIGS. 33A-33B show UV-Vis titration experiments of ALOx (7.0× $10^{-5}$M, o-DCB/methanol=9/1) with $Cu(AcO)_2.H_2O$ (10.6 mM, methanol) at room temperature. The optical path length was 10 mm. Note that aggregation was observed upon addition of $Cu^{2+}$. Thus, composite MSP(Cu) made from 0.5:0.5:1.0 mixture of ALOx, AL, and $Cu^{2+}$ (by mole) was utilized to disperse SWCNTs in a solution of o-DCB and toluene (1:4 by volume). FIG. 4C shows conductance traces of optimized SWCNT/MSP(Cu) chemiresistive sensors made from 0.5:0.5:1.0 (by mole) mixtures of ALOx, AL, and $Cu^{2+}$ upon exposure to 0.1, 1.0, and 10 ppm DECP in $N_2$. A mixture of o-DCB and toluene (1:4 by volume) was used for dispersing SWCNT/MSP(Cu), and the supernatant of the centrifuged solution was drop-cast on the electrode for preparing sensors. The initial resistance range of sensors was 700-2,000 kΩ. Chemiresistive sensors were prepared from the supernatant of the centrifuged mixture, and FIG. 4C shows that the slope of increasing conductivity as well as saturated response are significantly improved by incorporating ALOx into the sensor formulation. The slope of chemiresistive response to DECP decreases with decreasing DECP concentration, while the response saturates at a similar level. This result indicates a nearly ideal dosimetric sensing response that is directly correlated with the number of analyte (DECP) molecules that MSP encounters.

Figure 5:
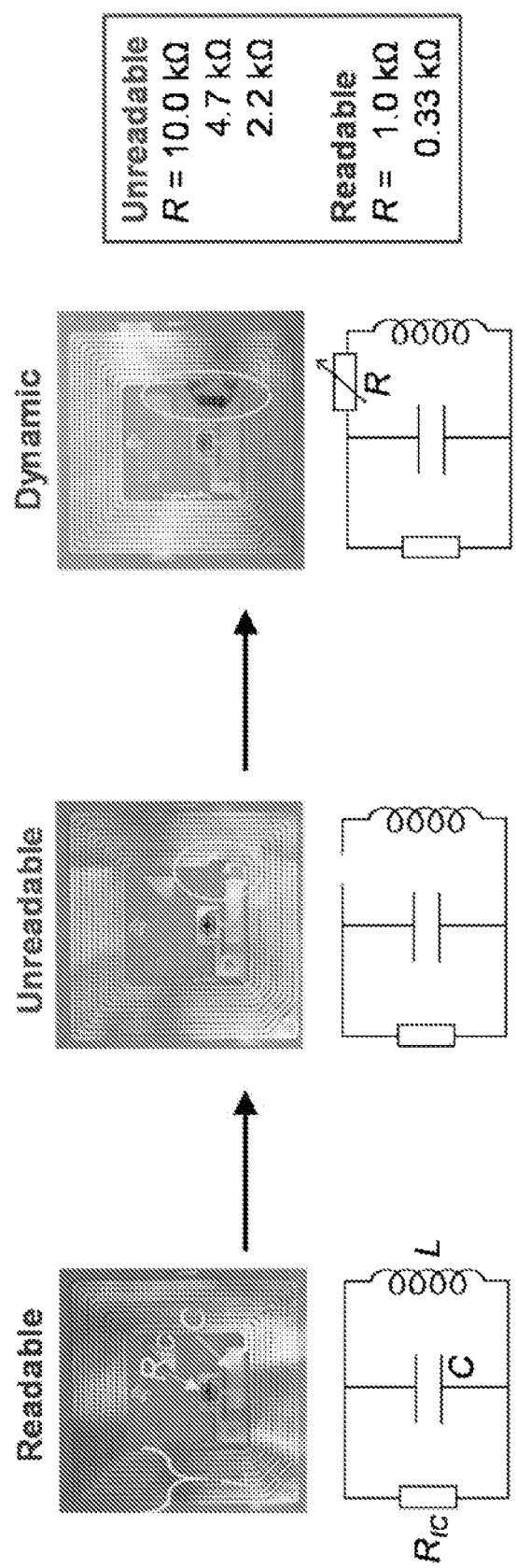
FIG. 5 shows modification of NFC tag and smart phone detection of thionyl chloride in air.
Figure 6:
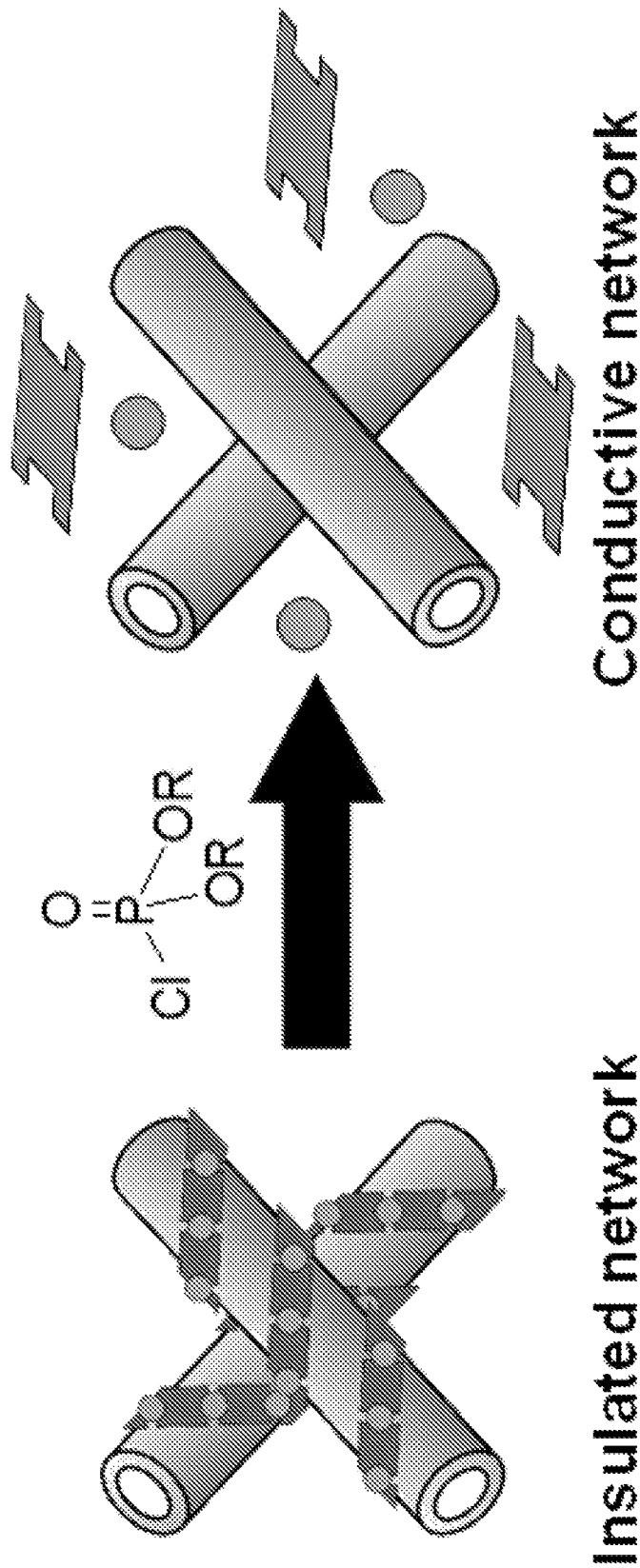
FIG. 6 shows schematic of insulated network and conductive network.
Figure 7:
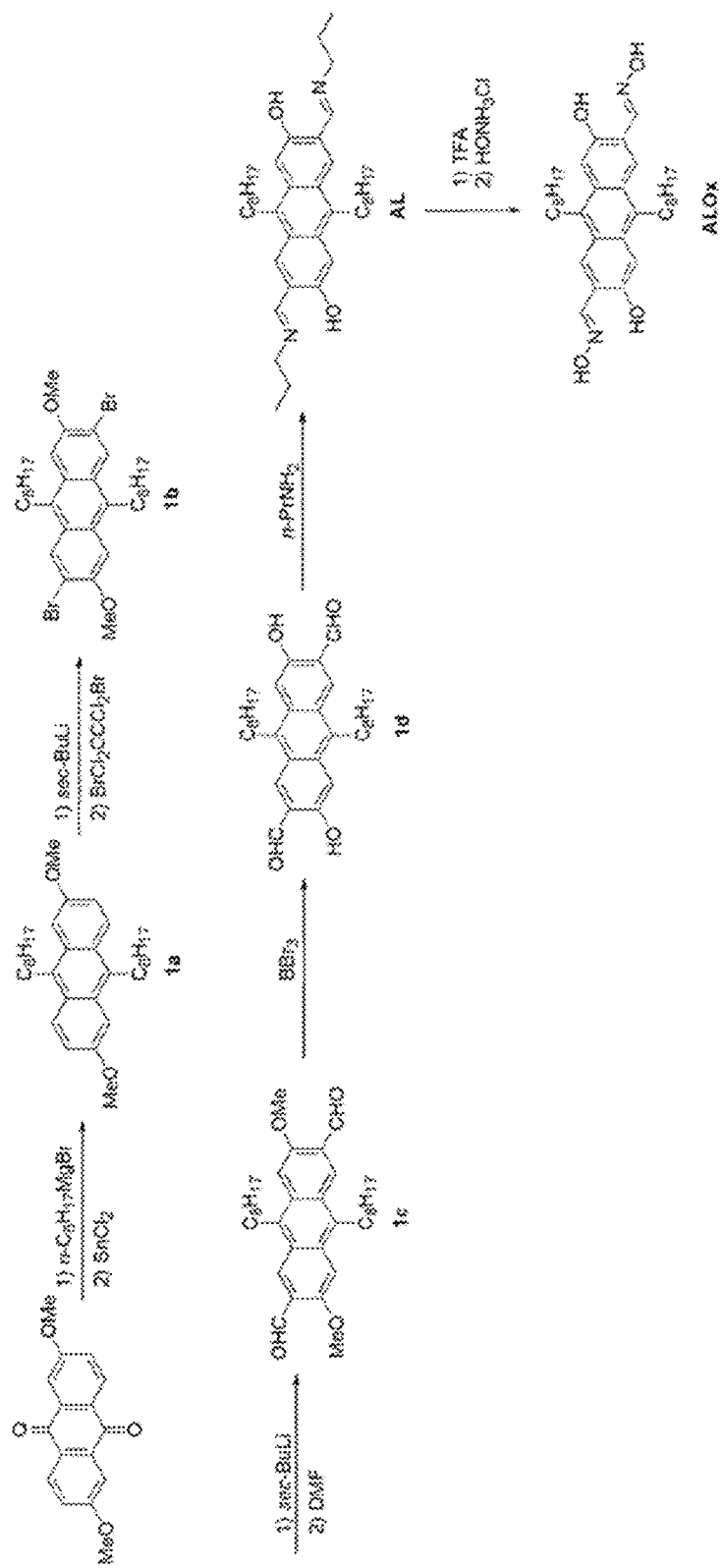
FIG. 7 shows synthetic route of AL and ALOx.
Figure 8:
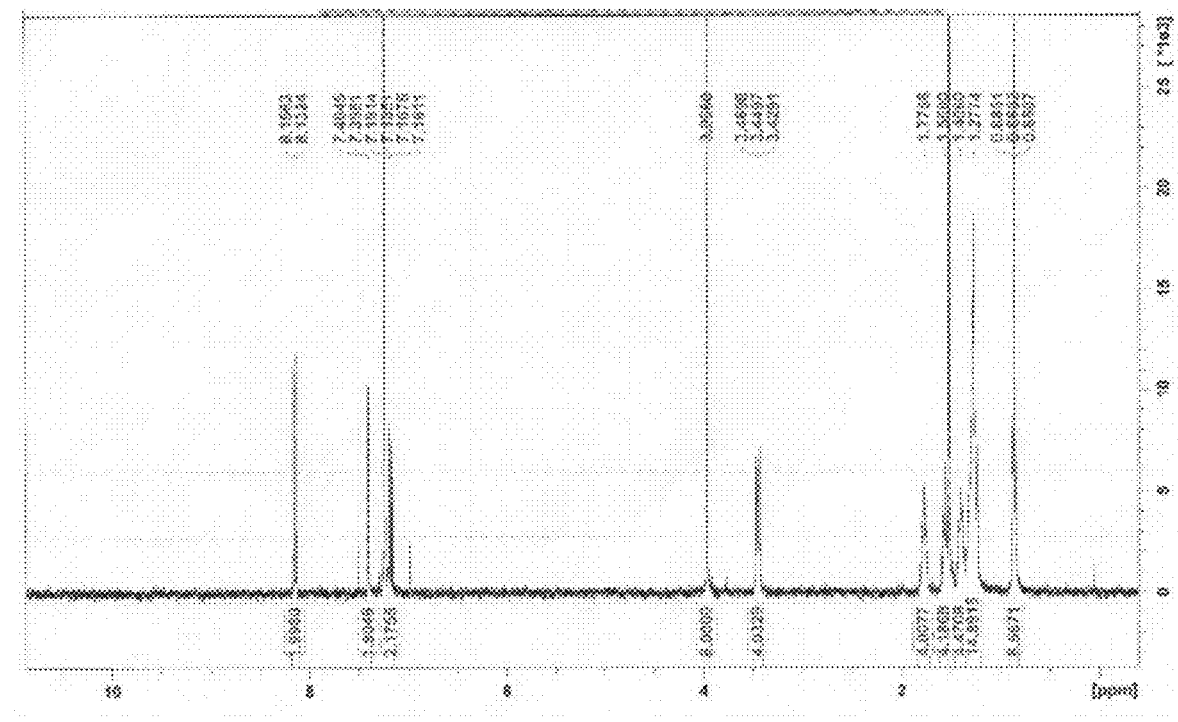
FIG. 8 shows $^1$H-NMR spectrum of 2,6-dimethoxy-9,10-dioctyl-anthracene.
Figure 9:
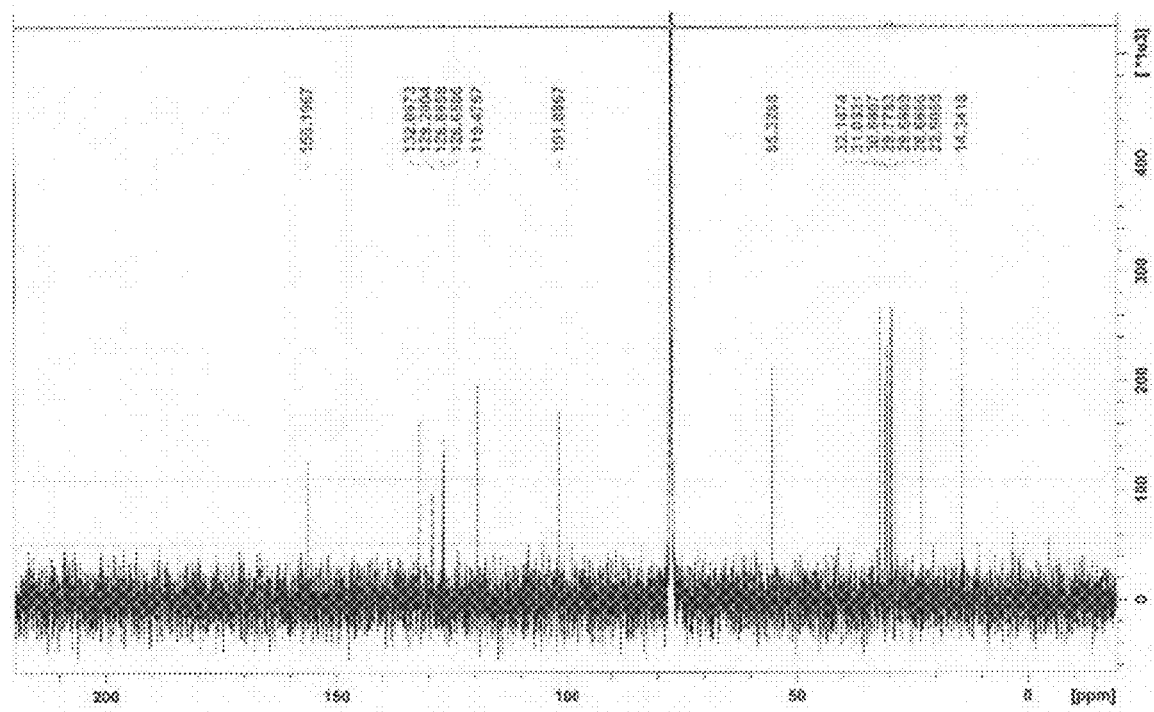
FIG. 9 shows $^{13}$C-NMR spectrum of 2,6-dimethoxy-9,10-dioctyl-anthracene.
Figure 10:
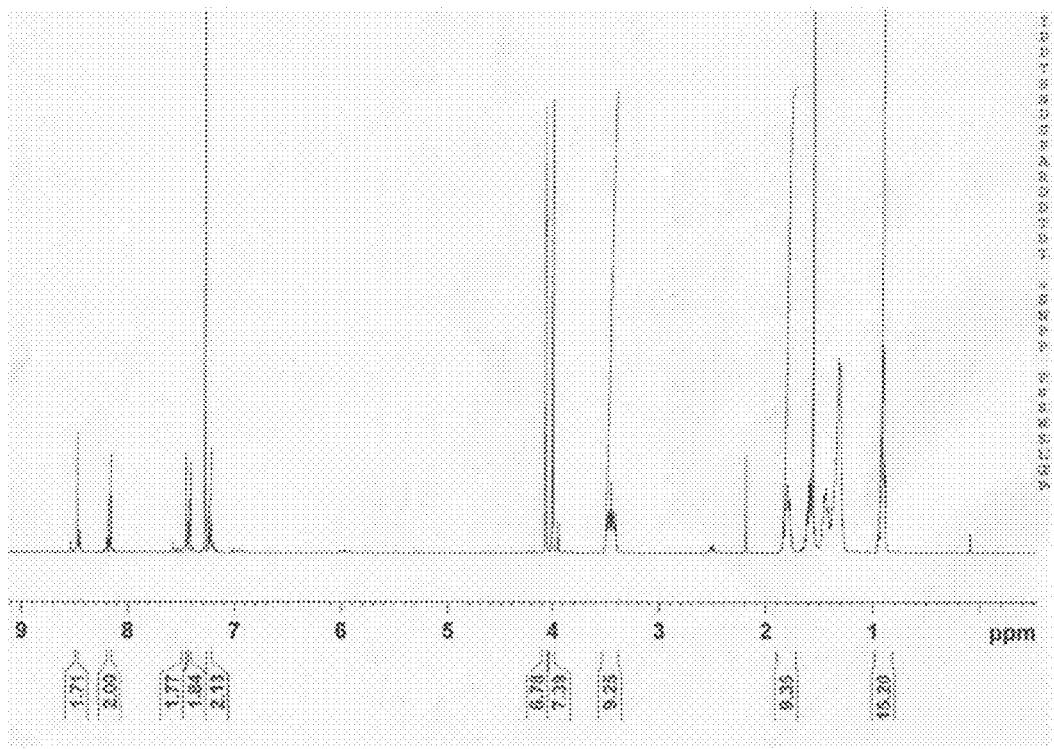
FIG. 10 shows $^1$H-NMR spectrum of crude product of 2,6-dibromo-3,7-dimethoxy-9,10-dioctyl-anthracene.
Figure 11:
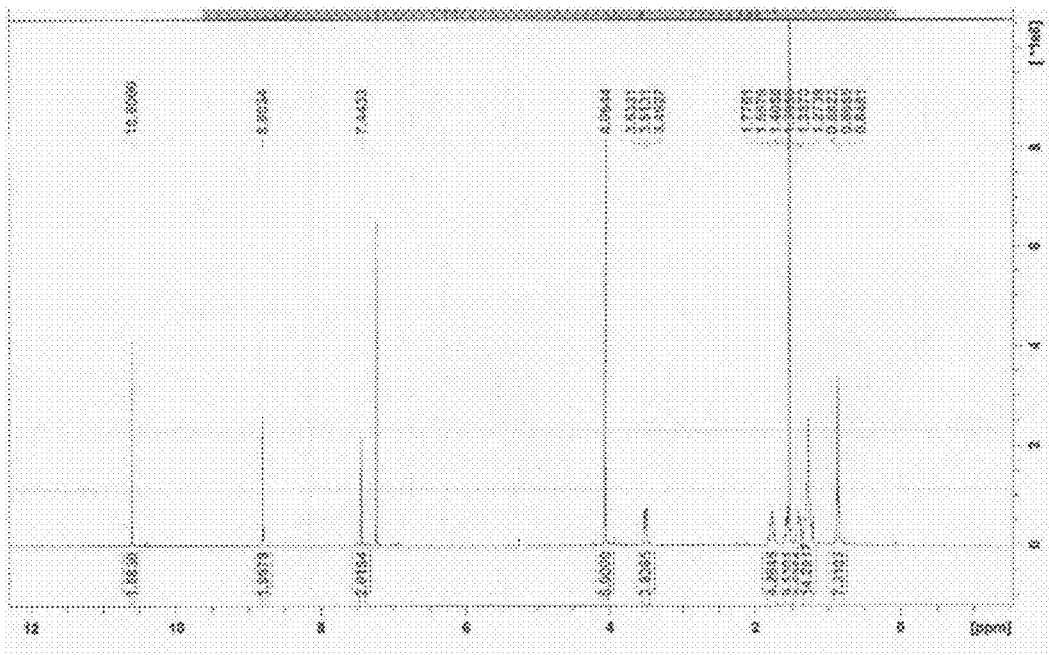
FIG. 11 shows $^1$H-NMR spectrum of 3,7-dimethoxy-9,10-dioctyl-anthracene-2,6-dicarbaldehyde.
Figure 12:
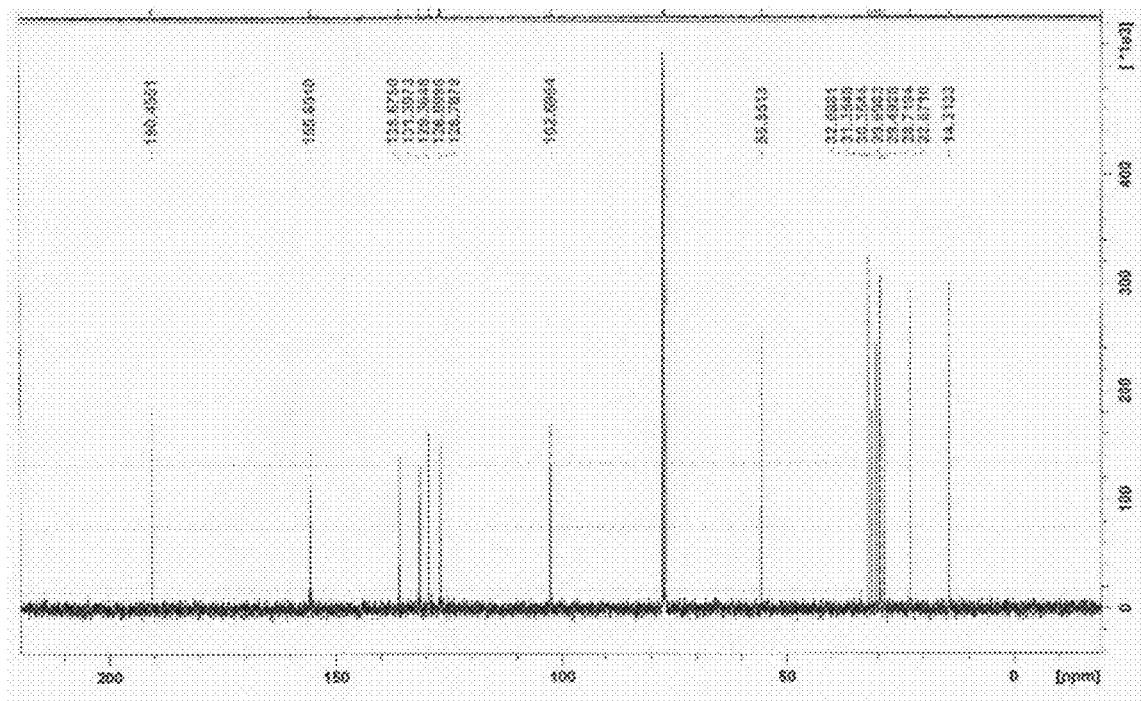
FIG. 12 shows $^{13}$C-NMR spectrum of 3,7-dimethoxy-9,10-dioctyl-anthracene-2,6-dicarbaldehyde.
Figure 13:
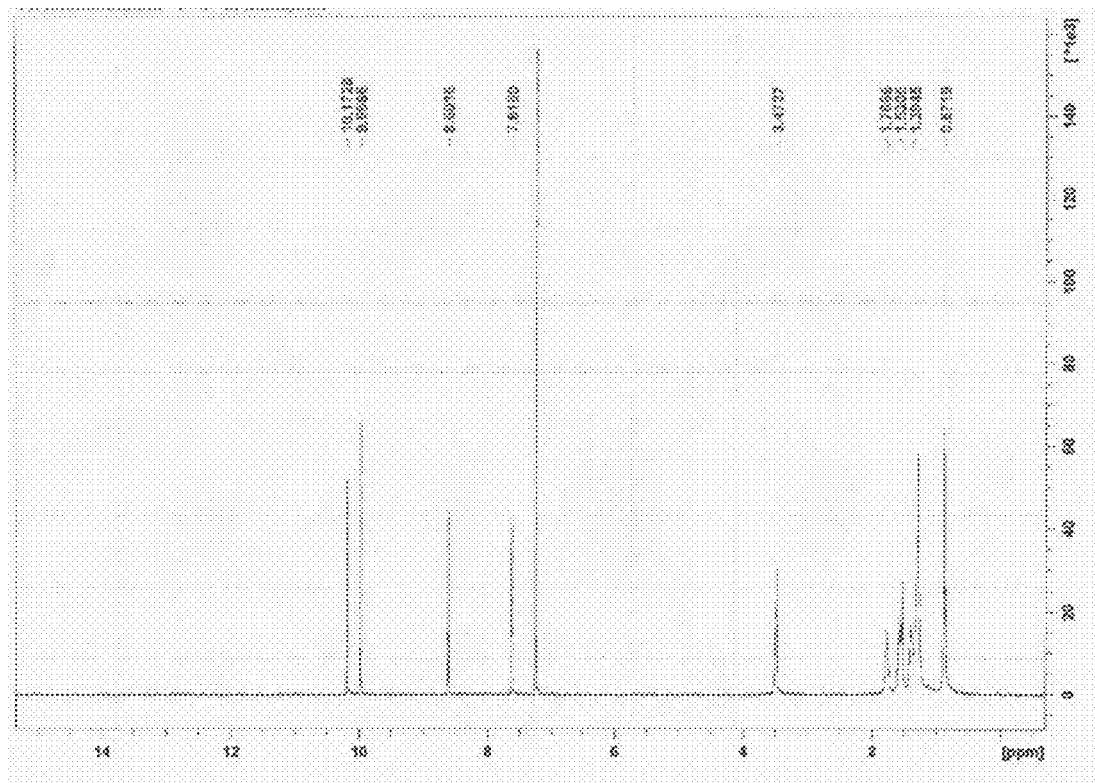
FIG. 13 shows $^1$H-NMR spectrum of 3,7-dihydroxy-9,10-dioctyl-anthracene-2,6-dicarbaldehyde.
Figure 14:
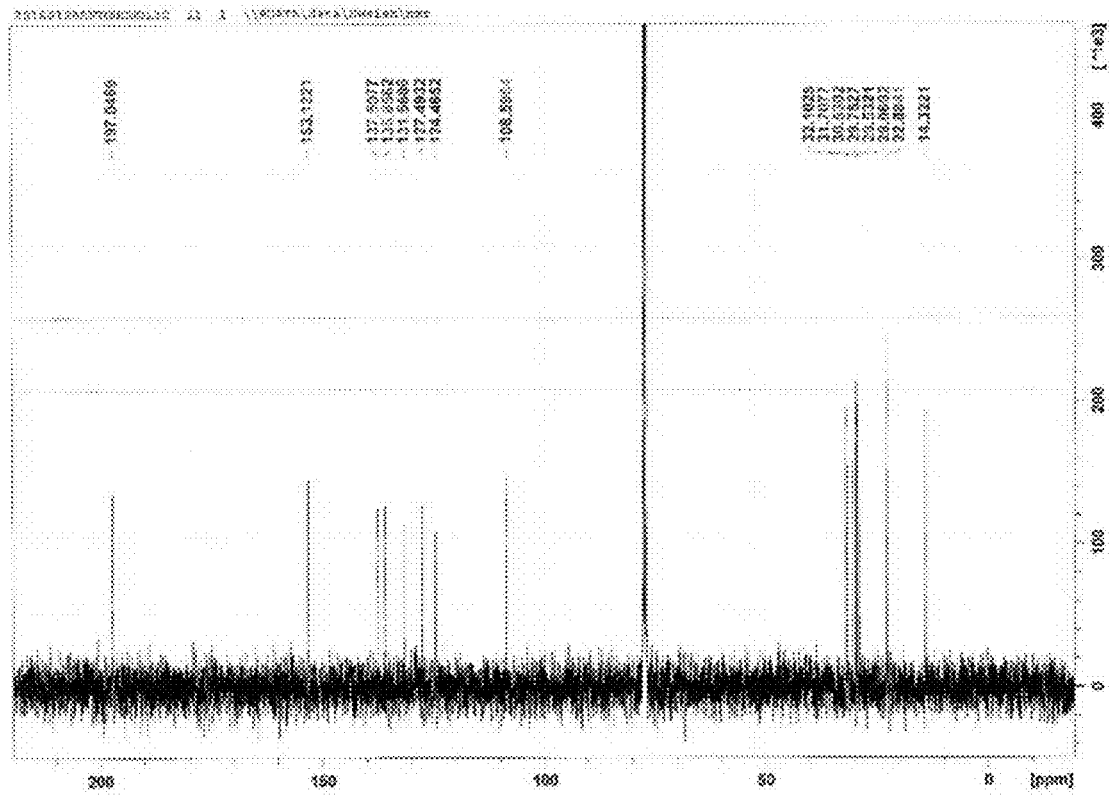
FIG. 14 shows $^{13}$C-NMR spectrum of 3,7-dihydroxy-9,10-dioctyl-anthracene-2,6-dicarbaldehyde.
Figure 15:
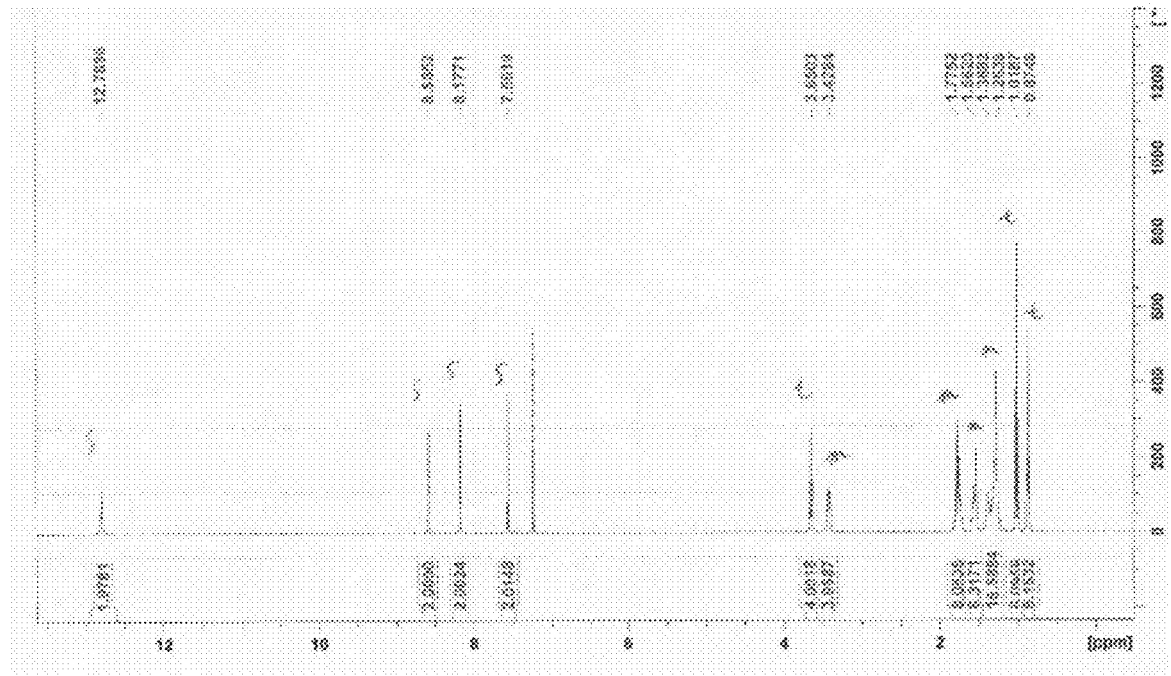
FIG. 15 shows $^1$H-NMR spectrum of 9,10-dioctyl-3,7-bis-propyliminomethyl-anthracene-2,6-diol (AL).
Figure 16:
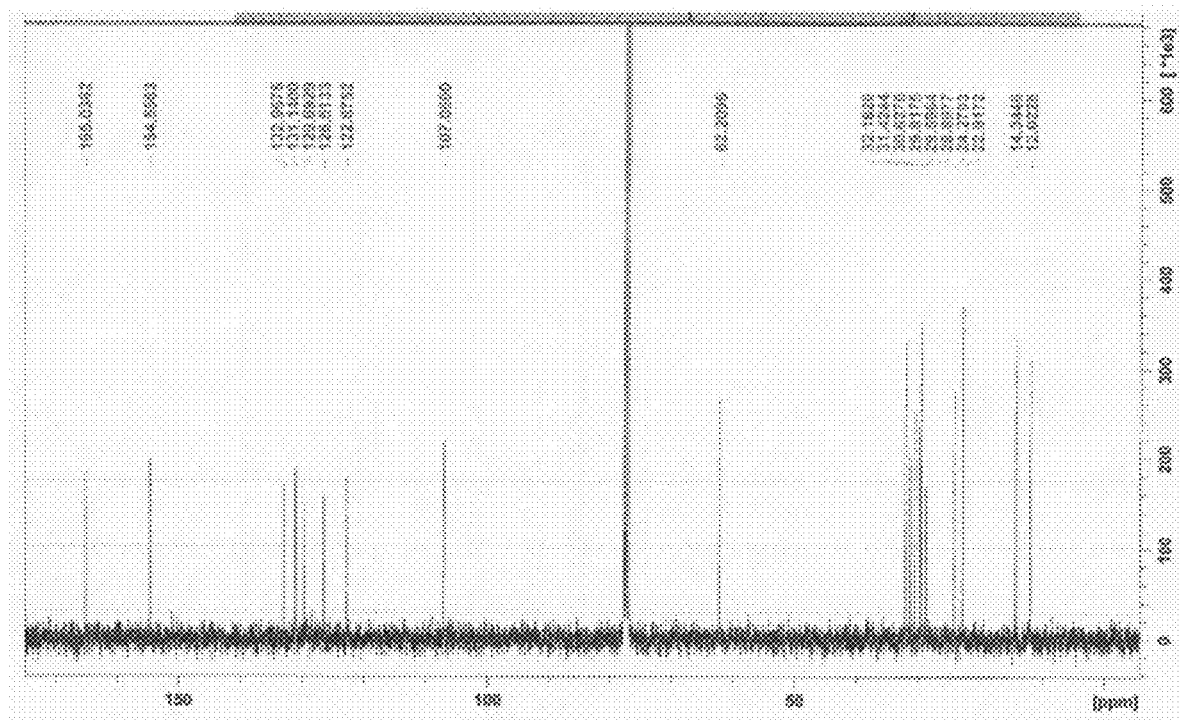
FIG. 16 shows $^{13}$C-NMR spectrum of AL.
Figure 17:
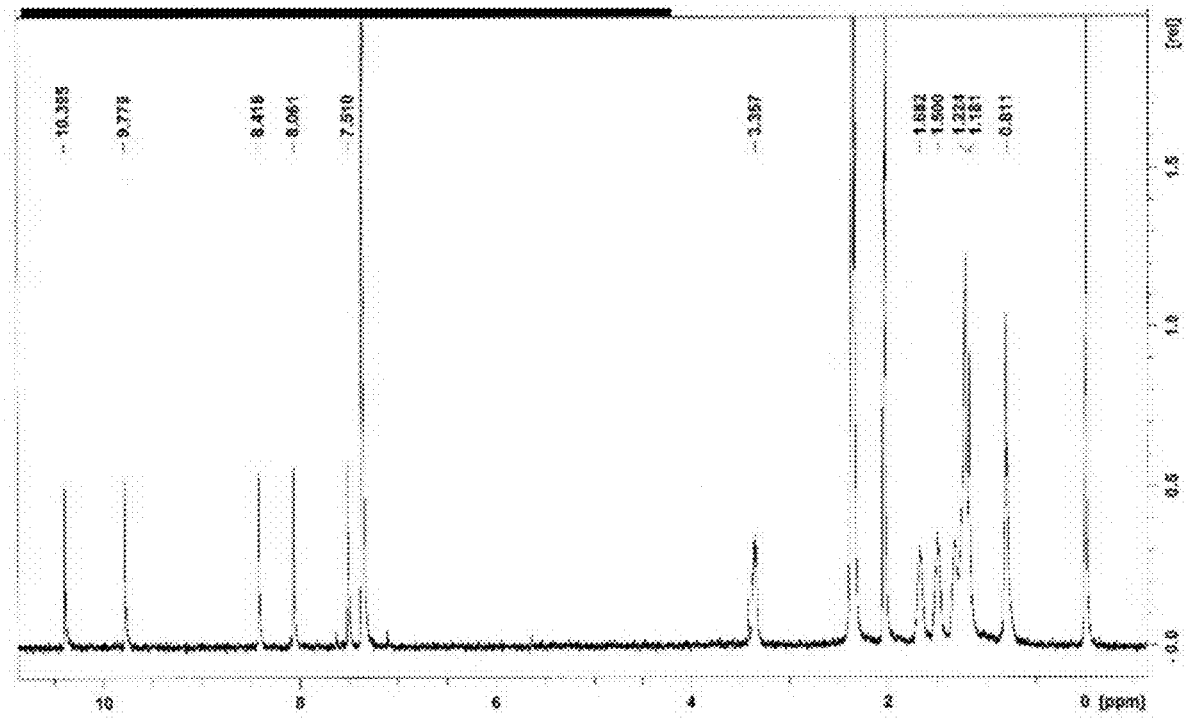
FIG. 17 shows $^1$H-NMR spectrum of 3,7-dihydroxy-9,10-dioctyl-anthracene-2,6-dicarbaldehyde dioxime (ALOx).
Figure 35A:
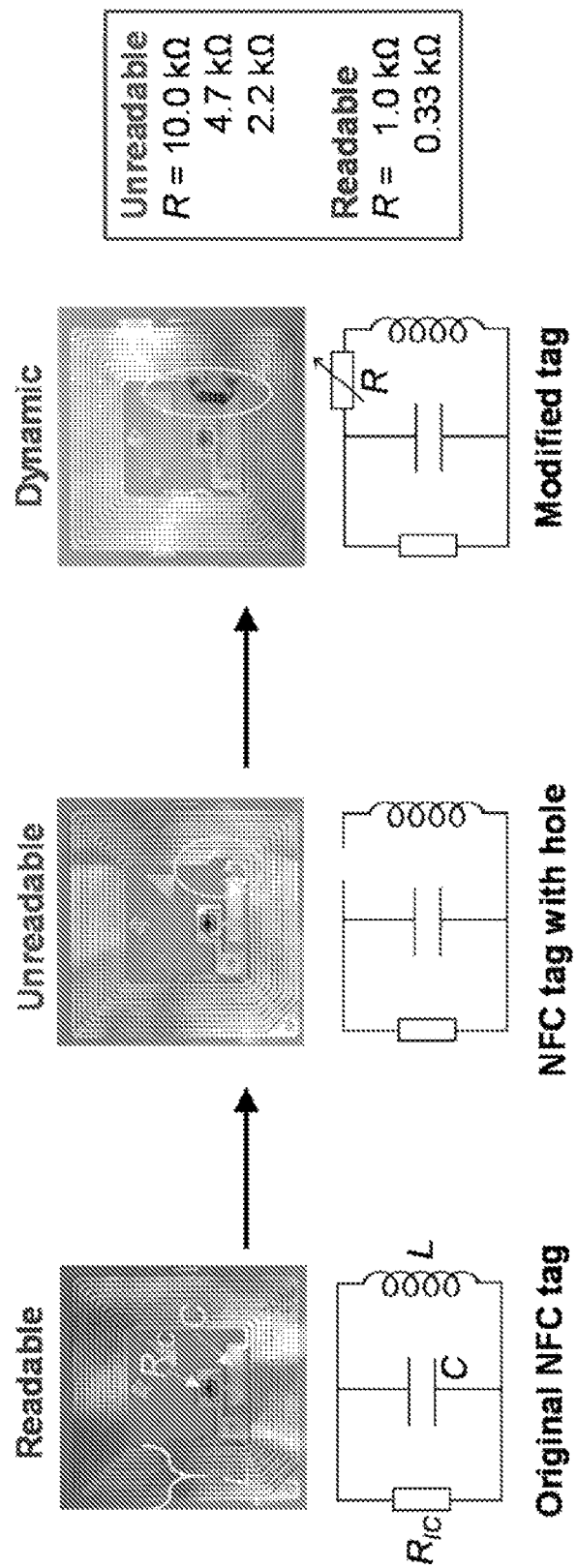
FIG. 35A shows circuit design of an NFC tag.
Figure 35B:
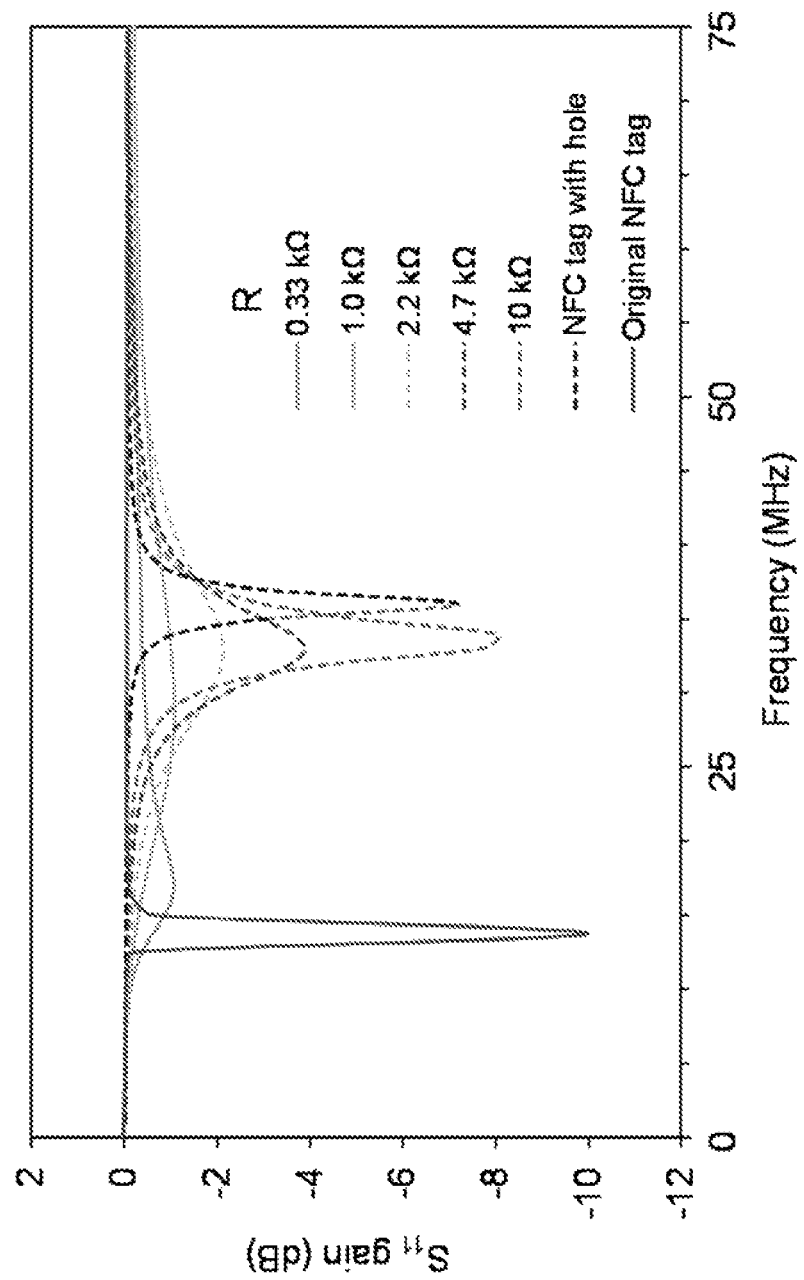
FIGS. 35B-35C shows a resonance spectrum of modified NFC tag for design of turn-on sensor.
Figure 35C:
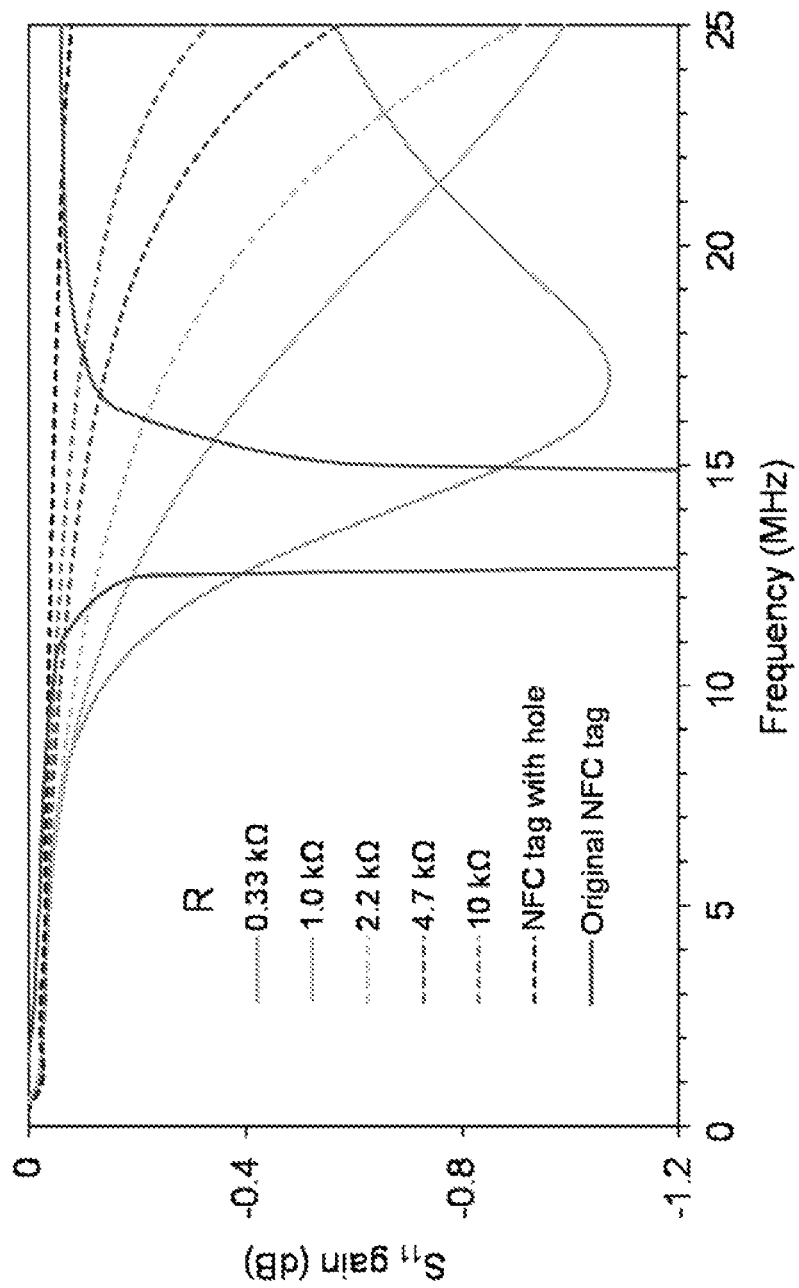

This dosimetric behavior is consistent with a mechanism wherein the SWCNT/MSP network is initially in a highly resistive form, wherein the MSP groups are preventing optimal charge transport across SWCNT-SWCNT junctions. DECP triggered disassembly of the MSP wrapper enhances the conductivity and at lower levels of disassembly new independent pathways are being established with each improved SWCNT-SWCNT junction. As the MSP is progressively disassembled, new bifurcated and redundant pathways have less of an overall effect and the relative response decreases. This sensing mechanism is dosimetric giving a time- and concentration-integrated response. As indicated previously, dosimeters are particularly useful in monitoring acutely toxic chemical substances at extremely low concentrations.[6, 26] Although the present investigations are limited to chemiresistors, additional sensitivity enhancements may be possible if the sensing materials were to be integrated into devices that function in capacitive or field effect transistor modes. See Kauffman, D. R.; Star, A. *Angew. Chem. Int. Ed.* 2008, 47, 6550-6570, and Snow, E. S.; Perkins, F. K.; Robinson, J. A. *Chem. Soc. Rev.* 2006, 35, 790-798, each of which is incorporated by reference in its entirety. Wireless chemical sensing. The utility of the large and irreversible chemiresistive response of SWCNT/MSP (Cu) sensors was demonstrated by wireless chemical sensing under ambient conditions. To this end, a near-field communication (NFC) tag (see Azzarelli, J. M.; Mirica, K. A.; Ravnsbæk, J. B.; Swager, T. M. *Proc. Natl. Acad. Sci. USA* 2014, 111, 18162-18166, which is incorporated by reference in its entirety) was modified such that a commercial smartphone can be used to detect trace toxic chemicals. Using a Samsung Galaxy S4 (SGS4), a turn-on dosimetric sensor can be prepared by inserting resistors in series with the antenna (L) of NFC tag (FIG. 5). $R_{IC}$, C, L, and R denote the integrated circuit, capacitor, antenna, and resistor, respectively. If the inserted resistance is higher than 2.2 kΩ, the modified NFC tag was unreadable by SGS4 because resistance is high enough to prohibit the NFC tag from creating a resonant circuit at 13.56 MHz (FIG. 35A). In FIGS. 35B-35C, solid lines correspond with tags that are readable by smartphone. Dotted lines correspond with tags that are unreadable by smartphone. In contrast, the modified NFC tag becomes readable by SGS4 when the inserted resistance is lower than 1.0 kΩ. Thus, approximately 100% increase in conductivity (i.e., change from 2.2 kΩ to 1.0 kΩ) is required to switch between the unreadable and readable state, and hence the chemiresistive dosimetric sensor is well suited to creating a turn-on NFC tag (FIGS. 4A and 4C). As a demonstration, an NFC tag modified by the SWCNT/MSP (Cu) material (initial resistance=3.6 kΩ) is initially unreadable by SGS4, but converts to a readable state (resistance=0.79 kΩ) after 5 s exposure to 10 ppm $SOCl_2$ in air. The modified NFC tag becomes readable by a smart phone after 5 s exposure to 10 ppm $SOCl_2$ at ambient condition (in air, 17.1° C., relative humidity=16.2%). A mixture of o-DCB and toluene (1:1 by volume) was used for dispersing SWCNT/MSP(Cu), and the supernatant of the centrifuged solution was used for preparing sensors. The NFC tag remains readable by SGS4 after more than 1 week of storage in ambient atmosphere, and hence the cumulative $SOCl_2$ exposure history can be established even after an extended period of time.

This non-volatile memory is advantageous for wireless sensing especially when continuous monitoring is economically unfeasible or difficult as a result of limited sampling opportunities. This specific sensing system could find utility for leak detection from Li—$SOCl_2$ backup batteries commonly used in medical instruments, fire alarms, and military systems.

An alternative turn-off dosimetric sensor can be prepared by changing the circuit design. The combination of turn-on and turn-off sensor modes can enhance the reliability of a sensing system. These modification techniques to conventional NFC tags facilitate deployment of the methods as chemical sensors for safety and security management.

EXAMPLES

Materials

All solvents were of ACS reagent grade or better, and used without purification unless otherwise noted. Tetrahydrofuran, dimethylformamide, and dichloromethane for syntheses were dried over activated molecular sieves (4 Å). Deuterated solvents for NMR spectroscopy were purchased from Cambridge Isotope Laboratories, Inc. All reagent grade materials were purchased from Sigma-Aldrich, Toyo Chemical Industry, Alfa Aesar, or Macron Fine Chemicals, and used without further purification. Thin layer chromatography (Merck silica gel 60 F254 plates) was used for monitoring reaction progress. Silica gel (60 Å pore size, 230-400 mesh) was purchased from Sigma-Aldrich. Bio-Beads S-X1 Support (styrene divinylbenzene beads, 1% crosslink, 40-80 μm bead size, 600-14000 g/mol exclusion range) from BIO-RAD was used for size exclusion chromatography. Poly(9,9-di-n-octylfluorenyl-2,7-diyl) with $M_w$>20 k was obtained from Aldrich. Purified SWCNT (Lot: PT102210) was obtained from Nano-C. 2,6-Dimethoxyanthraquinone was synthesized according to a literature procedure. See Cammidge, A. N.; Goddard, V. H. M. Liquid Crystals 2008, 35, 1145-1150, which is incorporated by reference in its entirety.

2. Methods

General Methods $^1H$ and $^{13}C$ NMR spectra were acquired by Bruker Avance Spectrometer operating at 400 MHz and 101 MHz for $^1H$ and $^{13}C$, respectively. Chemical shifts are referenced to residual NMR solvent peaks ($CDCl_3$: 7.24 ppm for $^1H$ and 77.23 for $^{13}C$). MALDI-TOF MS was measured using Bruker Omniflex MALDI-TOF instrument. Dithranol was used as a matrix. High-resolution mass spectra (HRMS) were obtained by Bruker Daltonics APEXIV 4.7 Tesla FT-ICR-MS employing electrospray (ESI) or direct analysis in real time (DART) as the ionization technique. Absorption spectra were measured using an Agilent Cary 4000 Series UV-Vis-NIR spectrophotometer. FT-IR spectra were acquired using a Thermo Scientific Nicolet 6700. Ge crystal was used for ATR mode. For liquid state FT-IR spectra (transparent mode), Specac Omni Cell and NaCl crystals were used. Interdigitated microelectrode (CC1.W1) with electrode gap of 200 μm was purchased from BVT Technologies. Scanning electron microscope was measured using JEOL 6010LA with accelerating voltage of 2.0-10.0 kV.

Dispersion of SWCNT and Device Fabrication

In a typical device, 0.02 mg of SWCNT and 0.1 mg of AL were suspended in 0.2 mL of o-DCB, and then metal acetate dissolved in methanol (10.6 mM, 16.4 μL) was added. The suspension was treated in an ultrasonic bath for 10 min at room temperature. The suspension was centrifuged (6900×g, 12000 rpm, 10 min, mini-centrifuge from Bio Lion) if necessary, and supernatant solution (top 50%) was collected. The dispersion (ca. 0.5 μl) was drop-cast on interdigitated microelectrode (CC1.W1 form BVT Technologies). The solvent was removed in air. The drop-casting of the dispersion was repeated until the resistance of SWCNT network (measured by a multimeter) reached desired values. Sensors were kept in dry $N_2$.

Gas Detection Measurements (Wired)

Figure 36:
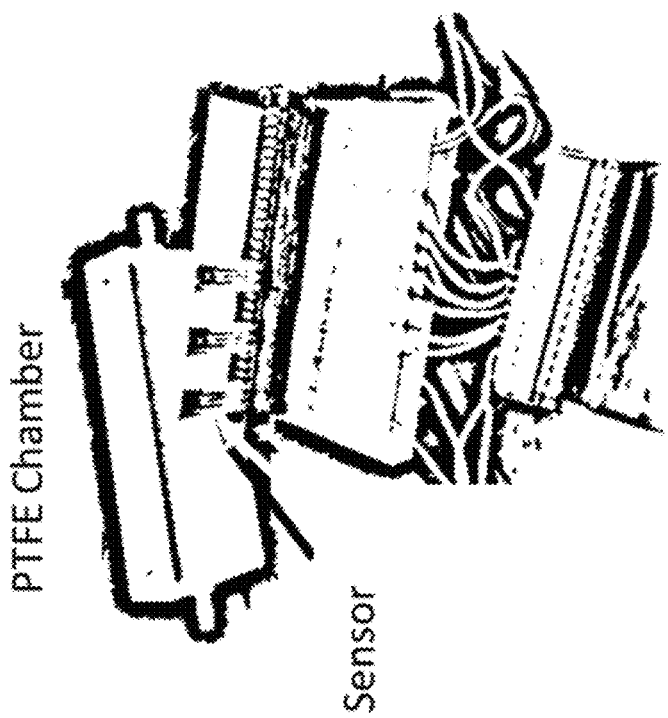
FIG. 36 shows experimental set up for monitoring of conductivity of sensing materials.
Figure 36:
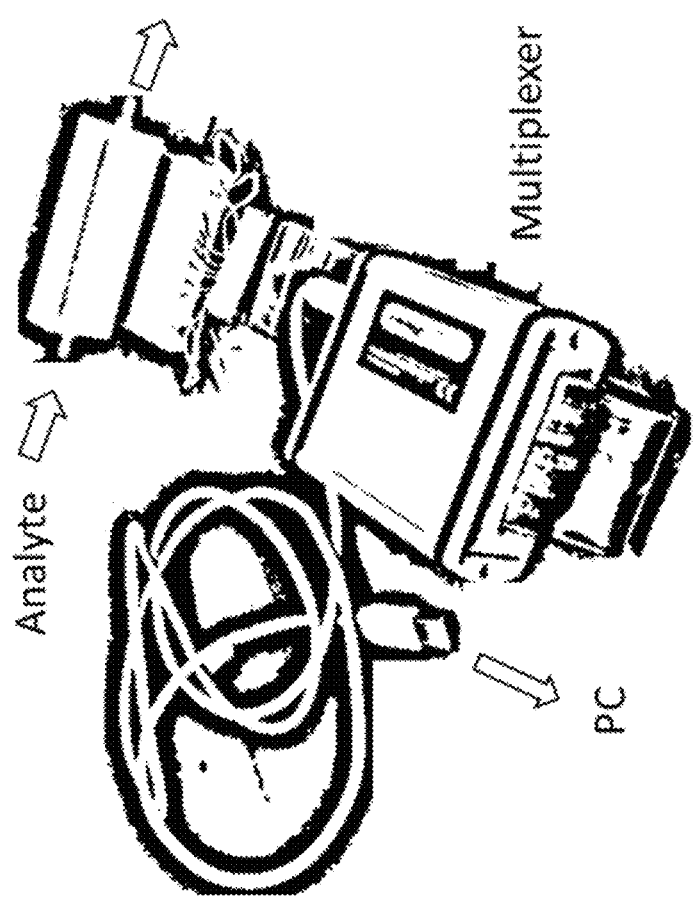

Gas detection measurements were acquired by using a test clip fitted with a PTFE chamber to connect the interdigitated microelectrodes to a PalmSens EmStat potentiostat with a MUX16 multiplexer (FIG. 36). For measuring device response to volatile liquid organic compounds and to water, a KIN-TEK gas generator system was used to produce analyte gas with known concentration. Flow rate of analyte was adjusted by gas flow meter obtained from Matheson. The chemiresistive device was enclosed in a PTFE chamber. The potentiostat was used to apply a constant potential of 0.10 V across the electrodes, and the current was recorded using PSTrace software (v. 4.6) as the device was exposed to varying concentrations of analyte gas. For ammonia detection measurements, the chemiresistive device was enclosed in a PTFE chamber, and a gas mixer system was used to deliver ammonia gas diluted by nitrogen. The gas mixer was comprised of two digital flow controllers purchased from Sierra Instruments. A MicroTrak Mass Flow Controller is used to deliver up to 4 mL/min of a mixture of 1% ammonia in nitrogen that was further diluted in the gas mixer by nitrogen delivered by the other Mass Flow Controller at 2.00 L/min. Poly-4-vinylpyridine powder (P4VP, 2% cross-linked) was directly added to DECP (or DMCP) as a scavenger of hydrochloric acid. DECP with P4VP was stirred with magnetic bar under dry $N_2$ flow for several days. Evaporation rate of DECP was calibrated based on the decrease of mass. DECP vapor was diluted with dry $N_2$ to create DECP vapor with desired concentration (10, 1, 0.1 ppm).

Gas Detection Measurements (Wireless)

Conversion of a commercial NFC tag (RI-I11-114A-01, Texas Instruments) into a wireless chemical sensor was previously described. See, Azzarelli, J. M.; Mirica, K. A.; Ravnsbæk, J. B.; Swager, T. M. Proc. Natl. Acad. Sci. USA 2014, 111, 18162-18166, which is incorporated by reference in its entirety. Circuit design was further improved in this paper for realizing smart phone turn-on and turn-off sensors. The circuit of an NFC tag was disrupted using a circular hole puncher (hole diameter 2 mm; Bead Landing). A hole was punched through the tag, effectively removing a portion of the conducting aluminum film (along with the underlying polymeric substrate). The circuit was reconstructed via electrically connecting interdigitated microelectrode (functionalized with SWCNT+MSP(Cu)) by silver glue to bridge the two disconnected ends of aluminum. The reflection coefficient spectra were collected with a network analyzer (Agilent E5061B). Smart phone (Galaxy S4, Samsung) was used for recognition of NFC tag at various positions and distances. Saturated $SOCl_2$ vapor was diluted by 1200 times with air (relative humidity=16.2%, 17.1° C.), and the diluted vapor was used for sensing.

Scanning Tunneling Microscopy (STM) Measurement

An Agilent 5100 using constant current mode was used to perform all STM experiments. A vibration isolation chamber was used to isolate the STM setup from acoustic vibrations. Pt/Ir (80:20) wire was used to mechanically cut tips with a diameter of 0.25 mm. HOPG ZYB, NT-MDT was used. Ortho-dichlorobenzene and 1-phenyloctane were purchased from Sigma-Aldrich. STM measurements were performed at the graphite/solution interface at room temperature. Fast scan direction is in the horizontal direction of the image. The layers were relatively unstable, but were able to be imaged at $I_{set}$=5 pA and $V_{bias}$=−700 mV. Sample for STM measurement was prepared as follows. AL (0.1 mg) dissolved in o-DCB (0.15 mL) was added with $Cu(AcO)_2 \cdot H_2O$ solution in methanol (10.6 mM, 16.4 µL, 1.0 molar equivalent for AL). The solution was sonicated for 1 min, and then 1-phenyloctane (0.075 mL) was added. The solution was sonicated for 1 min, and then smoothly filtered by PTFE membrane (0.2 µm). The clear green solution was used for STM measurement.

3.1 Synthesis of 2,6-Dimethoxy-9,10-dioctyl-anthracene (1a)

2,6-Dimethoxy-anthraquinone[S1] (10.2 g, 38.0 mmol) in three neck round bottom flask was vacuum dried and purged with dry argon, and added with dry THF (800 mL). The suspension was bubbled with dry argon for 10 min, and cooled to 0° C. by ice bath. Then, 2M n-$C_8H_{17}$MgBr in diethyl ether (100 mL, 200 mmol) was added with syringe. The resulting dark brown solution was allowed to warm to room temperature, and stirred overnight. The reaction was quenched with saturated aqueous solution of $NH_4Cl$, and the color of solution turned yellowish brown. THF was removed under reduced pressure. The precipitated solid was dissolved in dichloromethane, and washed with 0.1 M HCl aq. Dichloromethane solution was dried over $Na_2SO_4$, and the filtrated solution was evaporated under reduced pressure. The resulting red brown solid was dried in vacuum overnight. The solid was dissolved in dry THF (300 mL), and the solution was added to the mixtures of $SnCl_2 \cdot H_2O$ (22 g, 98 mmol) and acetic acid (300 mL) at room temperature. After 22 hr, the reaction was neutralized with 1% NaOH aq., and the product was extracted with hexane. The hexane solution was dried over $Na_2SO_4$, and the filtrated solution was evaporated to dryness. The crude product was purified with column chromatography on silica gel using gradient of 0-20% of dichloromethane in hexane. The yellow and fluorescence compound was collected. After removal of solvent under reduced pressure, the product was recrystallized from ethanol. Thus, 2,6-dimethoxy-9,10-dioctyl-anthracene (1a) was obtained as yellow needle crystal (1.0 g, 2.2 mmol, Yield: 5.7%). $^1$H-NMR (400 MHz, $CDCl_3$) in ppm: 8.14 (d, J=9.6 Hz, 2H, Ar—H), 7.40 (d, J=2.6 Hz, 2H, Ar—H), 7.18 (dd, J=9.6, 2.6 Hz, 2H, Ar—H), 3.97 (s, 6H, $OCH_3$), 3.45 (m, 4H, $ArCH_2$), 1.78 (m, 4H, $CH_2$), 1.56 (m, 4H, $CH_2$), 1.41 (m, 4H, $CH_2$), 1.28 (m, 12H, $CH_2$), 0.87 (t, 6H, $CH_3$). $^{13}$C-NMR (100 MHz, $CDCl_3$) in ppm: 156.2, 132.1, 129.2, 126.9, 126.7, 119.5, 101.9, 55.3, 32.1, 31.0, 30.6, 29.8, 29.6, 28.7, 22.9, 14.3. HR-DART/FT-MS (m/z): calculated for $[C_{32}H_{46}O_2+H]$=463.3576 m/z, found 463.3578 m/z. TLC: Rf=0.5 (dichloromethane:hexane=1:3).

3.2 Synthesis of 2,6-Dibromo-3,7-dimethoxy-9,10-dioctyl-anthracene (1b)

Selective bromination was performed according to literature procedure. See, Nakano, M.; Niimi, K.; Miyazaki, E.; Osaka, I.; Takimiya, K. Org. Lett. 2012, 77, 8099-8111., which is incorporated by reference in its entirety. 1a (600 mg, 1.30 mmol) in three neck round bottom flask was dried in vacuum, and purged with dry argon. Dry THF (60 mL) was added, and the solution was cooled down to 0° C. with ice bath. The solution was bubbled with dry argon for 10 min at 0° C. Then, 1.4 M sec-BuLi in cyclohexane (5.1 mL, 7.1 mmol) was dropwisely added with syringe under argon atmosphere. The resulting dark green solution was stirred at 0° C. for 1 hr, and then 1,2-dibromotetrachloroethane (3.0 g, 9.2 mmol) was added quickly. The color of solution changed from dark green to yellow. The solution was allowed to warm to room temperature, and then further stirred for 2 hr. The reaction was quenched with saturated aqueous solution of $NH_4Cl$. THF was removed under reduced pressure, and the resulting solid was washed with water and methanol on glass filter. The solid product (450 mg) was dried in vacuum. The crude produced was used for next step without further purification.

3.3 Synthesis of 3,7-Dimethoxy-9,10-dioctyl-anthracene-2,6-dicarbaldehyde (1c)

The crude 1b (450 mg, 0.725 mmol if pure) in three neck round bottom flask was dried in vacuum, and purged with dry argon. Dry THF (88 mL) was added, and the solution was cooled to −78° C. The solution was bubbled with dry argon for 10 min at −78° C. Then, 1.4 M sec-BuLi in cyclohexane (4.4 mL, 6.2 mmol) was dropwisely added with syringe under argon atmosphere. The green solution was kept stirred at −78° C. for 30 min, and then excess of dry dimethylformamide (5 mL) was added dropwisely. The color of solution changed from green to yellow. The solution was allowed to warm to room temperature, and then further stirred for 1 hr. The reaction was quenched with water, and the solution get orange. THF was removed under reduced pressure, and the resulting solid was washed with water and methanol on glass filter. The orange solid was purified by column chromatography on silica gel (dichloromethane: hexane=2:1). There are orange and pink bands on column chromatography, and the pink band that comes out later from column was collected. Solvent was removed under reduced pressure, and 3,7-dimethoxy-9,10-dioctyl-anthracene-2,6-dicarbaldehyde (1c) was obtained as a red solid (90 mg, 0.17 mmol, Yield: 13%). $^1$H-NMR (400 MHz, CDCl$_3$) in ppm: 10.6 (s, 2H, CHO), 8.80 (s, 2H, Ar—H), 7.44 (s, 2H, Ar—H), 4.06 (s, 6H, OCH$_3$), 3.51 (m, 4H, ArCH$_2$), 1.78 (m, 4H, CH$_2$), 1.56 (m, 4H, CH$_2$), 1.40 (m, 4H, CH$_2$), 1.27 (m, 12H, CH$_2$), 0.87 (t, 6H, CH$_3$). $^{13}$C-NMR (100 MHz, CDCl$_3$) in ppm: 190.5, 155.6, 135.9, 131.4, 129.3, 127.0, 126.8, 102.6, 55.6, 32.1, 31.4, 30.4, 29.7, 29.5, 28.7, 22.9, 14.3. HR-DART/FT-MS (m/z): calculated for [C$_{34}$H$_{46}$O$_4$+H]= 519.3474 m/z, found 519.3477 m/z. TLC: Rf=0.17 (dichloromethane:hexane=2:1).

3.4 Synthesis of 3,7-Dihydroxy-9,10-dioctyl-anthracene-2,6-dicarbaldehyde (1d)

1c (70 mg, 0.13 mmol) in three neck round bottom flask was dried in vacuum, and purged with dry argon. Dry dichloromethane (40 mL) was added, and the solution was cooled down to −78° C. The solution was bubbled with dry argon for 10 min at −78° C. BBr$_3$ (0.5 mL) was diluted with dry dichloromethane (10 mL), and the BBr$_3$ (0.095 mL, 250 mg, 1.0 mmol) in dry dichloromethane (2 mL) was dropwisely added to the solution of 1c at −78° C. under dry argon. The resulting red brown solution was kept stirred at −78° C. for 1 hr, and the solution was allowed to warm to room temperature, and then further stirred overnight in dark. The solution was cooled to 0° C., and then the reaction was carefully quenched with water. The solvent was removed under reduced pressure, and the resulting solid was washed with water and methanol on glass filter. The solid was dissolved in acetone, and the removal of solvent under reduced pressure provided 1d (50 mg, 0.10 mmol, Yield: 77%). Due to the possible instability of 1d in air, the product was used for next step immediately after checking NMR spectrum. $^1$H-NMR (400 MHz, CDCl$_3$) in ppm: 10.2 (s, 2H, OH), 9.97 (s, 2H, CHO), 8.60 (s, 2H, Ar—H), 7.62 (s, 2H, Ar—H), 3.47 (m, 4H, ArCH$_2$), 1.77 (m, 4H, CH$_2$), 1.53 (m, 4H, CH$_2$), 1.39 (m, 4H, CH$_2$), 1.27 (m, 12H, CH$_2$), 0.87 (t, 6H, CH$_3$). $^{13}$C-NMR (100 MHz, CDCl$_3$) in ppm: 197.0, 153.1, 137.5, 135.9, 131.6, 127.5, 124.5, 108.6, 32.1, 31.7, 30.5, 29.8, 29.5, 29.1, 22.9, 14.3.

3.5 Synthesis of 9,10-Dioctyl-3,7-bis-propyliminomethyl-anthracene-2,6-diol (AL)

1d (25 mg, 0.051 mmol) in round bottom flask was dried in vacuum, and purged with dry argon. Dry dichloromethane (20 mL) was added, and the solution was added with n-propylamine (100 mg, 1.7 mmol) and anhydrous MgSO$_4$ (ca. 100 mg) at room temperature. The mixed solution was stirred for 1 hr under dry argon, and then the MgSO$_4$ was removed by filtration. Solvent was removed under reduced pressure, and the resulting pink solid was purified by gel permeation chromatography (BIO-RAD, Bio-Beads S-X1) using dichloromethane as eluent. The pink band was collected, and then solvent was removed under reduced pressure. The pink solid was washed with methanol on glass filter, and then the solid was dissolved in dichloromethane. Removal of solvent under reduced pressure provided AL as a pink solid (20 mg, 0.035 mmol, Yield: 68%). Note that AL in solid state was stable in air, while AL in CDCl$_3$ gradually provides impurity $^1$H-NMR signals when left in air over a week. $^1$H-NMR (400 MHz, CDCl$_3$) in ppm: 12.8 (s, 2H, OH), 8.58 (s, 2H, CH=N or Ar—H), 8.18 (s, 2H, CH=N or Ar—H), 7.56 (s, 2H, CH=N or Ar—H), 3.65 (t, 4H, NCH$_2$), 3.43 (m, 4H, ArCH$_2$), 1.78 (m, 8H, CH$_2$), 1.56 (m, 4H, CH$_2$), 1.38-1.28 (m, 16H, CH$_2$), 1.02 (t, 6H, CH$_3$), 0.87 (t, 6H, CH$_3$). $^{13}$C-NMR (100 MHz, CDCl$_3$) in ppm: 165.0, 154.6, 133.0, 131.1, 129.7, 126.5, 122.9, 107.1, 62.2, 32.2, 31.4, 30.6, 29.8, 29.6, 28.9, 24.3, 22.9, 14.3, 12.0. HR-ESI/FT-MS (m/z): calculated for [C$_{38}$H$_{56}$N$_2$O$_2$+H]=573.4415 m/z, found 573.4419 m/z. TLC: decomposed.

3.6 Synthesis of 3,7-Dihydroxy-9,10-dioctyl-anthracene-2,6-dicarbaldehyde dioxime (ALOx)

AL in round bottom flask was dried in vacuum, and purged with dry argon. Dichloromethane (5 mL), methanol (1 mL), and water (ca. 0.05 mL) were added, and the solution was added with a few drops of trifluoroacetic acid. The mixture was stirred in argon overnight, and the color of solution turns to deep purple. Organic solvents were removed under reduced pressure, and the resulting solid was washed with water and methanol on glass filter. The solid was dissolved in dichloromethane, and dried in vacuum. Complete hydrolysis of imine group was confirmed by $^1$H-NMR spectrum, and the product is identical to 1d. The solid was dissolved in dry dichloromethane (3 mL) and ethanol (3 mL), and the solution was added with hydroxylamine hydrochloride (150 mg). The mixture was stirred under argon for 3 hr, and then the color of solution turned to orange. Solvents were removed under reduced pressure, and the resulting orange solid was washed with water and methanol. The product was dissolved in acetone, and the removal of solvent under reduced pressure provided ALOx as an orange solid (3.0 mg, 0.0058 mmol, Yield: 66%). $^1$H-NMR (400 MHz, CDCl$_3$ and CD$_3$COCD$_3$) in ppm: 10.40 (s, 1.3H, OH, disappeared when CD$_3$OD added), 9.78 (s, 2H, OH, disappeared when CD$_3$OD added), 8.42 (s, 2H, CH=N or Ar—H), 8.06 (s, 2H, CH=N or Ar—H), 7.51 (s, 2H, CH=N or Ar—H), 3.36 (m, 4H, ArCH$_2$), 1.68 (m, 4H, CH$_2$), 1.50 (m, 4H, CH$_2$), 1.22 (m, 4H, CH$_2$), 1.22 (m, 12H, CH$_2$), 0.81 (t, 6H, CH$_3$). $^{13}$C-NMR (100 MHz, CD$_3$COCD$_3$) in ppm: 153.3, 153.1, 133.3, 130.4, 130.1, 127.4, 122.2, 107.4, 32.7, 32.1, 23.4, 14.4. HR-ESI/FT-MS (m/z): calculated for [C$_{32}$H$_{44}$N$_2$O$_4$+H]=521.3379 m/z, found 521.3367 m/z.

3.7 Synthesis of Poly-(9,9-Di-(2'-ethylhexyl)-2,7-dibromofluorene)

Polymer was prepared by Ni(0)-catalyzed cross-coupling polymerization of 9,9-Di-(2'-ethylhexyl)-2,7-dibromofluorene using modified procedure of reported method. See, Yang, Y.; Pei, Q.; Heeger, A. J. *J. Appl. Phys.* 1996, 74, 934-939, which is incorporated by reference in its entirety. NiCl$_2$ (8.2 mg, 0.063 mmol), PPh$_3$ (140 mg, 0.53 mmol), zinc dust (658 mg, 10.1 mmol), 2,2'-bipyridine (9.0 mg, 0.058 mmol), 9,9-di-(2'-ethylhexyl)-2,7-dibromofluorene (551 mg, 1.00 mmol) were placed in Schlenk flask, and dried in vacuum for 1 hr. Ar was purged into the flask, and degassed toluene (2 mL) and DMF (1 mL) were added. The mixture was stirred at 80° C. After 3 hr the mixture was poured into methanol (50 mL), and the resulting white precipitate was washed with methanol. The solid was dissolved in dichloromethane, and zinc powder was removed using 0.2 μm PTFE membrane. The clear solution was precipitated into acetone, and white solid was collected on glass filter. The white solid was dissolved in dichloromethane. Removal of solvent under reduced pressure provided poly-(9,9-Di-(2'-ethylhexyl)-2,7-dibromofluorene) as a light white solid (180 mg, Yield: 46%). GPC (THF, polystyrene standard, RI detection): $M_n$=9.0 k, $M_w$=11.3 k, $M_w/M_n$=1.26.

Other embodiments are within the scope of the following claims.

What is claimed is:

1. A system for detecting an analyte comprising:
a detector; and
a radio frequency identification tag including a sensor portion, the sensor portion configured to change resistivity when the radio frequency identification tag contacts or interacts with an analyte, whereby the resistivity change alters an output of the radio frequency identification tag, wherein the sensor portion includes a circuit, and wherein the sensor portion is configured to activate the circuit or deactivate the circuit when contacted or having interacted with the analyte,
wherein the circuit includes a conductive material associated with a chemically-degradable polymer; the polymer including a ligand and a metal ion.

2. The system of claim 1, wherein the detector is a reader.

3. The system of claim 2, wherein the reader is a hand held reader.

4. The system of claim 3, wherein a hand held reader is a smartphone.

5. The system of claim 4, wherein the tag becomes readable from unreadable to the detector after the conductivity changes.

6. The system of claim 4, wherein the tag becomes unreadable from readable to the detector after the conductivity changes.

7. The system of claim 1, wherein the system includes a dosimeter.

8. The system of claim 7, wherein the dosimeter is a radiation dosimeter, a chemical warfare agent dosimeter, a volatile organic compound dosimeter, or an analyte dosimeter.

9. The system of claim 1, wherein the system monitors a pollutant, a chemical relevant to occupational safety, a nerve agent, or a pulmonary agent.

10. The system of claim 1, wherein the system includes a plurality of tags.

11. The system of claim 10, wherein each of the plurality of tags is capable of detecting at least one analyte.

* * * * *